(12) United States Patent
Miyazono et al.

(10) Patent No.: US 7,549,880 B2
(45) Date of Patent: Jun. 23, 2009

(54) COMPOSITE CONTACT

(75) Inventors: Katsunori Miyazono, Osaka (JP);
Shinsuke Handa, Osaka (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 11/723,240

(22) Filed: Mar. 19, 2007

(65) Prior Publication Data

US 2007/0216017 A1 Sep. 20, 2007

(30) Foreign Application Priority Data

Mar. 20, 2006 (JP) ............................. 2006-077297

(51) Int. Cl.
*H01R 33/02* (2006.01)
(52) U.S. Cl. ..................... 439/232; 439/239; 439/241
(58) Field of Classification Search ................. 439/232, 439/228, 239, 241, 242, 235
See application file for complete search history.

(56) References Cited

U.S. PATENT DOCUMENTS

| | | | | |
|---|---|---|---|---|
| 3,944,808 | A | * | 3/1976 | Vause .......................... 362/296 |
| 4,198,109 | A | * | 4/1980 | Ustin .......................... 439/239 |
| 5,368,495 | A | | 11/1994 | Raby, Sr. et al. |
| 5,720,546 | A | | 2/1998 | Correll, Jr. et al. |
| 5,907,218 | A | | 5/1999 | Altman et al. |
| 7,344,397 | B2 | * | 3/2008 | Miyazono ................... 439/232 |
| 2006/0279957 | A1 | * | 12/2006 | Kwon et al. ................. 362/378 |

FOREIGN PATENT DOCUMENTS

| | | | |
|---|---|---|---|
| JP | 07-245157 | A | 9/1995 |
| JP | 10334968 | * | 12/1998 |
| JP | 19828983 | A1 | 1/1999 |
| JP | 2004-259645 | A | 9/2004 |
| JP | 2004-335227 | A | 11/2004 |
| JP | 2005-259370 | A | 9/2005 |

OTHER PUBLICATIONS

JPO Notification (1 page) for App. No. 2006-077297 with English translation (1 page), dated Nov. 26, 2007.
Japanese Information Offer Form, dated Oct. 24, 2007 (7 pages).
Office Action for U.S. Appl. No. 11/723,238, dated Mar. 4, 2008.
CNPO Office Action, App. No. 2007100885363, Jul. 4, 2008 (3 pages).

* cited by examiner

*Primary Examiner*—Hien Vu
(74) *Attorney, Agent, or Firm*—Rader, Fishman & Grauer, PLLC

(57) ABSTRACT

A composite contact includes a main body part, a first elastic piece which extends from the main body part and elastically contacts with a terminal disposed at an end part of a fluorescent tube and a second elastic piece which extends from the main body part and aims at elastically contacts with a conductive pattern which is formed on at least one of a front surface and a back surface of a circuit board, and the main body part, the first elastic piece and the second elastic piece are formed as one integrated part by a single member.

6 Claims, 35 Drawing Sheets

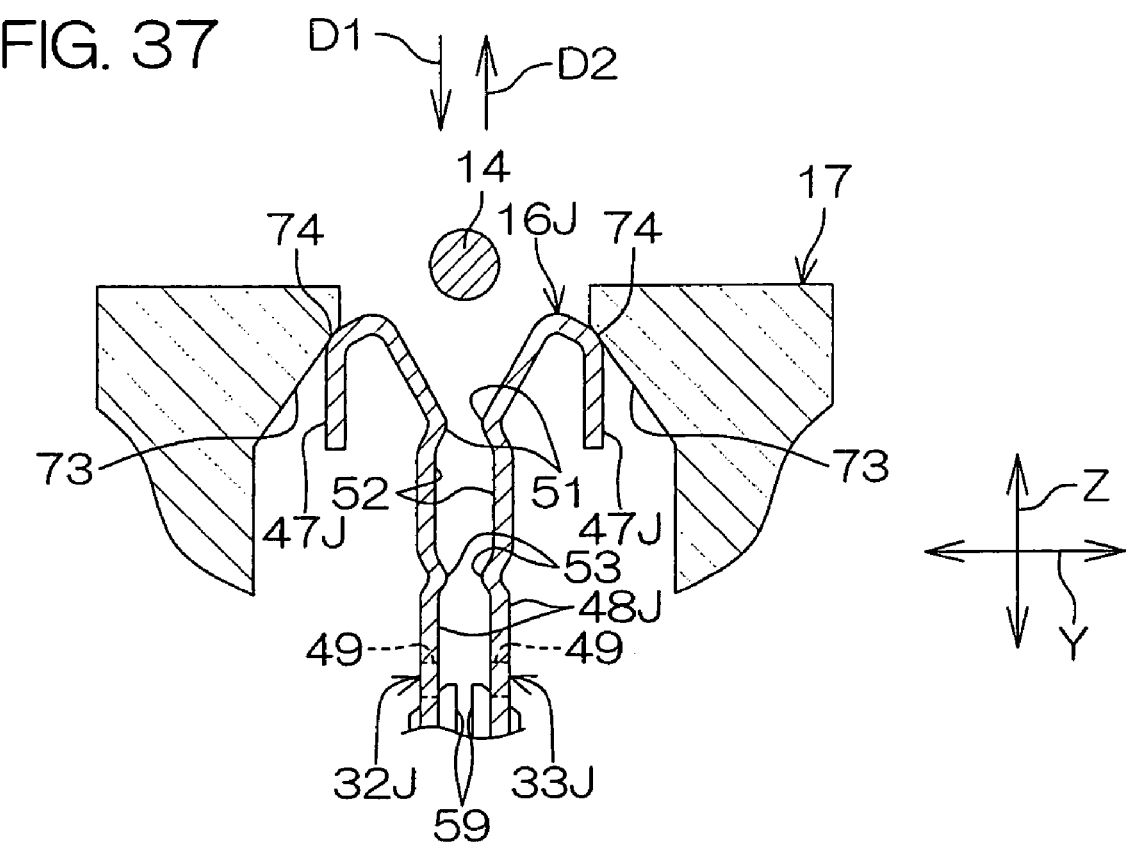

COMPOSITE CONTACT

BACKGROUND OF THE INVENTION

1. Field of the Invention

The present invention relates to a composite contact.

2. Description of Related Arts

Document 1 and the like describe a structure that electrically connects a terminal of a fluorescent tube with a circuit board or the like via a connector.

Document 1:

Japanese Unexamined Patent Publication No. 2004-259645 (publication date: Sep. 16, 2004)

The connector described in Document 1 includes an insertion slot which is shaped like a cylinder. The insertion slot receives an end of a fluorescent tube. A terminal at the end of the fluorescent tube inserted into the insertion slot contacts one end of a conductive contact which is located in the back of the insertion slot. The other end of the contact is connected with one end of an electric cable. The other end of the electric cable is soldered to a circuit board. At least two members, specifically the contact and the electric cable, are thus present between the terminal of the fluorescent tube and the circuit board, which increases the number of components. In addition, this could lead to defective conducting attributable to defective soldering.

An object of the present invention is to provide a composite contact which reduces the number of components which are necessary to attain electric connection between a terminal of a fluorescent tube and a circuit board and yet realizes electric connection between the terminal of the fluorescent tube and the circuit board without fail.

SUMMARY OF THE INVENTION

To achieve the object above, in a preferable mode of the present invention, a composite contact includes a main body part, a first elastic piece which extends from the main body part and elastically contacts with a terminal disposed at an end part of a fluorescent tube, and a second elastic piece which extends from the main body part and elastically contacts with a conductive pattern which is formed on at least one of a front surface and a back surface of a circuit board. The main body part, the first elastic piece and the second elastic piece are formed as one integrated part by a single member.

In this mode, the terminal of the fluorescent tube is electrically connected with the conductive pattern of the circuit board via the first elastic piece, the main body part and the second elastic piece, i.e., the single member. Only one component serves for electric connection between the terminal of the fluorescent tube and the circuit board, which reduces the number of components. In addition, the composite contact elastically contacts both the terminal of the fluorescent tube and the conductive pattern of the circuit board. This achieves secure contact with both the terminal of the fluorescent tube and the conductive pattern of the circuit board. It is possible to prevent defective conducting between the terminal of the fluorescent tube and the circuit board.

BRIEF DESCRIPTION OF THE DRAWINGS

FIG. 12A is a perspective view for describing an operation of mounting the composite connector to the circuit board, while

FIG. 13A is a perspective view for describing an operation of mounting the composite connector to the circuit board while

FIG. 16A is a side view of a main part according to another further embodiment of the present invention, while

FIG. 17A is a perspective view of a main part according to another further embodiment of the present invention, while

FIGS. 23A and 23B are partially sectional views of a main part according to another further embodiment of the present invention, of which FIG. 23A shows a state before a pair of elastic pieces pinch an outer lead and FIG. 23B shows a state where the pair of elastic pieces pinch the outer lead;

FIG. 24A shows a state where the pair of elastic pieces are being pressed after FIG. 23B, while

FIGS. 35A and 35B are partial sectional views of a main part according to another further embodiment of the present invention, of which FIG. 35A shows a state as it is prior to insertion of outer leads between pair of elastic pieces and FIG. 35B shows a state as it is upon insertion of the outer leads between the pair of elastic pieces.

FIG. 37 is a sectional view of a main part according to another further embodiment of the present invention; and FIG. 38A is a side view of a main part according to another further embodiment of the present invention, while

DETAILED DESCRIPTION OF THE PREFERRED EMBODIMENT

Embodiments of the present invention will now be described with reference to the accompanied drawings.

Figure 1:
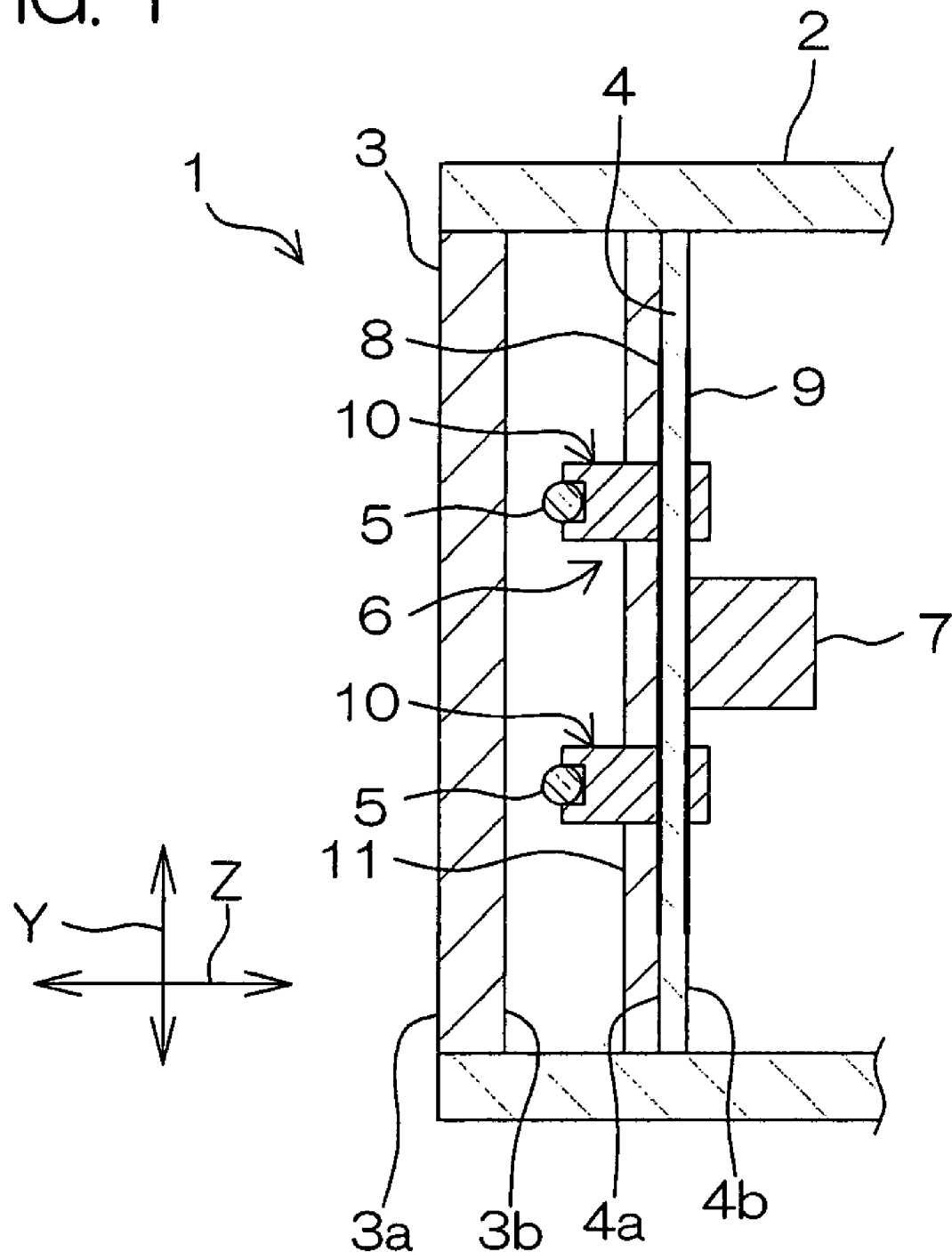
FIG. 1 is a schematic sectional view which shows the outline of the structure of a liquid crystal display device which includes a composite connector according to one embodiment of the present invention.

FIG. 1 is a schematic sectional view which shows the outline of the structure of a liquid crystal display device which includes a composite connector according to one embodiment of the present invention. Referring to FIG. 1, the liquid crystal display device 1 is used, for example, as a monitor of a television set, a personal computer, etc.

The liquid crystal display device 1 includes a housing 2, a liquid crystal panel 3, a circuit board 4, cold-cathode tubes 5 serving as fluorescent tubes, composite electric connectors 6 and an inverter circuit 7.

The liquid crystal panel 3 is a display panel of the non-light-emitting type and attached to an opening provided in the front of the housing 2. A front surface 3a of the liquid crystal panel 3 is directed toward the front of the housing 2, while a back surface 3b is directed toward the back of the housing 2.

The circuit board 4 is a plate-shaped member which is disposed generally in parallel to the liquid crystal panel 3 and fixed to the housing 2. The circuit board 4 includes a front surface 4a which is opposed to the back surface 3b of the liquid crystal panel 3 and a back surface 4b which is directed to the opposite side of the front surface 4a. Conductive patterns 8 and 9 are formed on the front surface 4a and the back surface 4b, respectively.

The cold-cathode tubes 5 are backlights for the liquid crystal panel 3, and the plurality of cold-cathode tubes 5 are provided between the back surface 3b of the liquid crystal panel 3 and the front surface 4a of the circuit board 4 (FIG. 1 shows only two cold-cathode tubes 5). The number of the cold-cathode tubes 5 is two per inch in the liquid crystal panel 3 for instance.

The respective cold-cathode tubes 5 are located at predetermined intervals along a Y-direction (which is a direction Y corresponding to the up/down direction along the housing 2), and emit light upon the liquid crystal panel 3. The longitudinal direction of the cold-cathode tubes 5 is along an X-direction (which is a direction X corresponding to the right/left direction along the housing 2, and is the perpendicular direction to the plane of FIG. 1) and parallel to the back surface 3b of the liquid crystal panel 3.

The composite electric connectors 6 (hereinafter, referred to simply as the "composite connectors 6") are attached to the circuit board 4 and disposed at the respective a pair of ends of the circuit board 4 along the X-direction (FIG. 1 shows only one of the composite connectors 6).

The composite connectors 6 include a plurality of electric connectors 10 (hereinafter, referred to simply as "the connectors 10") and holder 11 which lines up side by side and hold these connectors 10 along the aligning direction (which is the Y-direction in this embodiment). FIG. 1 shows only two connectors 10.

The connectors 10 are for attaining electric connection between the cold-cathode tubes 5 and the circuit board 4 (and further, the inverter circuit 7). The connectors 10 are disposed adjacent to the pair of ends of the cold-cathode tubes 5, respectively. Each connector 10 projects from the front surface 4a of the circuit board 4 toward the liquid crystal panel 3.

The inverter circuit 7 is for supplying driving power to the cold-cathode tubes 5, and is attached to the back surface 4b of the circuit board 4. The inverter circuit 7 and each cold-cathode tube 5 are electrically connected via the circuit board 4 and the corresponding connector 10.

Figure 2:
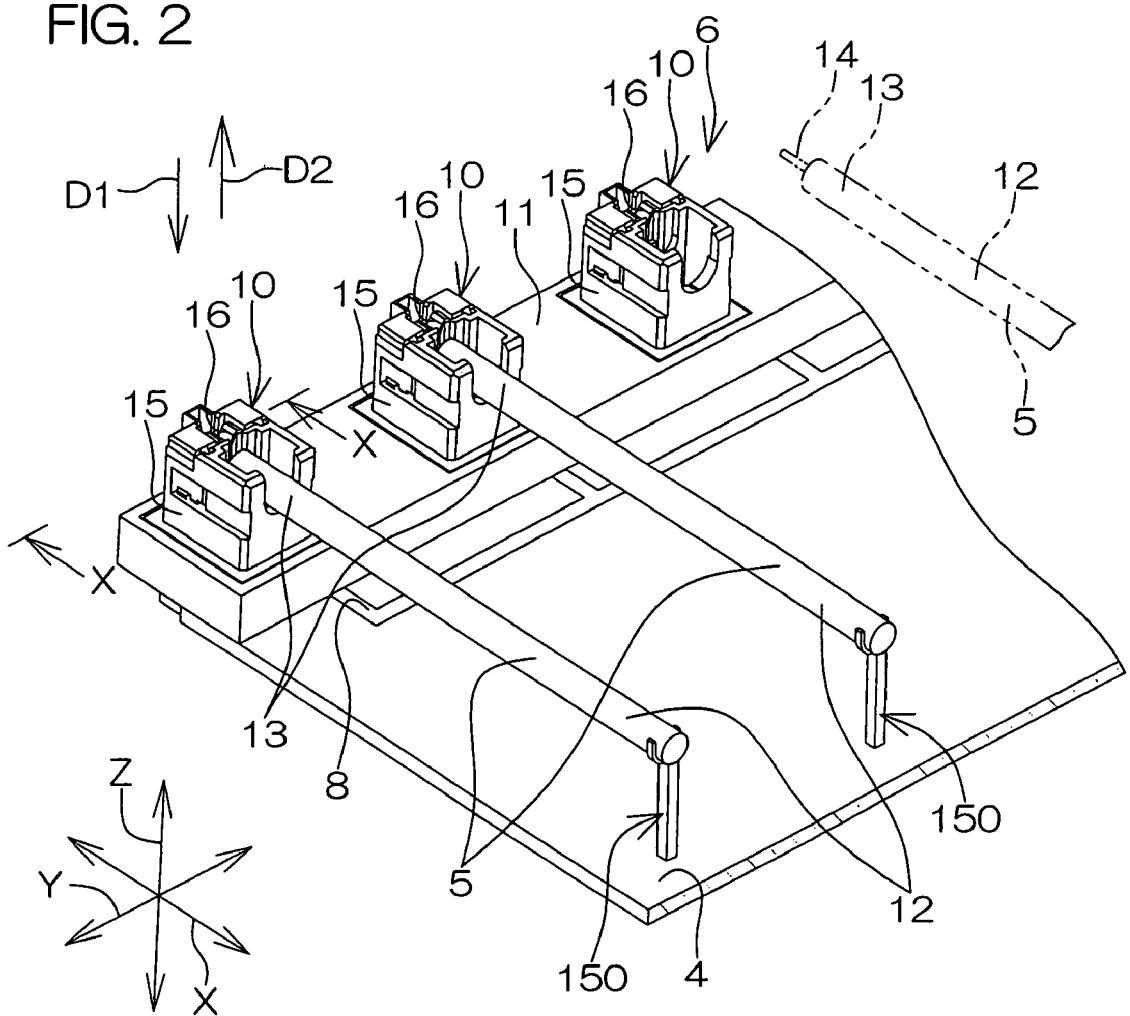
FIG. 2 is a perspective view of a main part of a circuit board, the composite connector and cold-cathode tubes.
Figure 3:
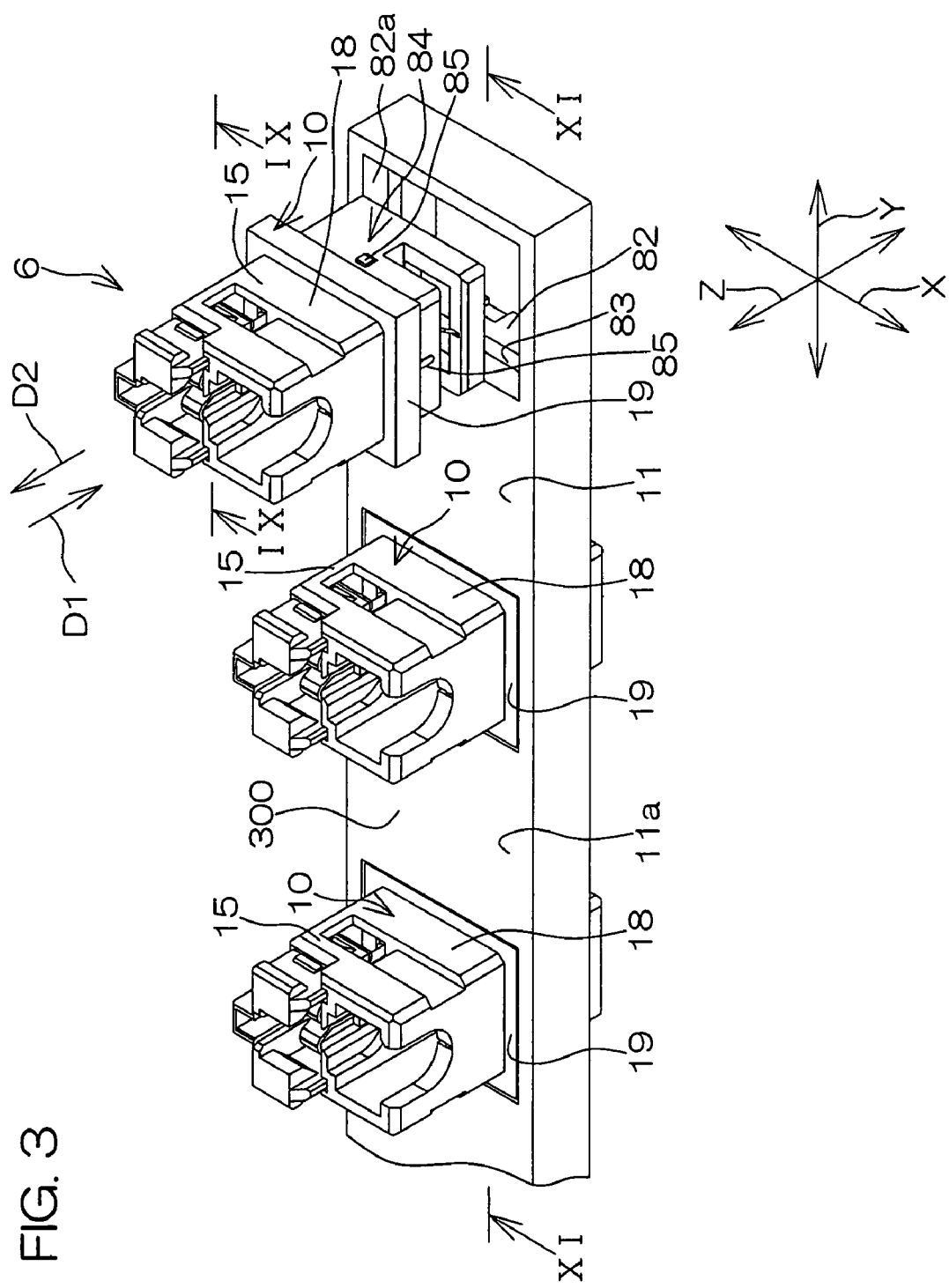
FIG. 3 is a partial exploded perspective view of the composite connector.
Figure 4:
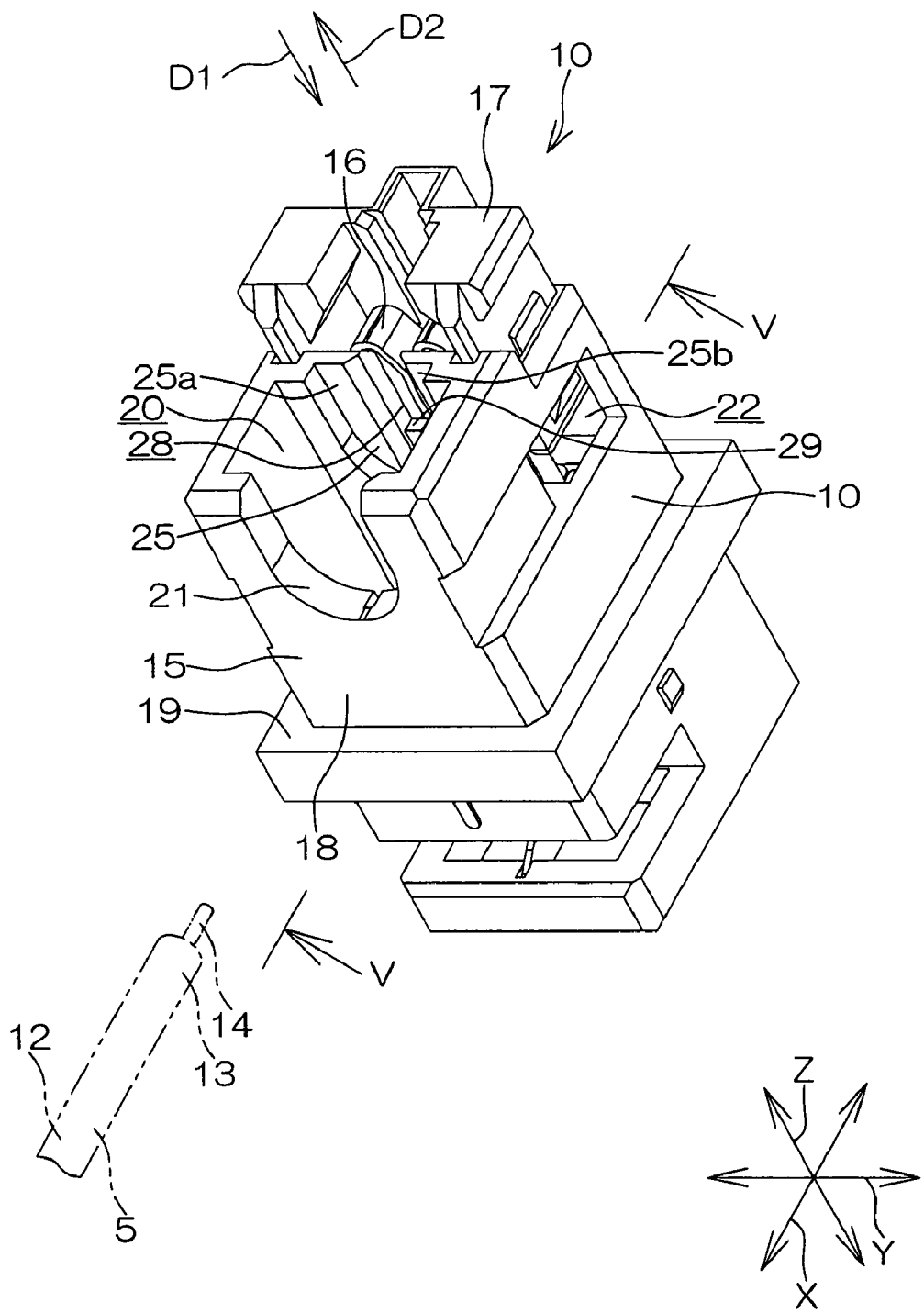
FIG. 4 is a perspective view of a single connector.
Figure 5:
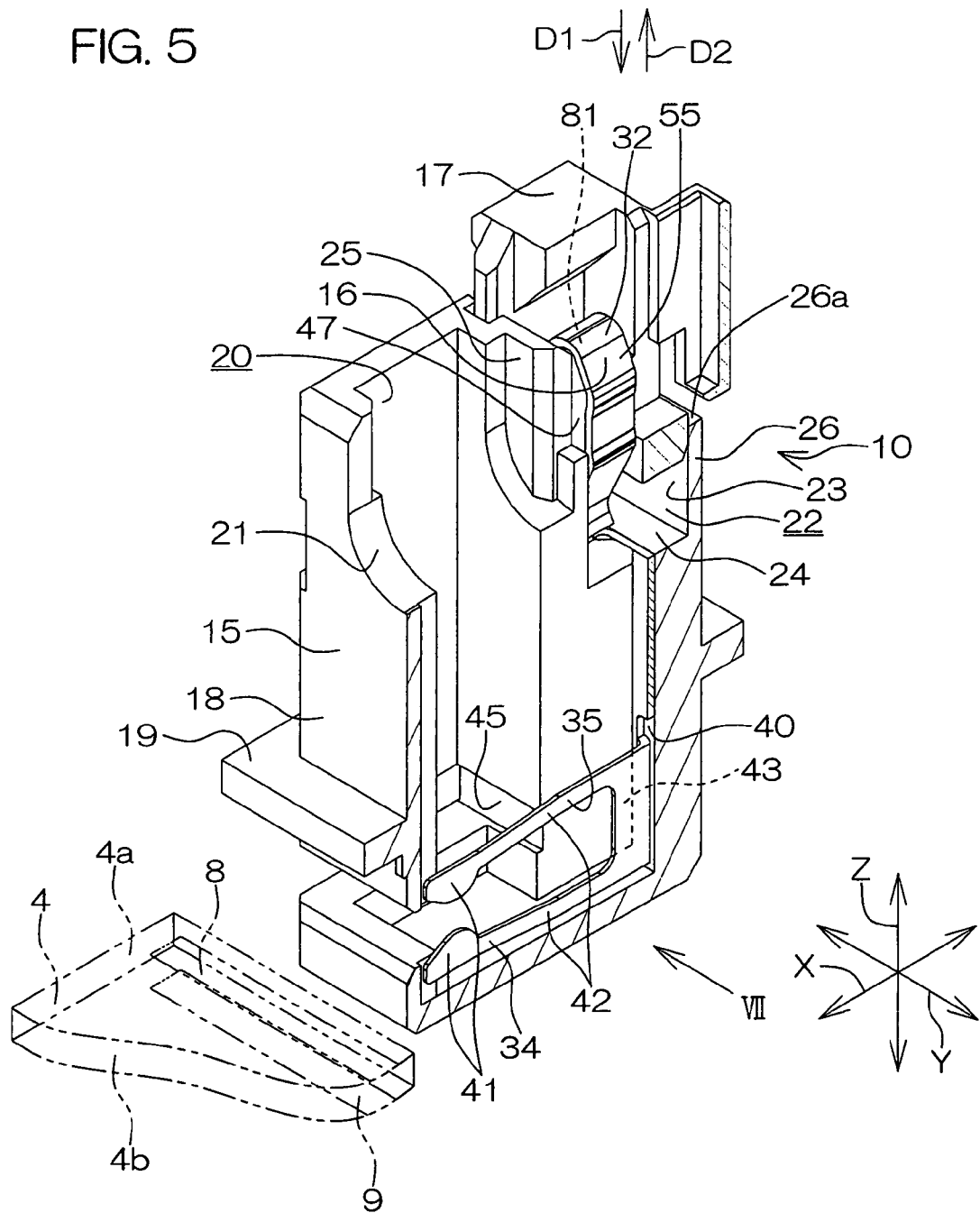
FIG. 5 is a sectional perspective view taken along the line V-V of FIG. 4.
Figure 6:
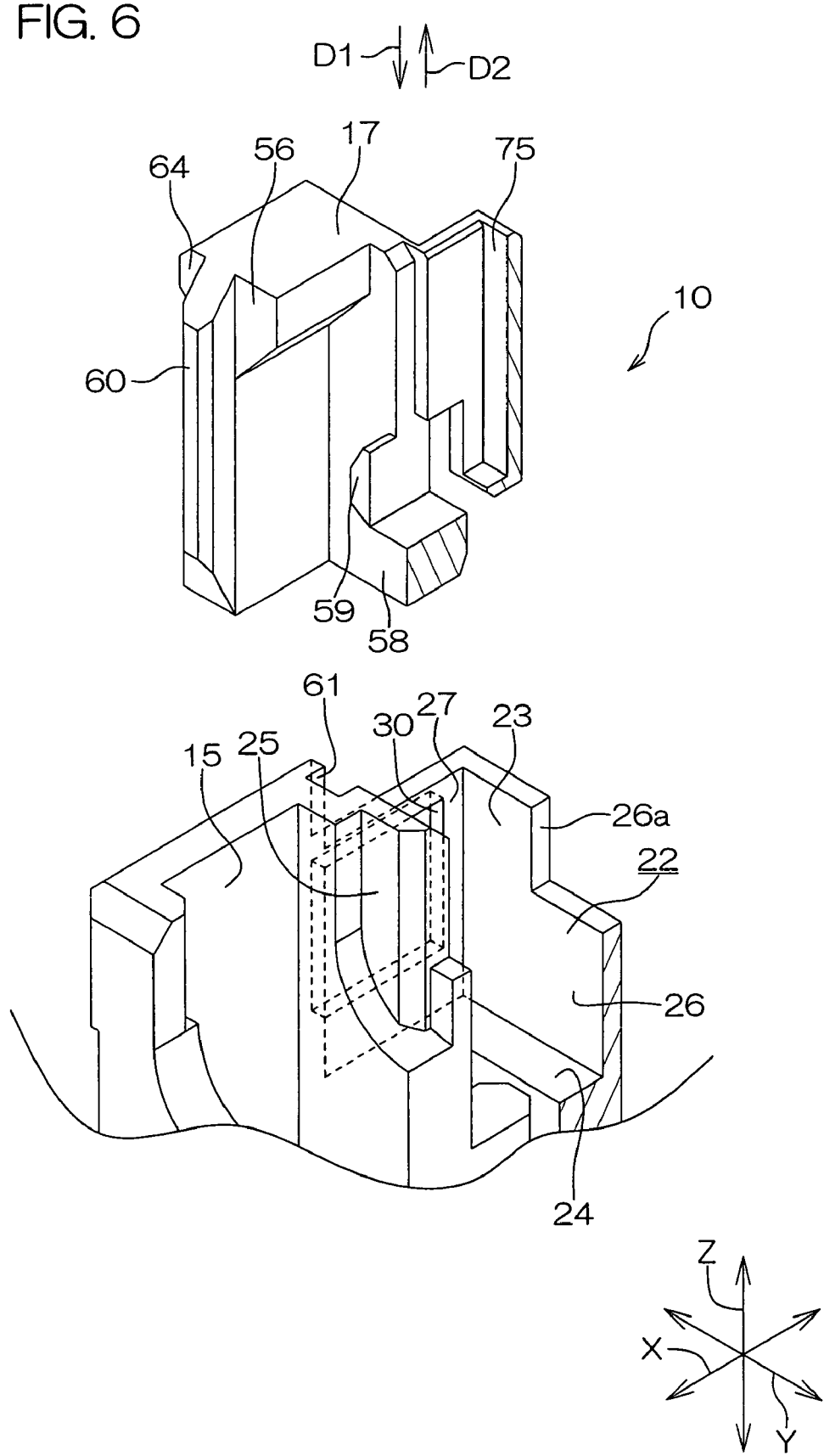
FIG. 6 is an exploded perspective view of a main part of the connector.
Figure 7:
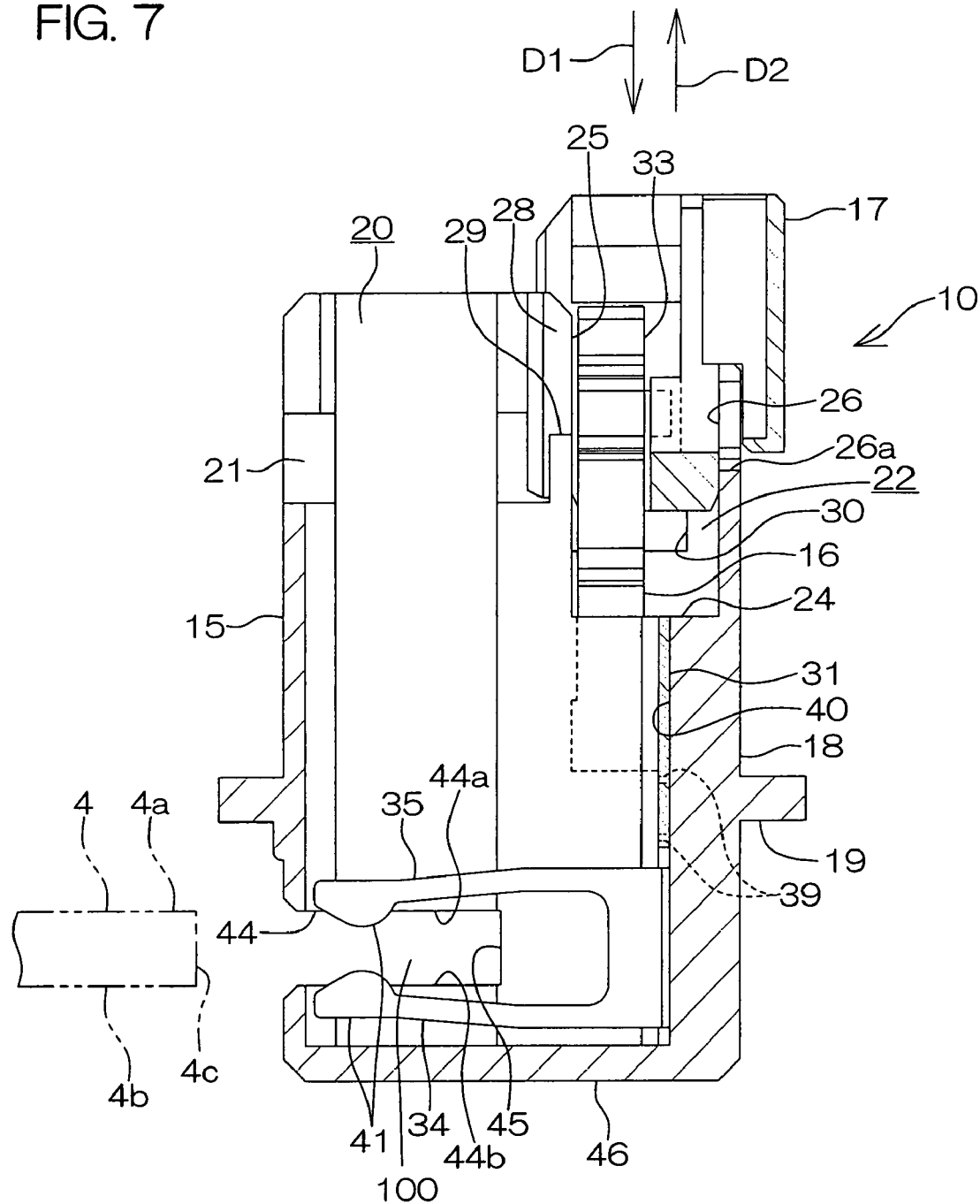
FIG. 7 is a sectional view of the connector as it is viewed along the arrow direction VII in FIG. 5.

FIG. 2 is a perspective view of a main part of the circuit board 4, the composite connector 6 and the cold-cathode tubes 5. FIG. 3 is a partial exploded perspective view of the composite connector 6. FIG. 4 is a perspective view of the single connector 10. FIG. 5 is a sectional perspective view taken along the line V-V of FIG. 4. FIG. 6 is an exploded perspective view of a main part of the connector 10. FIG. 7 is a sectional view of the connector 10 as it is viewed along the arrow direction VII in FIG. 5.

Referring to FIG. 2, in the following, the direction along the longitudinal direction of the cold-cathode tubes 5 (corresponding to the right/left direction along the housing 2) will be referred to as the X-direction (the direction X), and of the directions orthogonal to the X-direction, the direction which corresponds to the up/down direction along the housing 2 will be referred to as the Y-direction (the direction Y) and the direction which is orthogonal to both the X-direction and the Y-direction will be referred to as the Z-direction (the direction Z corresponding to the front/back direction along the housing 2).

Each cold-cathode tube 5 includes a cylindrical main body part 12 which extends straight in the X-direction and outer leads 14 and 14 (electrodes) which serve a pair of terminals and are disposed respectively at a pair of ends 13 and 13 of the main body part 12.

The main body part 12 is a glass member having a diameter of about a few mm through ten and few mm for instance. The pair of outer leads 14 and 14 are shaft-shaped conductive members of metal which may be soft iron or the like, and are respectively exposed from the corresponding ends 13 in the X-direction. The diameter of the outer leads 14 is generally 1 mm and the length thereof is generally a few mm, for example. A middle portion of the main body part 12 in the X-direction is received by a support member 150. Alternatively, the support member 150 may be omitted and a housing 15 described later of the connector 10 may receive the end of the main body part 12.

When moved in a first direction D1 which is an attaching direction corresponding to a radial direction of the outer lead 14, each cold-cathode tube 5 is attached to the corresponding connector 10. Further, when moved in a second direction D2 (detaching direction) which is the opposite direction of the first direction D1, each cold-cathode tube 5 is detached from the corresponding connector 10.

As described earlier, the respective connectors 10 are lined up at predetermined intervals along the Y-direction (aligning direction). Each connector 10 is provided to correspond to the pair of outer leads 14 of each cold-cathode tube 5. The structures of the respective connectors 10 are similar, and therefore, one of the connectors 10 will be mainly described below.

Referring to FIG. 4 and FIG. 5, the connector 10 has the lengths of about 10 through 15 mm along the X-, Y- and Z-directions, respectively. The connector 10 includes the housing 15, a contact 16 which is a composite contact as a fluorescent tube connecting contact and a circuit board connecting contact held by the housing 15, and an operation member 17 for operating the contact 16.

The housing 15 is generally symmetric with respect to the Y-direction. Although FIG. 5 partially shows the housing 15, the remaining part is shaped symmetric to the portion appearing in FIG. 5 with respect to the Y-direction. The housing 15 is an integrated molded component of a synthetic resin and includes a main body part 18 and a flange part 19 extending from the main body part 18.

The main body part 18 is generally in a box shape. Of tip ends of the main body part 18 with respect to the second direction D2, the portions on the side near to the main body part 12 of the cold-cathode tube 5 with respect to the X-direction is formed with introduction cavity 20. The introduction cavity 20 is for introducing the corresponding end 13 of the cold-cathode tube 5. Arc-shaped peripheral surface 21 partially defining the introduction cavity 20 surrounds and protects the end 13. The peripheral surface 21 is capable of supporting the end 13.

Of the tip ends of the main body part 18 with respect to the second direction D2, the portions on the far side from the main body part 12 of the cold-cathode tube 5 with respect to the X-direction is formed with a receiving cavity 22. The receiving cavity 22 is for receiving the corresponding outer leads 14 of the cold-cathode tube 5 with respect to the first direction D1, and is formed in a generally rectangular shape.

Referring to FIG. 5 and FIG. 6, a peripheral wall 23 and a bottom wall 24 define the receiving cavity 22. The peripheral wall 23 includes a first and a second side portions 25 and 26 which are opposed to each other in the X-direction and a pair of third side portions 27 which are opposed to each other in the Y-direction (FIG. 6 shows only one of the third side portions 27).

Referring to FIG. 4, the first side portion 25 partitions the introduction cavity 20 from the receiving cavity 22. The first side portion 25 includes first and second parts 25*a* and 25*b* which are shaped symmetric with respect to the Y-direction. An insertion inlet 28 is provided between the first and second parts 25*a* and 25*b*. The insertion inlet 28 is opened to the second direction D2 and can allow receiving the corresponding outer leads 14 to pass therethrough along the Z-direction.

The first and second parts 25*a* and 25*b* include stopper portions 29 facing the insertion inlet 28, respectively (FIG. 4 shows only one of the stopper portions 29). The stopper portions 29 receive the outer leads 14 when the outer leads 14 tilts against the housing 15, and prevents the outer leads 14 from further tilting.

In this context, the state that "the outer leads 14 tilts against the housing 15" includes at least one of the state that the entire cold-cathode tube 5 (the main body part 12 and the outer leads 14) tilts against the housing 15 (circuit board) and the state that although the main body part 12 of the cold-cathode tube 5 does not tilt against the housing 15 (i.e., is parallel to the circuit board), the outer leads 14 tilts against the main body part 12.

Referring to FIG. 5 and FIG. 6, the second side portion 26 is formed lower than the first side portion 25 with respect to the second direction D2. A middle portion of the second side portion 26 with respect to the Y-direction includes a concave part 26*a* which is opened in the second direction D2. A part of the operation member 17 is to be introduced into the concave part 26*a*.

The third side portions 27 are formed flush with the second side portion 26 with respect to the second direction D2. Through hole 30 is provided in each one of the third side portions 27 (FIG. 6 shows only one of the through holes 30). The through holes 30 can receive insertion of first and second convex parts 65 and 68 described later of the operation member 17. The bottom wall 24 is contiguous with the first through third side portions 25, 26 and 27, thereby defining the bottom of the receiving cavity 22.

Figure 8:
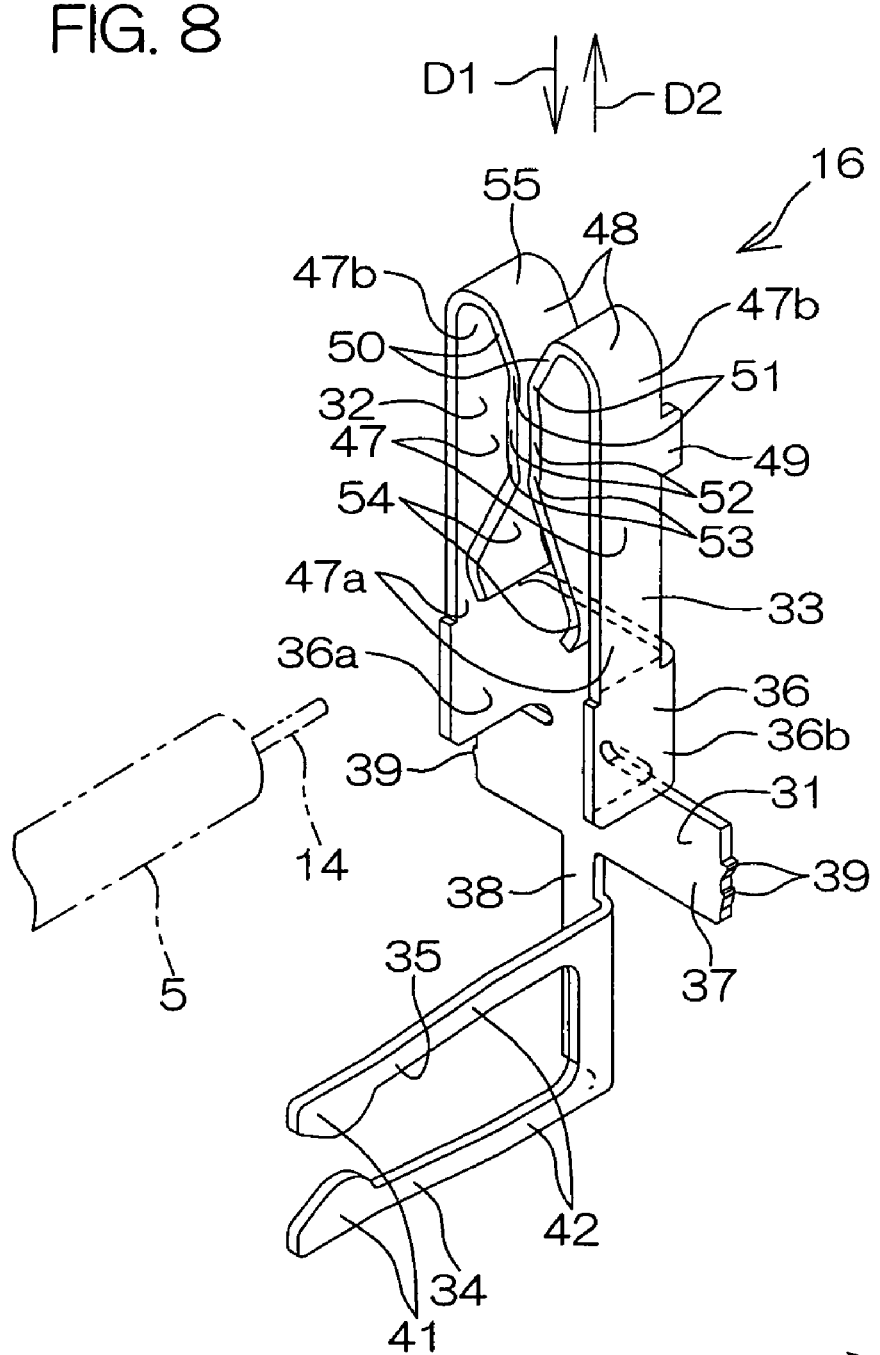
FIG. 8 is a perspective view of a contact.

FIG. 8 is a perspective view of the contact 16. Referring to FIG. 5 and FIG. 8, the contact 16 is electrically connected with the corresponding outer leads 14 of the cold-cathode tube 5 and also electrically connected with the conductive patterns 8 and 9 of the circuit board 4. This attains electric connection between the corresponding outer leads 14 of the cold-cathode tube 5 and the circuit board 4.

The contact 16 is a plate-shaped member formed as one integrated piece by a single conductive member of metal or the like, and includes a main body part 31, a pair of first elastic pieces 32 and 33 which extend from the main body part 31 and a pair of second elastic pieces 34 and 35 which extend from the main body part 31.

The main body part 31 includes an upper portion 36 which connects the a pair of first elastic pieces 32 and 33, a middle portion 37 which is located on the downstream side of the first direction D1 with respect to the upper portion 36, and a lower portion 38 which is located on the downstream side of the first direction D1 with respect to the middle portion 37.

The upper portion 36 is in U shape when viewed along the Z-direction. Of the upper portion 36, a pair of portions 36*a* and 36*b* which are opposed to each other in the Y-direction are connected respectively with the corresponding first elastic pieces 32 and 33. The upper portion 36 is shaped symmetric with respect to the Y-direction.

The middle portion 37 is shaped symmetric in the Y-direction and wider than the upper portion 36 with respect to the Y-direction. The pair of ends of the middle portion 37 with respect to the Y-direction have engaging convex parts 39 for engagement with the housing 15.

The lower portion 38 is shaped thin and long in the Z-direction and contiguous with a general center of the middle portion 37 with respect to the Y-direction.

The housing 15 holds the main body part 31. More specifically, as shown in FIG. 5 and FIG. 7, the main body part 31 is accommodated in a holding groove 40 which is formed in the main body part 18 of the housing 15.

The holding groove 40 extends from the bottom wall 24 in the first direction D1. The respective engaging convex parts 39 of the middle portion 37 are frictionally engaged respectively with mutually opposed portions of the peripheral surface of the holding groove 40. This makes the housing 15 hold the main body part 31 of the contact 16.

Referring to FIG. 5 and FIG. 8 once again, the pair of second elastic pieces 34 and 35 are for elastic contact and electric connection with the conductive patterns 8 and 9 which are formed respectively on the front surface 4a and the back surface 4b of the circuit board 4, and are shaped like forks. The pair of second elastic pieces 34 and 35 pinch the front surface 4a and the back surface 4b of the circuit board 4. Via the conductive patterns 8 and 9 of the circuit board 4, the pair of second elastic pieces 34 and 35 are electrically connected with the inverter circuit described above.

Each one of the second elastic pieces 34 and 35 extends thin and long in the X-direction, and its base end is continuous with the lower portion 38. The front end 41 of each one of the second elastic pieces 34 and 35 is formed larger relative to its middle portion 42, and the front ends 41 are close to each other in the Z-direction. The front ends 41 are opposed respectively against the corresponding front surface 4a and back surface 4b of the circuit board 4, and contact the corresponding conductive patterns 8 and 9.

Opposed parts 43 of the housing 15 pinch the respective middle portions 42 in the Y-direction (FIG. 5 shows only one of the opposed parts 43). This ensures that the second elastic pieces 34 and 35 are received by the opposed parts 43 and do not fall over when subjected to force in the Y-direction.

Referring to FIG. 7, an insertion space 100 for insertion of the circuit board 4 is defined between the second elastic pieces 34 and 35. It is possible to slide and insert the circuit board 4 into the insertion space 100 along the X-direction which serves as a predetermined insertion direction.

The tip ends 41 of the second elastic pieces 34 and 35 face insertion concave portions 44 which are formed in the main body part 18 of the housing 15. The insertion concave portions 44 are formed on the tip end side of the main body part 18 of the housing 15 with respect to the first direction D1. It is possible to insert the circuit board 4 into the insertion concave portions 44 along the X-direction described above which serves as a slide direction (i.e., the direction which is orthogonal to the aligning direction of the connectors 10. insertion direction.). The insertion direction concave portions 44 of each connector 10 are open in the same direction.

With respect to the X-direction, the length of the insertion concave portions 44 is generally half the length of the main body part 18 of the housing 15. With respect to the Y-direction, the insertion concave portions 44 penetrate the main body part 18 of the housing 15. With respect to the Z-direction, the length of the insertion concave portions 44 is generally the same as or slightly greater than the thickness of the circuit board 4.

The insertion concave portions 44 have receiving parts 45 for receiving mutually opposed end surface 4c of the circuit board 4. Of the insertion concave portion 44, a pair of surfaces 44a and 44b which are opposed to each other in the Z-direction receive the corresponding front surface 4a and back surface 4b of the circuit board 4. With the structure described above, as the receiving parts 45 receive the circuit board 4, the housing 15 and the circuit board 4 are positioned in the X-direction and the Z-direction.

A bottom portion 46 of the housing 15 is disposed in the vicinity of one second elastic piece 34 and covers the bottom surface of the housing 15.

Referring to FIG. 5 and FIG. 8, the pair of first elastic pieces 32 and 33 are for attaching (i.e., elastically contacting) the outer leads 14 of the corresponding cold-cathode tube 5 and attaining electric connection with the outer leads 14. The pair of first elastic pieces 32 and 33 are shaped symmetric with respect to the Y-direction.

The pair of first elastic pieces 32 and 33 extend respectively from the corresponding portions 36a and 36b of the upper portion 36 of the main body part 31 in the second direction D2. The pair of first elastic pieces 32 and 33 are opposed to each other in the Y-direction and project into the receiving cavity 22. The pair of first elastic pieces 32 and 33 are exposed to the receiving cavity 22 generally entirely.

The pair of first elastic pieces 32 and 33 include first pieces 47, which extend from the corresponding portions 36a and 36b of the upper portion 36 of the main body part 31 along the second direction D2, and second pieces 48 which are bent back from the tip ends 47b of the corresponding first pieces 47 and extend along the first direction D1. With respect to the Y-direction, the pair of first pieces 47 are located relatively far from each other and the paired second pieces 48 are located relatively close to each other.

The paired first pieces 47 of the first elastic pieces 32 and 33 can come close to each other and move away from each other elastically about base end parts 47a. When in their free state (that is, the state under no external force), the first pieces 47 are parallel to each other.

The tip ends 47b of the respective first pieces 47 have engaging parts 49 for engagement with expanding/opening operation parts 59 described later (FIG. 8 shows only one of the engaging parts 49). Each engaging part 49 is formed of a small piece which projects from the tip end 47b of the corresponding first piece 47 toward one side of the X-direction.

Each second piece 48 includes a bent part 50 which is continuous with the tip end 47b of the corresponding first piece 47, a first narrow part 51, a linear part 52 (contact part) which serves as a pinching part for pinching the outer leads 14 radially, a second narrow part 53 and a tip end part 54.

In one side surfaces (outer side surfaces) of the pair of bent parts 50, guide parts 55 which guide attaching of the outer leads 14 are provided (FIG. 5 and FIG. 8 show only one of the guide parts 55). A pair of the guide parts 55 are located closer to each other in the first direction D1.

A pair of the first narrow parts 51 are for preventing the corresponding outer leads 14 from inadvertently falling off from the pair of the linear parts 52 in the second direction D2. The pair of the first narrow parts 51 are disposed at the tip ends of the pair of bent parts 50 with respect to the first direction D1.

The distance between the pair of the first narrow parts 51 is narrower than that between the pair of guide parts 55 and narrower than that between the pair of linear parts 52. When the pair of first elastic pieces 32 and 33 come close to each other, the distance between the pair of first narrow parts 51 becomes smaller than the diameter of the outer leads 14.

The pair of linear parts 52 are for permitting the corresponding outer leads 14 to move relatively in the first and second directions D1 and D2 (Z-direction) while achieving electric connection with the corresponding outer leads 14.

Each linear part 52 is located on the side of the first direction D1 relative to the corresponding first narrow part 51. When in their free state, the respective linear parts 52 extend along the Z-direction and are opposed to and parallel to each other.

The pair of second narrow parts 53 are for preventing the corresponding outer leads 14 from inadvertently falling off from the pair of linear parts 52 in the first direction D1. The pair of second narrow parts 53 are located on the side of the first direction D1 relative to the pair of linear parts 52.

The distance between the pair of second narrow parts 53 is narrower than that between the pair of linear parts 52. When the pair of first elastic pieces 32 and 33 come close to each other, the distance between the pair of second narrow parts 53 becomes smaller than the diameter of the outer leads 14.

The pair of tip end parts 54 are provided on the side of the first direction D1 relative to the corresponding second narrow parts 53. These tip end parts 54 are for reducing the distance between the pair of linear parts 52 when pressed by the corresponding first pieces 47. This makes it possible for the pair of linear parts 52 to more pinch the outer leads 14. This also prevents a decrease in the pinching force due to settling (fatigue) of the pair of first elastic pieces 32 and 33.

When viewed along the X-direction, the pair of tip end parts 54 are shaped like the two opposite slopes of a hill, and the distance between them increases in the first direction D1. The tip ends of the respective tip end parts 54 in the first direction D1 are bent so as to be closer to each other and capable of smoothly engaging with the corresponding first pieces 47.

Error! Bookmark not defined. The operation member 17 makes the pair of linear parts 52 pinch the outer leads 14 and releases this firm pinching, and is fit into the receiving cavity 22 of the housing 15 so that it can move relatively in the first and second directions D1 and D2.

Figure 9:
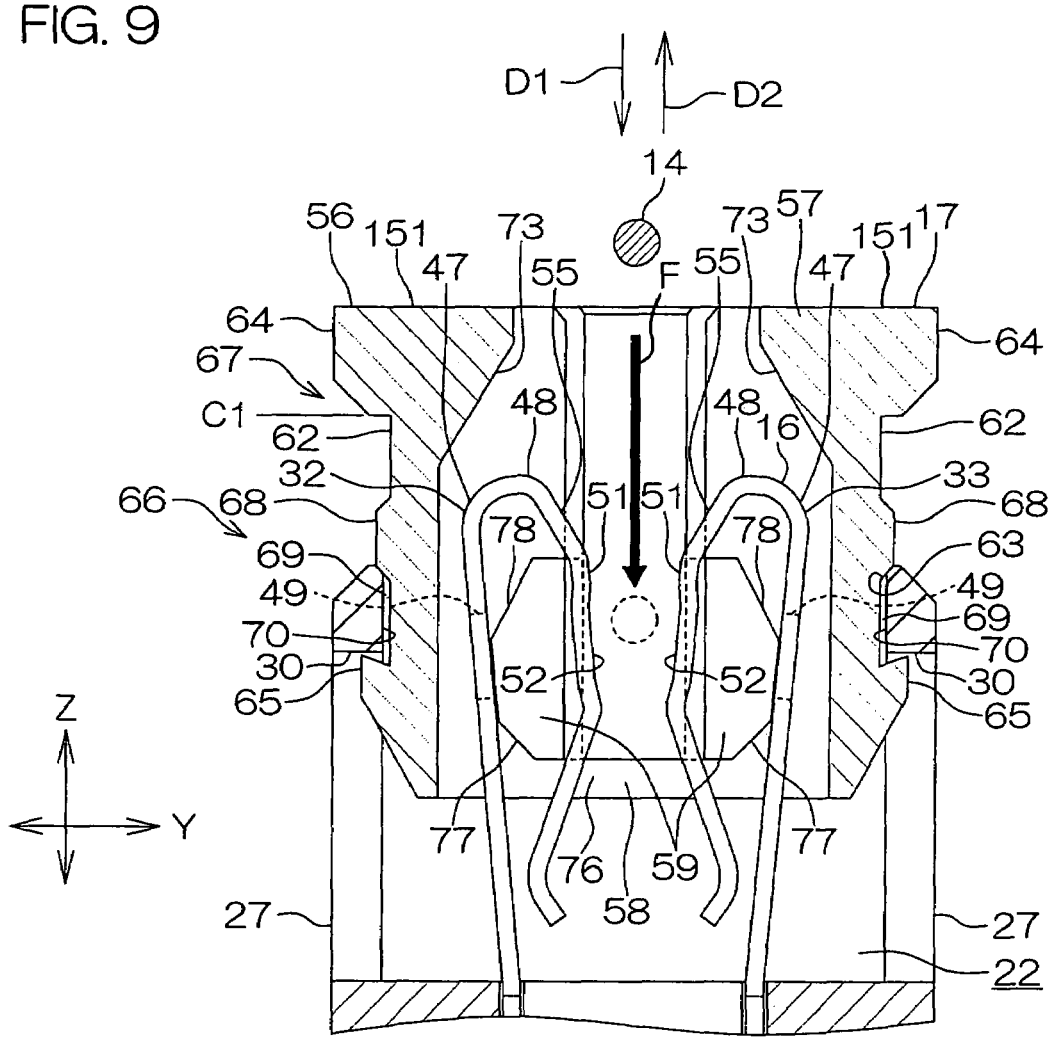
FIG. 9 is a sectional view of a main part taken along the line IX-IX of FIG. 3, showing a state where outer leads are not connected with the contact.
Figure 10:
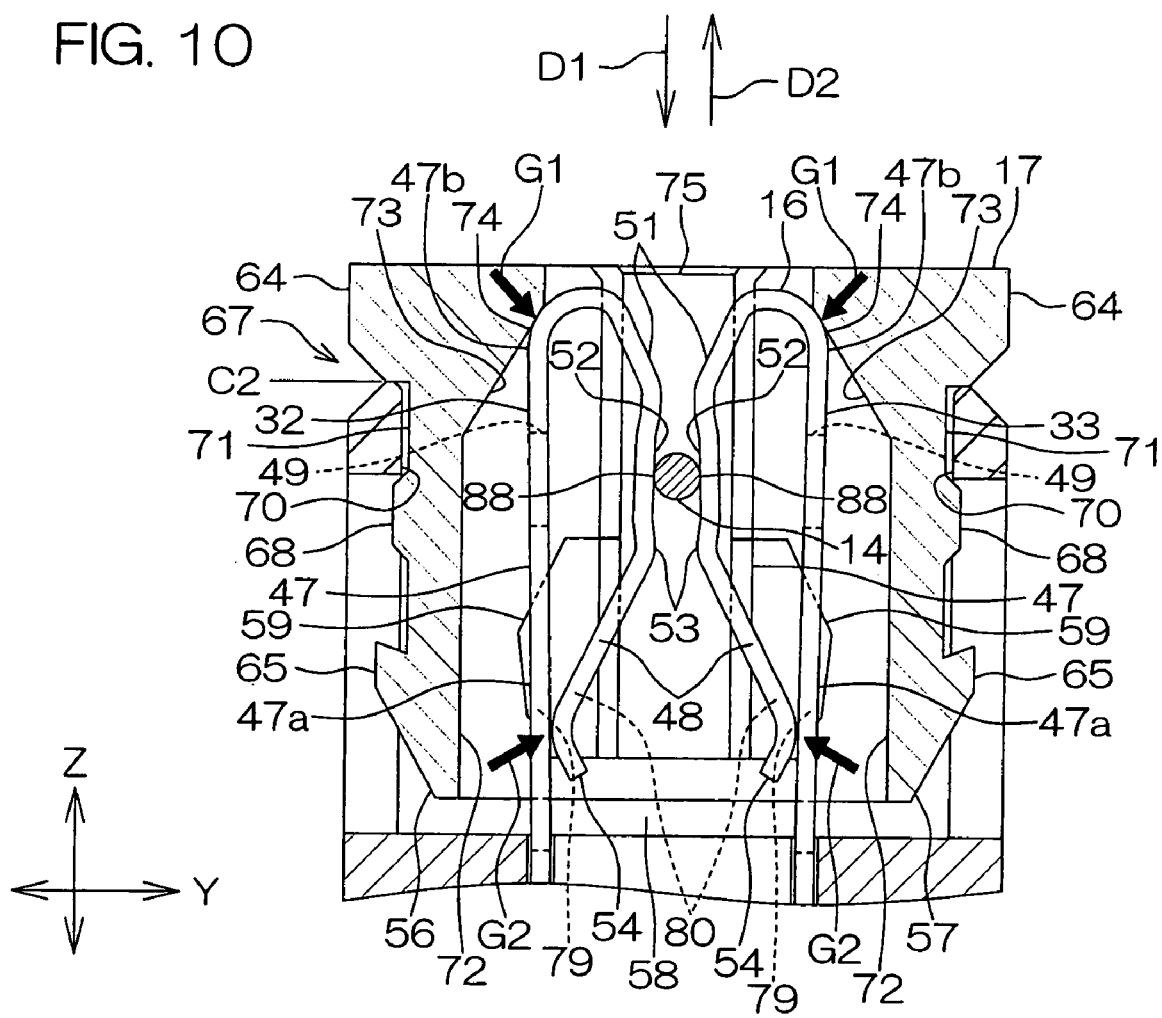
FIG. 10 is a sectional view of a main part taken along the line X-X of FIG. 2, showing a state where outer leads are connected with the contact.

FIG. 9 is a sectional view of a main part taken along the line IX-IX of FIG. 3, showing a state where the outer leads 14 are not connected with the contact 16. FIG. 10 is a sectional view of a main part taken along the line X-X of FIG. 2, showing a state where the outer leads 14 are connected with the contact 16.

Referring to FIG. 6 and FIG. 9, the operation member 17 is a molded resin component which is shaped symmetric with respect to the Y-direction. The operation member 17 includes a pair of parts 56 and 57 which are opposed to each other in the Y-direction with a gap, a linking part 58 which links the pair of parts 56 and 57, and the pair of expanding/opening operation parts 59 which are provided on the linking part 58.

The pair of parts 56 and 57 are disposed so as to sandwich the pair of first elastic pieces 32 and 33 inside the receiving cavity 22. The pair of third side portions 27 of the peripheral wall 23 sandwich the pair of parts 56 and 57. The pair of parts 56 and 57 each extend along the Z-direction.

Convex ridges 60 opposed to the first side portion 25 of the peripheral wall 23 are formed in the pair of parts 56 and 57 (FIG. 6 shows only one of the convex ridges 60). The convex ridges 60 extend in the Z-direction and engage with guide grooves 61 which are formed in the first side portion 25. This ensures guiding of the operation member 17 in the Z-direction relative to the housing 15.

The tip ends on the side of the second direction D2 of outer side surfaces 62 of the pair of parts 56 and 57 protrude outside with respect to the peripheral edge 63 of the opening of the receiving cavity 22 in the Y-direction, and the protruding portions serve as tab parts 64. An operator can hold the tab parts 64 and operate the operation member 17.

A pressed parts 151 is provided with each one side surface of the pair of the parts 56 and 57. Press the pressed parts 151 along the first direction D1, the operation member 17 can be operated.

The ends on the side of the first direction D1 of the pair of outer side surfaces 62 have first convex parts 65, respectively. The pair of first convex parts 65 are for preventing the operation member 17 from inadvertently falling off from the receiving cavity 22.

Each first convex part 65 is fit into the corresponding through hole 30 of the peripheral wall 23, and when received by the peripheral edge of the corresponding through hole 30, it prevents the operation member 17 from falling off from the receiving cavity 22.

The tip on the side of end the first direction D1 of each first convex part 65 is inclined. Thus, this inclined portion smoothly engages with the peripheral edge 63 of the opening of the peripheral wall 23 when the operation member 17 is fitted into the receiving cavity 22, and each first convex part 65 is inserted into the corresponding through hole 30.

Referring to FIG. 9, first and second holding mechanisms 66 and 67 are provided on the connector 10. The first holding mechanism 66 is for holding the operation member 17 at an expanding/opening position serves as a first position. The expanding/opening position is a position at which the operation member 17 enlarges the distance between the pair of first elastic pieces 32 and 33 relatively wide.

The first holding mechanism 66 includes first concave parts 69 which are defined between the first convex parts 65 and the second convex parts 68 of the operation member 17 and engaging parts 70 which are respectively formed in the pair of third side portions 27 of the peripheral wall 23 and engage with the corresponding first concave parts 69.

The second convex parts 68 are respectively formed in the pair of outer side surfaces 62 of the operation member 17 and located between the corresponding first convex parts 65 and tab parts 64.

The engaging parts 70 include, in the pair of respective third side portions 27 of the peripheral wall 23, portions which are located on the side of the second direction D2 relative to the through holes 30. When the operation member 17 is located at the expanding/opening position, the engaging parts 70 are fit into the first concave parts 69.

Referring to FIG. 10, the second holding mechanism 67 is for holding the operation member 17 at an expansion releasing position serves as a second position. The expansion releasing position is a position at which the operation member 17 relatively reduces the distance between the pair of first elastic pieces 32 and 33.

The second holding mechanism 67 includes second concave parts 71 which are defined between the second convex parts 68 and the tab parts 64 of the operation member 17, and the engaging parts 70. The engaging parts 70 form a part of the first holding mechanism 66 and also form a part of the second holding mechanism 67. When the operation member 17 is located at the expansion releasing position, the engaging parts 70 are fit into the second concave parts 71.

Inner side surfaces 72 of the pair of parts 56 and 57 are opposed to each other in the Y-direction with a predetermined gap, and sandwich the pair of first elastic pieces 32 and 33. The tip ends on the side of the second direction D2 of the inner side surfaces 72 of the pair of parts 56 and 57 are inclined cam surfaces. The inclined cam surfaces become closer to each other in the second direction D2.

The inclined cam surfaces act as pressing parts 73. The pair of pressing parts 73 are capable of pressing pressed parts 74 which are formed in the tip ends 47*b* of the corresponding first pieces 47 of the pair of first elastic pieces 32 and 33.

At the expansion releasing position, as the pair of pressing parts 73 abut against and press the corresponding pressed parts 74, the distance between the pair of linear parts 52 decreases and these linear parts 52 more firmly pinch the outer leads 14. This also prevents a decrease in the pinching force due to settling of the pair of first elastic pieces 32 and 33.

When the operation member 17 shifts to the expansion releasing position (FIG. 10) from the expanding/opening position (FIG. 9) along the first direction D1, the pair of pressing parts 73 abut against and press the corresponding pressed parts 74. This transfers the force with which the pair of pressing parts 73 press the corresponding pressed parts 74 in the first direction D1 into force in the Y-direction which is orthogonal to the first direction D1. The pair of first elastic pieces 32 and 33 consequently move closer to each other and press the outer leads 14.

Referring to FIG. 6 and FIG. 10, the linking part 58 links one ends of the pair of parts 56 and 57 to each other in the X-direction. A protruding part 75 which projects from the receiving cavity 22 toward one side of the X-direction is formed in the linking part 58. The protruding part 75 is opposed to the concave part 26*a* in the second side portion 26 of the peripheral wall 23 in the Z-direction. At the expansion releasing position, the protruding part 75 is received by the concave part 26*a*.

Referring to FIG. 8 and FIG. 9, the pair of expanding/opening operation parts 59 are for enlarging the distance between the pair of linear parts 52 by engaging with the corresponding engaging parts 49 of the pair of first elastic pieces 32 and 33, and are formed of small pieces which are provided on inner side surfaces 76 of the linking part 58. The pair of expanding/opening operation parts 59 are lined up in the Y-direction and sandwiched between the pair of engaging parts 49.

Each one of the pair of expanding/opening operation parts 59 includes a first inclined cam surface 77 formed at the tip end in the first direction D1 and a second inclined cam surface 78 formed at the tip end in the second direction D2.

The pair of first inclined cam surfaces 77 are for expanding the distance between the pair of engaging parts 49 when the operation member 17 is fit into the receiving cavity 22 in the first direction D1, and become closer to each other toward the first direction D1.

The pair of first inclined cam surfaces 77 abut against the corresponding engaging parts 49 and increases the distance between the pair of engaging parts 49, as the operation member 17 shifts in the first direction D1.

The pair of second inclined cam surfaces 78 abut against the corresponding engaging parts 49 and increase the distance between the pair of engaging parts 49, as the operation member 17 moves in the second direction D2 and shifts from the expansion releasing position to the expanding/opening position. The distance between the pair of second inclined cam surfaces 78 is progressively narrower toward the second direction D2.

The pair of second inclined cam surfaces 78 abut against the corresponding engaging parts 49 and increases the distance between the pair of engaging parts 49, as the operation member 17 shifts to the expanding/opening position.

Referring to FIG. 10, each expanding/opening operation part 59 includes a first restricting part 79. When the operation member 17 is at the expansion releasing position, each first restricting part 79 restricts the corresponding first piece 47 from shifting toward one side of the X-direction (which is the direction along the axial direction of the outer leads 14, and is the back side in the plane of FIG. 10).

At the expansion releasing position, each first restricting part 79 is opposed to the base end part 47*a* of the corresponding first piece 47 and restricts the corresponding first piece 47 from moving toward one side of the X-direction.

Each expanding/opening operation part 59 includes a second restricting part 80. The second restricting parts 80 are for restricting the corresponding second pieces 48 from shifting toward one side of the X-direction (which is the direction along the axial direction of the outer leads 14, and is the back side in the plane of FIG. 10) when the operation member 17 is at the expansion releasing position.

At the expansion releasing position, each second restricting part 80 is opposed to the tip end part 54 of the corresponding second piece 48 and restricts the corresponding second piece 48 from moving toward one side of the X-direction.

Referring to FIG. 5, the first side portion 25 of the peripheral wall 23 includes a third restriction part 81. The third restriction part 81 is for restricting each one of the pair of first elastic pieces 32 and 33 from shifting toward the other side of the X-direction (i.e., toward the main body part of the cold-cathode tube). The third restriction part 81 is opposed to the pair of first elastic pieces 32 and 33 and restricts these first elastic pieces 32 and 33 from moving toward the other side of the X-direction.

Referring to FIG. 9 and FIG. 10, the expanding/opening position can be said to be a position at which the expanding/opening operation parts 59 expand the distance between the pair of linear parts 52 so as to be able to insert the outer leads 14 between the pair of linear parts 52 without exerting insertion force (with zero insertion force). The expansion releasing position C2 can be said to be a position at which this expansion is released.

Figure 11:
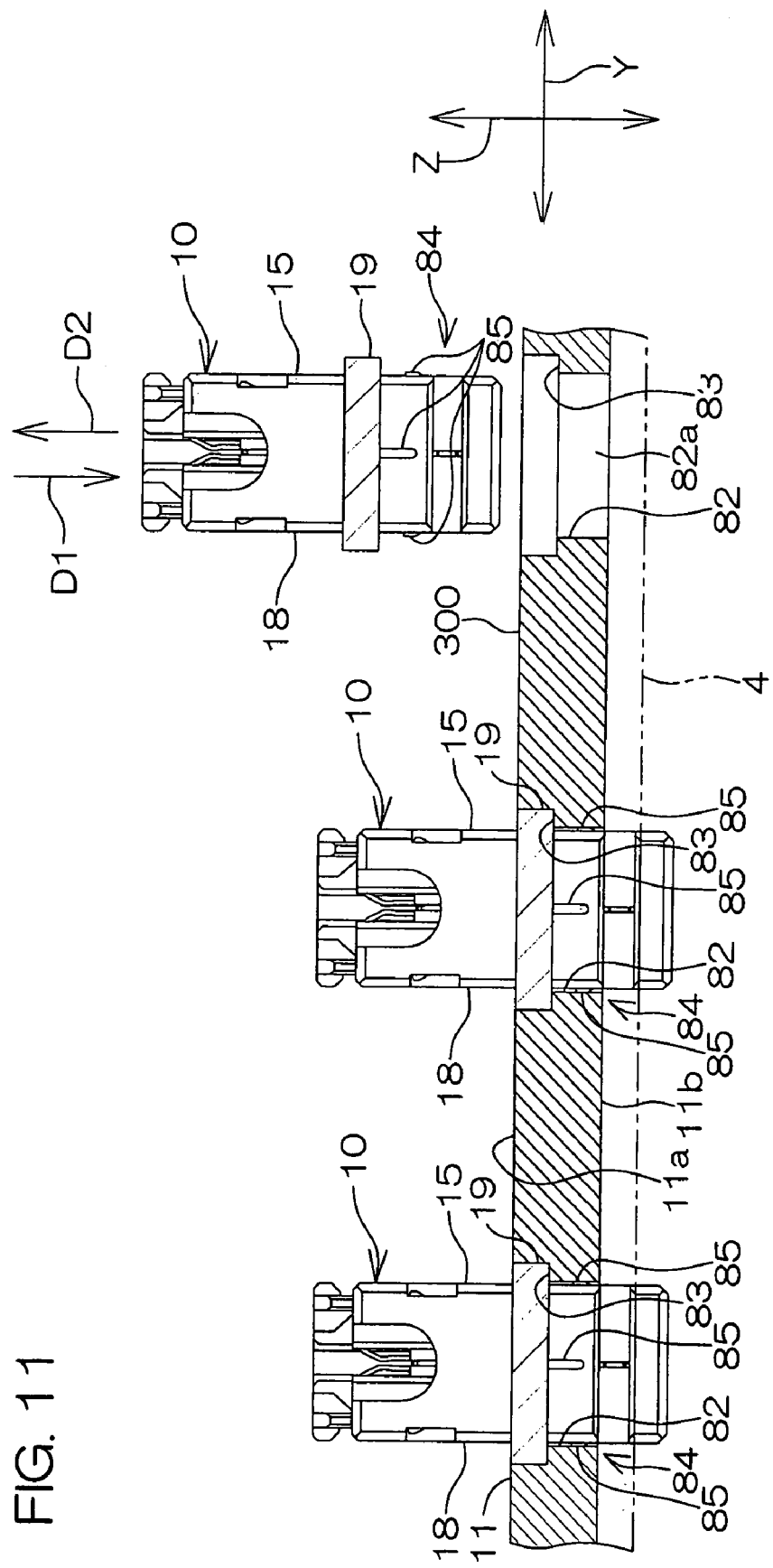
FIG. 11 is a sectional view taken along the line XI-XI of FIG. 3.

FIG. 11 is a sectional view taken along the line XI-XI of FIG. 3. Referring to FIG. 3 and FIG. 11, the holder 11 is made of a synthetic resin or the like and includes a main body 300 which is long in the Y-direction and in a plate shape. The main body 300 of the holder 11 includes a tip surface 11*a* and a back surface 11*b* which are opposed to each other in the Z-direction, and the front surface 11*a* and the back surface 11*b* are generally parallel to each other.

In the Z-direction, the main body 300 of the holder 11 is formed thicker than the circuit board 4 and has a thickness which is double or more of the thickness of the circuit board 4, for example. This sufficiently strengthens the circuit board 4 when the holder 11 is positioned along the circuit board 4. The thickness of the holder 11 may be less than double of the thickness of the circuit board 4. In the Y-direction, the length of the holder 11 is generally the same as that of the circuit board 4.

A plurality of attaching holes 82 are provided in the main body 300 of the holder 11 for attaching the plurality of connectors 10. Each attaching hole 82 is formed to correspond to the corresponding connector 10.

Each attaching hole 82 are lined up along a longitudinal direction of the main body 300.

The main body part 18 of the housing 15 of the corresponding connector 10 is inserted into each attaching hole 82. The flange part 19 of the housing 15 is received by a stepped portion 83 which protrudes from a peripheral surface 82*a* of the attaching hole 82. The stepped portion 83 is disposed along at least a part of the circumferential direction of the peripheral surface 82*a* (in this embodiment, along the entire periphery).

A lock mechanism 84 which is for locking the housing 15 of each connector 10 is provided in such a manner that the housing can be detached from the corresponding attaching hole 82. More specifically, an engaging convex part 85 is formed in the housing 15 of each connector 10. The engaging convex part 85 is located near the tip end of the flange part 19 of the main body part 18 of each housing 15 in the first direction D1.

The engaging convex parts 85 are provided in each of the four side surfaces of the main body part 18. Alternatively, the engaging convex parts 85 may be formed in only any one, two or three side surfaces of the four side surfaces mentioned above.

As the corresponding connector 10 is pushed in each attaching hole 82 in the first direction D1 which serves as the insertion direction, the corresponding connector 10 is attached. As a result, the corresponding flange part 19 abuts against the stepped portion 83 of each attaching hole 82, and the corresponding engaging convex parts 85 is brought into pressure contact to the peripheral surface 82a of each attaching hole 82. This consequently positions and locks the housing 15 of the corresponding connector 10 in each attaching hole 82. Locking of both is attained as the connector 10 is pushed into the corresponding attaching hole 82 along the first direction D1.

In a condition that the housing 15 of each connector 10 and the holder 11 are locked, each connector 10 covers the corresponding attaching hole 82 with its main body part 18 and its flange part 19. The main body part 18 and the flange part 19 of the housing 15 of the connector 10 thus form a dust-proof structure which covers and protect the attaching hole 82 against dust. The flange part 19 may be formed so as to cover only a part of the peripheral edge of the corresponding attaching hole 82 of the holder 11.

Error! Bookmark not defined. To detach the housing 15 of the corresponding connector 10 from each hole 82, the corresponding connector 10 is pulled in the second direction D2. At this time, the engaging convex part 85 is pulled in the second direction D2 while causing to frictional resistance against the peripheral surface 82a of the attaching hole 82.

In the liquid crystal display device having the structure outlined above, the outer leads 14 of the cold-cathode tube 5 and the circuit board 4 are electrically connected each other in the following fashion. That is, the holder 11 and the plurality of connectors 10 are prepared, first.

Next, the respective connectors 10 are assembled with the holder 11, thereby fabricating the composite connector 6. More specifically, each connector 10 is pushed into the corresponding attaching hole 82 of the holder 11 in the first direction D1. This brings each engaging convex part 85 of the housing 15 of each connector 10 into frictional engagement with the peripheral surface 82a of the attaching hole 82, and locks (press fits) each housing 15 to the holder 11.

At this time, the stepped portion 83 of the corresponding attaching hole 82 receives the flange part 19 of the housing 15 of each connector 10. Further, the main body part 18 and the flange part 19 of the housing 15 cover the corresponding attaching hole 82, whereby the attaching hole 82 becomes dust-proof so that foreign matter such as dust can not enter the attaching hole 82.

Figure 12A:
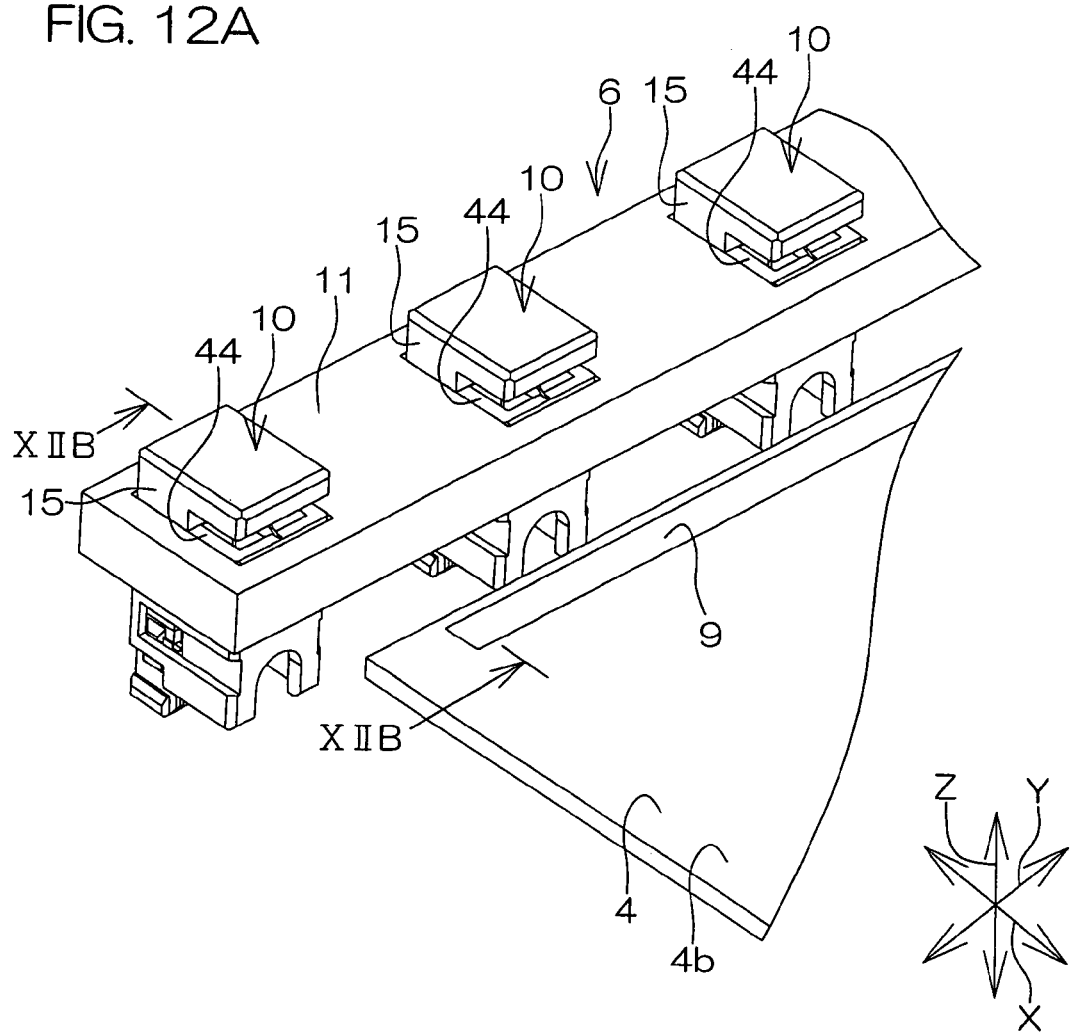
Figure 12B:
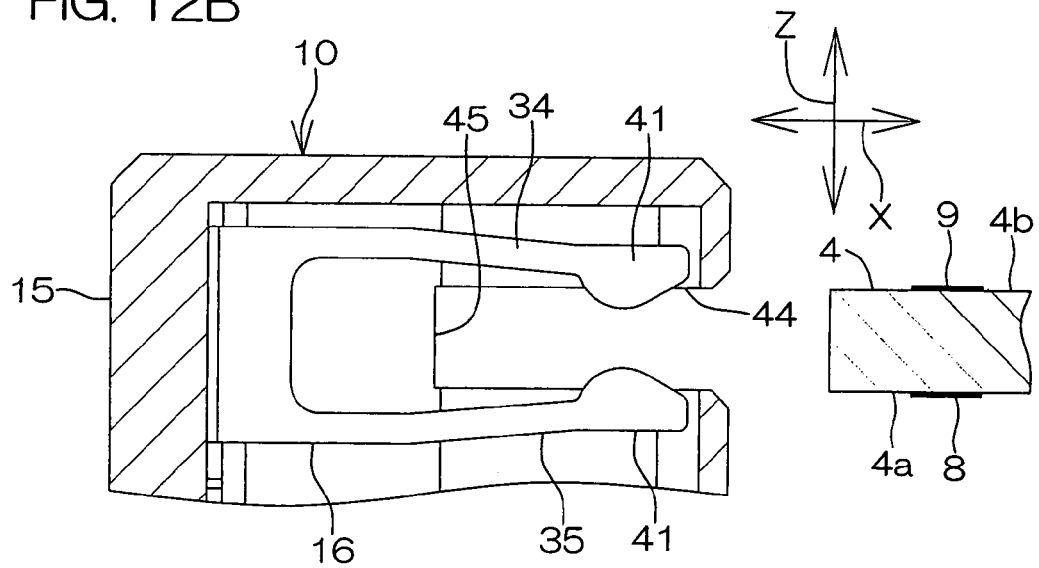
FIG. 12B is a sectional view of a main part taken along the line XIIB-XIIB of FIG. 12A.

Referring to FIGS. 12A and 12B, next, the composite connector 6 is mounted to the circuit board 4. More specifically, the composite connector 6 and the circuit board 4 are moved relative to each other in the X-direction (slide direction) from the state where they are opposed to each other in the X-direction.

Figure 13A:
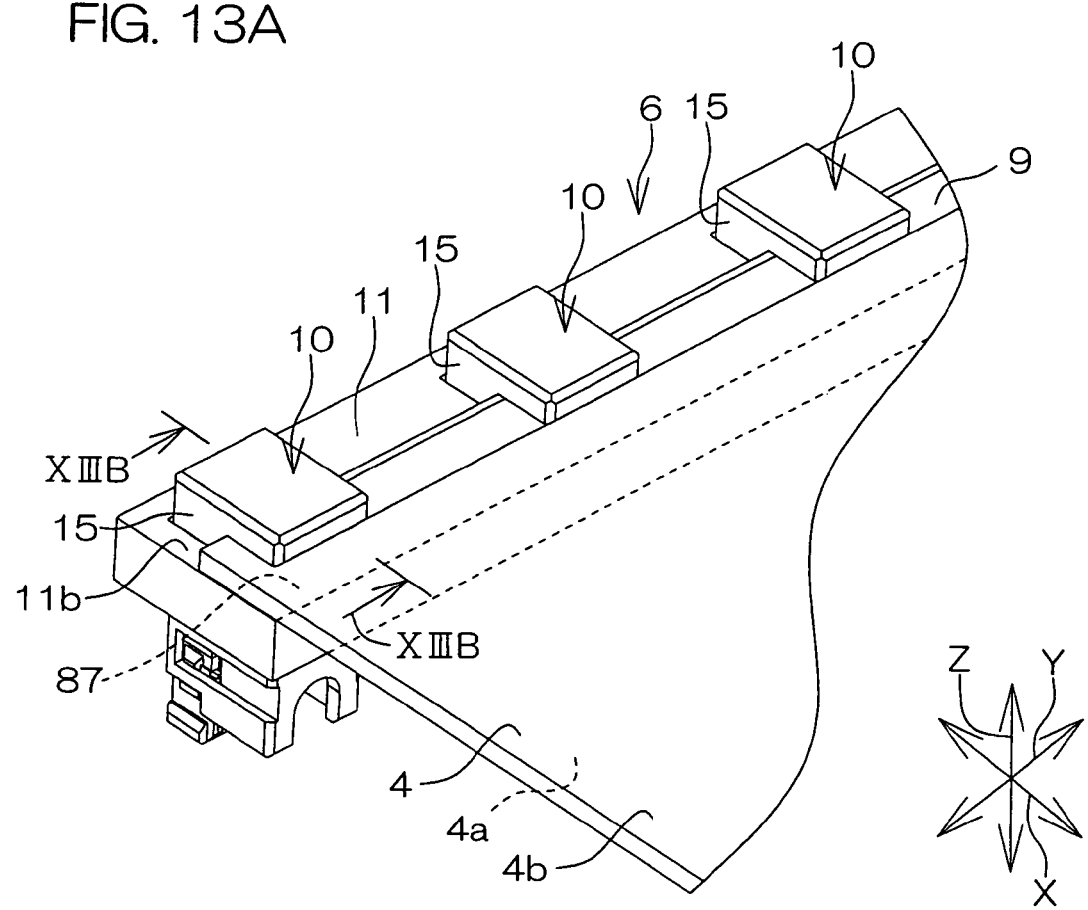
Figure 13B:
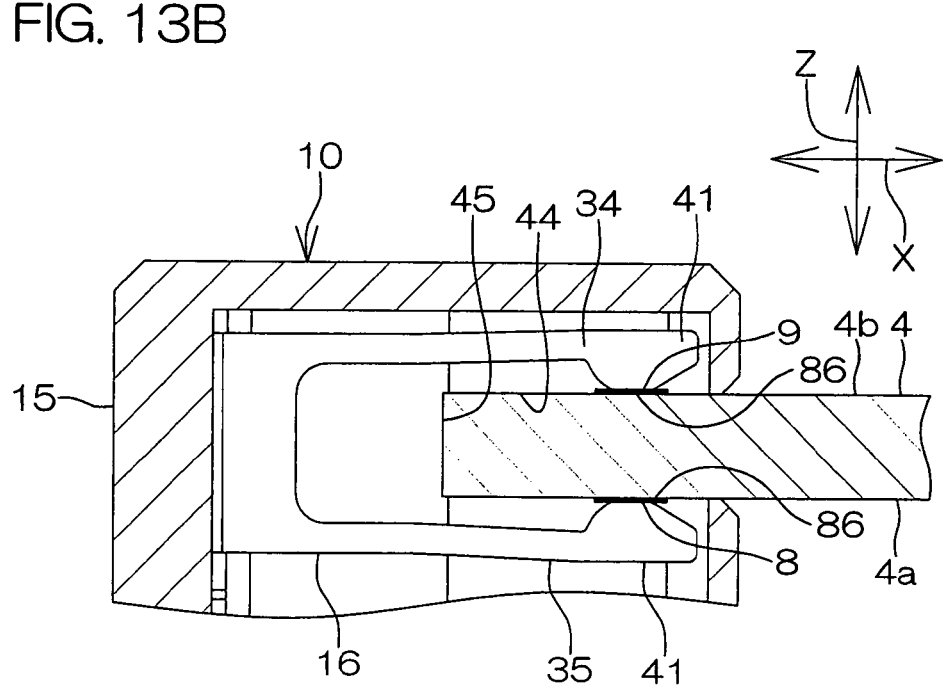
FIG. 13B is a sectional view of a main part taken along the line XIIIB-XIIIB of FIG. 13A.

In consequence, as shown in FIGS. 13A and 13B, the circuit board 4 is slid and inserted into the insertion concave portions 44 of the housings 15 of the respective connectors 10.

Specifically, the composite connector 6 shifts, relative to the circuit board 4, from its non-insertion position (See FIG. 12B) at which the circuit board 4 is not inserted in the insertion concave portions 44 to its insertion position (See FIG. 13B) at which the circuit board 4 is inserted in the insertion concave portions 44.

As the circuit board 4 is inserted into the insertion concave portions 44, the pair of second elastic pieces 34 and 35 inside these insertion concave portions 44 expand the distance between their tip ends 41 while elastically contacting the corresponding conductive patterns 8 and 9 of the circuit board 4 at a time. The tip ends 41 of the pair of second elastic pieces 34 and 35 elastically contact the corresponding conductive patterns 8 and 9 on the front surface 4a and the back surface 4b of the circuit board 4, respectively, in such a manner that they can slide in the X-direction, whereby contact parts 86 are formed. The pair of second elastic pieces 34 and 35 are thus electrically connected with the circuit board 4.

The circuit board 4 is inserted into the respective insertion concave portions 44 and engages with the corresponding receiving parts 45. This positions the composite connector 6 in both the X-direction and the Z-direction, as shown in FIGS. 13A and 13B. At this time, a part of the back surface 11b of the holder 11 abuts against the opposed front surface 4a of the circuit board 4, thereby forming a receiving part 87. The receiving part 87 and the front surface 4a of the circuit board 4 are in surface contact. The circuit board 4 and the holder 11 are fixed to each other with a fixing means (not shown) which may be a screw or the like.

The receiving part 87 is also a guide portion which contacts with the circuit board 4 with slide, for guiding the circuit board 4 to be inserted into the insertion concave portions 44.

The composite connector 6 described above is mounted to each one of the pair of ends of the circuit board 4 along the X-direction.

Next, the corresponding outer leads 14 are attached to the pair of first elastic pieces 32 and 33 of each connector 10, which secures electric connection between them, as shown in FIG. 9 and FIG. 10. More specifically, first, as shown in FIG. 9, the operation member 17 is kept at the expanding/opening position. This allows the pair of expanding/opening operation parts 59 of the operation member 17 to engage with the corresponding engaging parts 49 of the first elastic pieces 32 and 33 and expands the distance between the pair of second pieces 48 by force. At this time, the distance between the pair of linear parts 52 is greater than the diameter of the outer leads 14 and the distance between the pair of first narrow parts 51 is greater than the diameter of the outer leads 14.

In this state, the main body part of the corresponding cold-cathode tube is held by a hand (not shown) or the like, and the outer leads 14 are made opposed to the operation member 17 in the Z-direction. The cold-cathode tube is then moved in the first direction D1 as denoted by the arrow F, thereby positioning the corresponding outer leads 14 between the pair of linear parts 52 inside the receiving cavity 22.

Next, the operation member 17 is moved in the first direction D1 and shifted from the expanding/opening position to the expansion releasing position which is shown in FIG. 10. This releases the engagement with the pair of engaging parts 49 by the pair of expanding/opening operation parts 59, and due to the elastic force of the pair of first elastic pieces 32 and 33, the pair of linear parts 52 pinch the corresponding outer leads 14. At this time, the pair of linear parts 52 contact at their contact parts 88 with the corresponding outer leads 14. The pair of contact parts 88 are located at positions which are opposed to each other on both sides of the corresponding outer leads 14, and elastically pinch the corresponding outer leads 14 in the radial direction of the corresponding outer leads 14.

This realizes electric connection between the contact 16 and the corresponding outer leads 14. In other words, the outer leads 14 of the cold-cathode tube are electrically connected with the conductive patterns of the circuit board via the contacts 16.

At this time, the distance between the pair of first narrow parts 51 and that between the pair of second narrow parts 53 are smaller than the diameter of the corresponding outer leads 14. Further, as the operation member 17 shifts to the expansion releasing position, the pair of pressing parts 73 press the corresponding pressed parts 74 as denoted by the arrow G1, whereby these pressed parts 74 move closer to each other in the Y-direction. This reduces the distance between the pair of first piece 47, and the pressing force consequently acts upon the pair of second pieces 48 so as to shorten the distance between the linear parts 52. The pair of linear parts 52 therefore more pinch the corresponding outer leads 14.

Further, as the operation member 17 shifts to the expansion releasing position, the base end parts 47a of the pair of first pieces 47 press the tip end parts 54 of the corresponding second pieces 48 as denoted by the arrow G2, whereby these tip end parts 54 move closer to each other in the Y-direction. This reduces the distance between the pair of tip end parts 54, the pressing force consequently acts so as to shorten the distance between the linear parts 52, and the pair of linear parts 52 even more pinch the corresponding outer leads 14.

Meanwhile, the liquid crystal display device is disassembled in the following fashion. That is, first, the connection between the outer leads 14 and the corresponding contact 16 is released. More specifically, the operation member 17 is moved in the second direction D2 from the expansion releasing position and shifted to the expanding/opening position as shown in FIG. 9. While the operation member 17 shifts to the expanding/opening position, the second inclined cam surfaces 78 of the pair of expanding/opening operation parts 59 engage with the corresponding engaging parts 49 and extend the distance between the pair of engaging parts 49. Accordingly, the distance between the pair of linear parts 52 expands. The electric connection between the pair of linear parts 52 and the corresponding outer leads 14 is released.

Next, the main body part of the cold-cathode tube is held by a hand or the like and moved in the second direction D2. The corresponding outer leads 14 of the cold-cathode tube accordingly move from the pair of linear parts 52, pass between the pair of first narrow parts 51 and between the pair of guide parts 55, and are taken out from the receiving cavity 22.

Referring to FIGS. 13A and 13B, after the cold-cathode tube is detached from the respective connectors 10, the composite connector 6 is detached from the circuit board 4. More specifically, the composite connector 6 is slid relative to the circuit board 4 in the X-direction. That is, the composite connector 6 is shifted to the non-insertion position shown in FIGS. 12A and 12B from the insertion position, relative to the circuit board 4.

As a result, the circuit board 4 slides relative to the insertion concave portions 44 of the housing 15 of each connector 10 along the X-direction, and is pulled out from the insertion concave portions 44. The contact between the pair of second elastic pieces 34 and 35 of each connector 10 and the conductive patterns 8 and 9 of the circuit board 4 is released, and the electric connection between the contact 16 and the circuit board 4 is released. At this time, due to the elastic restoring force of the pair of second elastic pieces 34 and 35, the distance between the tip ends 41 of the pair of second elastic pieces 34 and 35 decreases.

After detaching the composite connector 6 from the circuit board 4, the composite connector 6 is disassembled. More specifically, with reference to FIG. 11, the main body parts 18 of the corresponding connectors 10 are pulled out from the respective attaching holes 82 of the holder 11 in the second direction D2. At this stage, the housing 15 of each connector 10 is pulled in the second direction D2, against frictional resistance between each engaging convex part 85 of the housing 15 and the peripheral surface 82a of the corresponding attaching hole 82.

In this embodiment, the following function and effect are obtained. That is, in a condition that the plurality of connectors 10 are lined up and bundled in the holder 11, the plurality of connectors 10 can be attached to the circuit board 4 at a time. It is not necessary to attach the plurality of connectors 10 one by one separately to the circuit board 4 which requires great caution with respect to handling, which dramatically reduces the labor of mounting of the plurality of connectors 10 to the circuit board 4. In addition, it is not necessary to use a solder for connection between the respective connectors 10 and the circuit board 4, which is desirable from the perspective of global environmental protection as well. Another benefit is the reduced cost as costly soldering work is not necessary.

Further, the respective contacts 16 and the conductive patterns 8 and 9 of the circuit board 4 can be electrically connected as the circuit board 4 is slid and inserted into the insertion concave portions 44 of the housing 15 of each connector 10. It is possible to perform work of attaching the connectors 10 to the circuit board 4 and work of electrically connecting the contacts 16 with the circuit board 4 at a time.

Further, the plurality of attaching holes 82 are formed in the holder 11. By fitting the housing 15 of the corresponding connector 10 into each attaching hole 82, these connectors 10 are held by the holder 11.

Further, since the housings 15 of the respective connectors 10 are locked in the corresponding attaching holes 82 in such a manner that the housings 15 can be detached, it is possible to securely lock the respective connectors 10 to the holder 11 so that they do not fall off from the holder 11. In addition, it is possible to detach the respective connectors 10 from the holder 11 and replace them with new connectors.

Further, the housings 15 of the respective connectors 10 are locked to the holder 11 as they are pushed into the attaching holes 82 in the insertion direction. It is therefore possible to perform attaching work of fitting the housings 15 of the connectors 10 into the corresponding attaching holes 82 of the holder 11 and fixing work of fixing the housings 15 and the holder 11 together at a time.

Further, the main body parts 18 and the flange parts 19 of the housings 15 of the respective connectors make the attaching holes 82 of the holder 11 dust-proof. By providing the flange parts 19 in the peripheral edges of the main body parts 18 of the housings 15, a dust-proof structure is easily realized. In addition, the main body parts 18 and the flange parts 19 jointly cover the attaching holes 82 without fail.

Further, the holder 11 forms the receiving part 87 which receives the opposed front surface 4a of the circuit board 4 slid and inserted into the insertion concave portions 44. The receiving part 87 of the holder 11 thus receives the opposed front surface 4a of the circuit board 4, so that the circuit board 4 is reinforced.

Further, the respective contact parts 86 of the pair of second elastic pieces 34 and 35 of the contact 16 can slide into contact with the corresponding conductive patterns 8 and 9 of the circuit board 4 in the X-direction. This securely attains electric connection between the contact 16 and the conductive patterns 8 and 9 of the circuit board 4 even when the location of the connector 10 with respect to the circuit board 4 is somewhat shifted from a desired position.

Further, it is possible to shift the composite connector 6 to the insertion position and the non-insertion position relative to the circuit board 4. By sliding the composite connector 6 slides in the X-direction relative to the circuit board 4, the composite connector 6 can be mounted to and detached from the circuit board 4.

Further, use of the holder 11 makes it possible to hold the plurality of connectors 10 at a time.

Further, when the circuit board 4 is electrically connected with the outer leads 14 of the cold-cathode tube 5, the second elastic pieces 34 and 35 of the contact 16 of each connector 10 can be connected at a time with the conductive patterns 8 and 9 of the circuit board 4 and the first elastic pieces 32 and 33 of each contact 16 can then be connected with the outer leads 14 of the cold-cathode tube 5. The plurality of contacts 16 can be easily connected with the circuit board 4.

Further, the outer leads 14 of the cold-cathode tube 5 are electrically connected with the conductive patterns 8 and 9 of the circuit board 4 via the contact 16 which is a single member. Only one component is thus required to attain electric connection between the outer leads 14 of the cold-cathode tube 5 and the circuit board 4, which reduces the number of components. Further, the contact 16 elastically contacts both the outer leads 14 of the cold-cathode tube 5 and the conductive patterns 8 and 9 of the circuit board 4. Hence, the contact 16 can contact without fail both the outer leads 14 of the cold-cathode tube 5 and the conductive patterns 8 and 9 of the circuit board 4. This prevents defective conducting between the outer leads 14 of the cold-cathode tube 5 and the circuit board 4.

Further, in each contact 16, the pair of first elastic pieces 32 and 33 pinch the outer leads 14 of the cold-cathode tube 5, so that the outer leads 14 can be electrically connected with the first elastic pieces 32 and 33 without fail.

Further, in each contact 16, the pair of second elastic pieces 34 and 35 pinch the front surface 4a and the back surface 4b of the circuit board 4. This makes possible a more secure electric connection between the pair of second elastic pieces 34 and 35 and the circuit board 4.

Further, the corresponding second elastic pieces 34 and 35 contact the conductive patterns 8 and 9 which are formed on at least one of the front surface 4a and the back surface 4b of the circuit board 4 (on both in this embodiment). This further enhances the contact pressure between the second elastic pieces 34 and 35 and the conductive patterns 8 and 9 of the circuit board 4.

Figure 14:
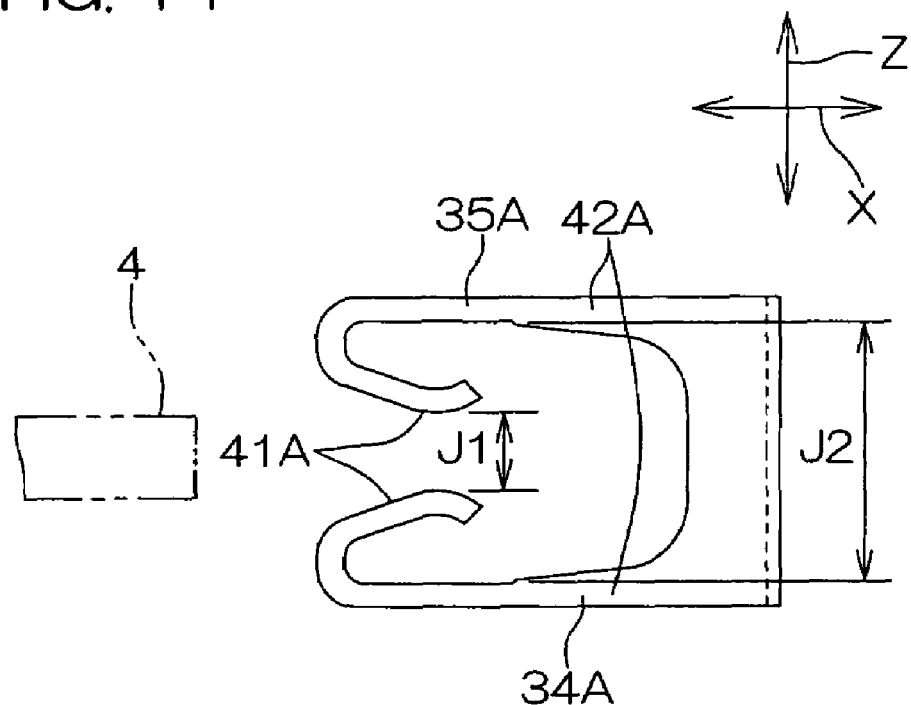
FIG. 14 is a side view of a main part according to another embodiment of the present invention.

FIG. 14 is a side view of a main part according to another embodiment of the present invention. As for this embodiment, differences from the embodiment shown in FIG. 1 through FIG. 13 will be described principally, and the same structures will be merely denoted by the similar reference symbols in the accompanied drawings but will not be described.

Referring to FIG. 14, a characteristic of this embodiment lies in that tip ends 41A of a pair of second elastic pieces 34A and 35A are bent so as to be opposed to corresponding middle portions 42A in the Z-direction.

In the pair of second elastic pieces 34A and 35A, the distance J1 between the tip ends 41A in the Z-direction is relatively narrow, while the distance J2 between the middle portions 42A in the Z-direction is relatively wide. This enhances the elasticity of the tip ends 41A and makes possible a more elastic contact with the circuit board 4.

Figure 15:
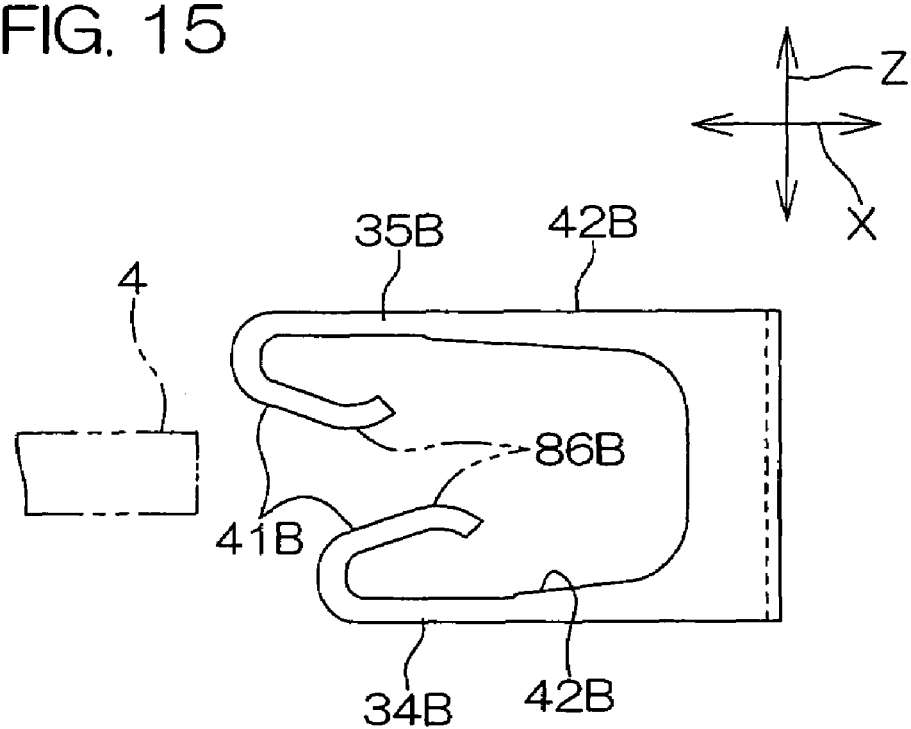
FIG. 15 is a side view of a main part according to another further embodiment of the present invention.

FIG. 15 is a side view of a main part according to another further embodiment of the present invention. Referring to FIG. 15, a difference of this embodiment from the embodiment shown in FIG. 14 is that tip ends 41B of a pair of second elastic pieces 34B and 35B are located at mutually different positions in the X-direction which serves as the slide direction. This positions contact parts 86B of the pair of second elastic pieces 34B and 35B at mutually different positions in the X-direction.

In this embodiment, a middle portion 42B of one second elastic piece 34B is formed relatively short in the X-direction, while a middle portion 42B of the other second elastic piece 35B is formed relatively long in the X-direction.

According to this embodiment, it is possible to shift the timing at which the one second elastic piece 34B contacts the circuit board 4 and starts to elastically deform from the timing at which the other second elastic piece 35B contacts the circuit board 4 and starts to elastically deform, during insertion of the circuit board 4 into between the pair of second elastic pieces 34B and 35B by means of sliding of the pair of second elastic pieces 34B and 35B relative to the circuit board 4. This makes insertion of the circuit board 4 between the pair of second elastic pieces 34B and 35B smooth.

Figure 16A:
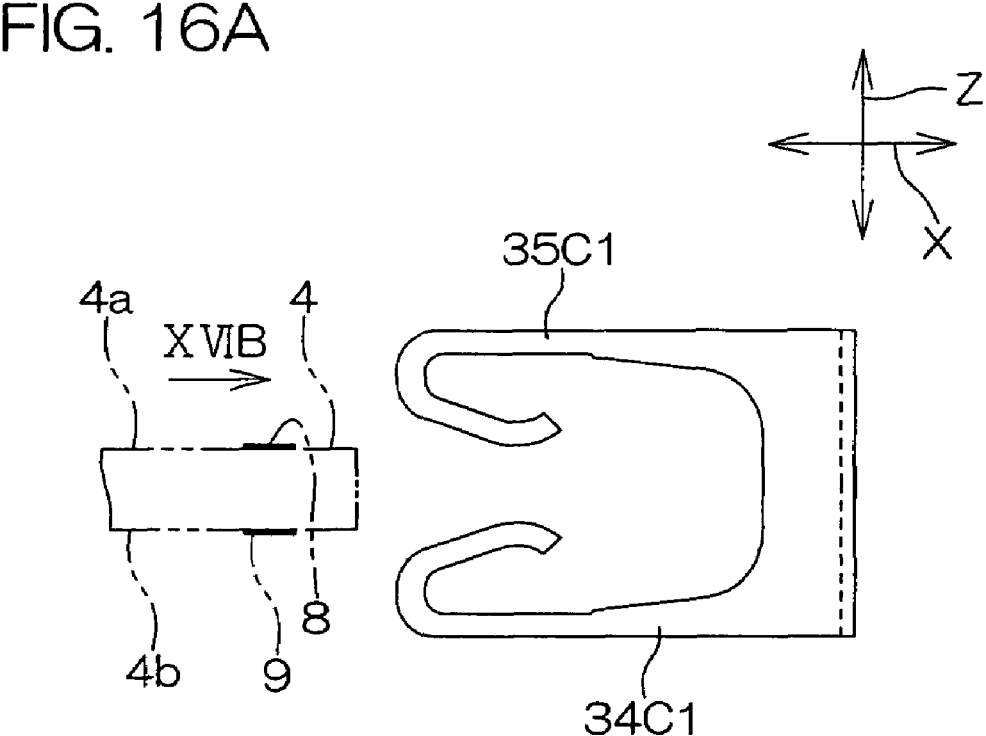
Figure 16B:
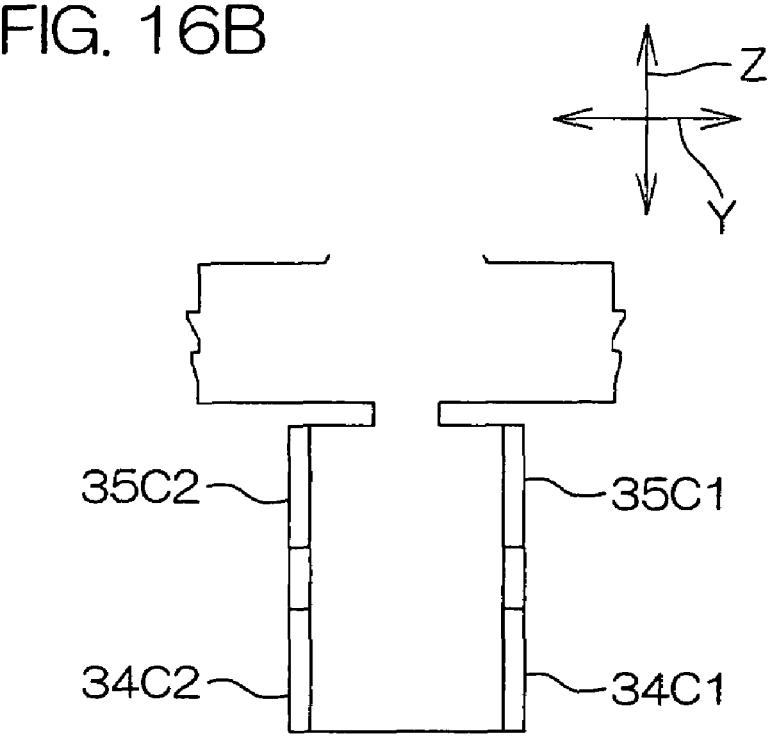
FIG. 16B is a view seen from the arrow direction XVIB in FIG. 16A.

FIG. 16A is a side view of a main part according to another further embodiment of the present invention, and FIG. 16B is a view seen from the arrow direction XVIB in FIG. 16A. Referring to FIGS. 16A and 16B, a principal difference of this embodiment from the embodiment shown in FIG. 14 is that a plurality of pairs of second elastic pieces are provided. More specifically, a pair of second elastic pieces 34C1 and 35C1 and a pair of second elastic pieces 34C2 and 35C2 are provided.

The second elastic pieces 34C1 and 35C1 and the second elastic pieces 34C2 and 35C2 are lined up in the Y-direction with a predetermined distance.

The second elastic pieces 34C1 and 35C1 and the second elastic pieces 34C2 and 35C2 pinch the front surface 4a and the back surface 4b of the circuit board 4, respectively. More specifically, the second elastic piece 34C1 elastically contacts the conductive pattern 9 on the back surface 4b of the circuit board 4 in such a manner that the second elastic piece 34C1 can slide, while the second elastic piece 35C1 elastically contacts the conductive pattern 8 on the front surface 4a of the circuit board 4 in such a manner that the second elastic piece 35C1 can slide.

In a similar manner, the second elastic piece 34C2 elastically contacts the conductive pattern 9 on the back surface 4b of the circuit board 4 in such a manner that the second elastic piece 34C2 can slide, while the second elastic piece 35C2 elastically contacts the conductive pattern 8 on the front surface 4a of the circuit board 4 in such a manner that the second elastic piece 35C2 can slide.

According to this embodiment, it is possible to electrically connect the second elastic pieces 34C1, 35C1, 34C2 and 35C2 with the circuit board 4 more securely.

Figure 17A:
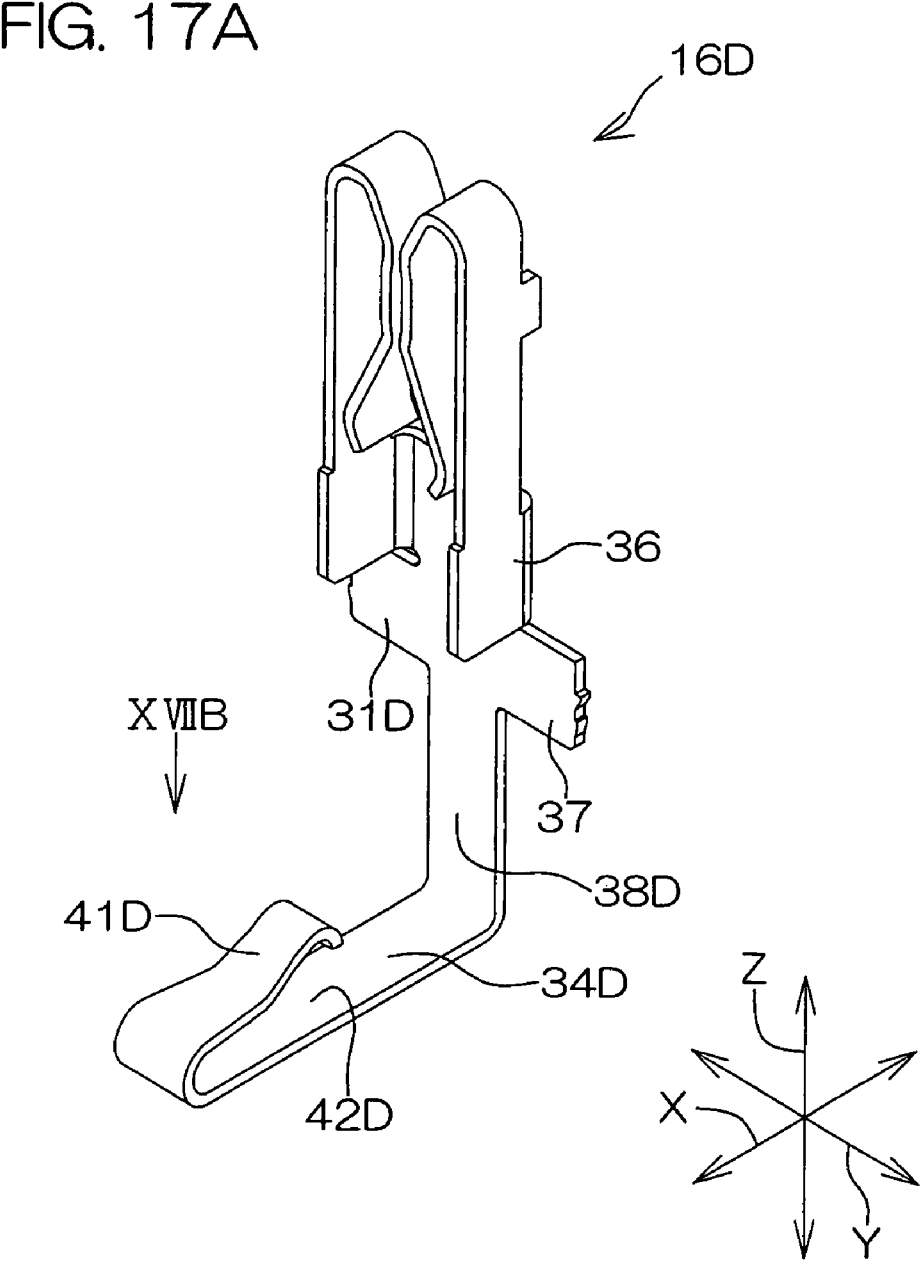
Figure 17B:
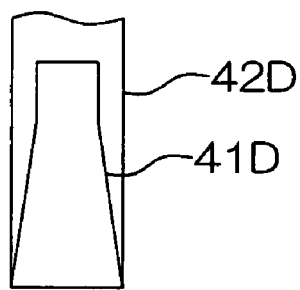
FIG. 17B is a plan view of the main part viewed from the arrow direction XVIIB in FIG. 17A.

FIG. 17A is a perspective view of a main part according to another further embodiment of the present invention, and FIG. 17B is a plan view of the main part viewed from the arrow direction XVIIB in FIG. 17A. As for this embodiment, a difference from the embodiment shown in FIG. 1 through FIG. 13 will be described principally, and the same structures will be merely denoted by the similar reference symbols in the accompanied drawings but will not be described.

Referring to FIGS. 17A and 17B, a characteristic of this embodiment lies in that only one (single) second elastic piece 34D is provided in a contact 16D.

The second elastic piece 34D extends from a lower portion 38D of a main body part 31D, and includes a middle portion 42D which is continuous with the lower portion 38D and a tip end 41D which is formed at the tip end of the middle portion 42D.

The middle portion 42D is shaped like a plate, extends in the X-direction, and becomes wider in the Y-direction. The tip end 41D is formed so as to be bent toward the middle portion 42D, and opposed to the middle portion 42D in the Z-direction. The tip end 41D is generally tapered and narrower toward its tip end side.

Figure 18A:
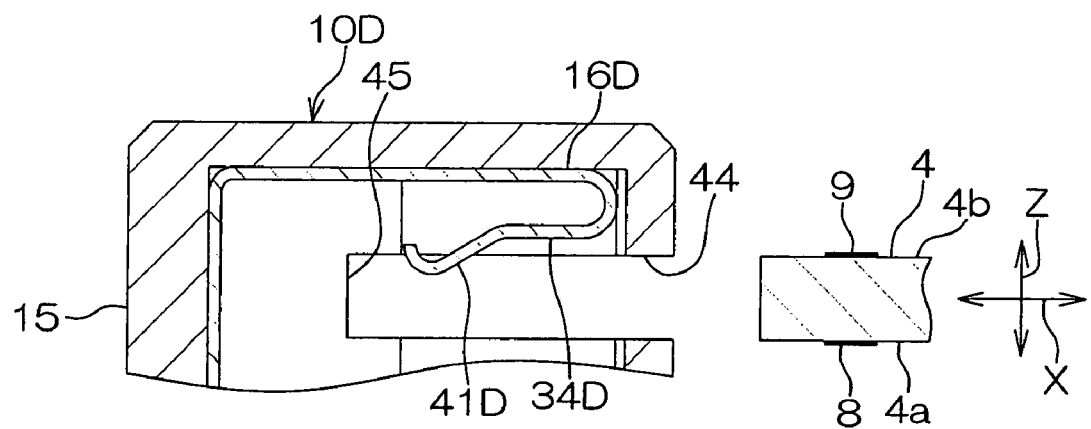
FIGS. 18A and 18B are sectional views of a main part each for describing a connection between a composite connector and a circuit board.
Figure 18B:
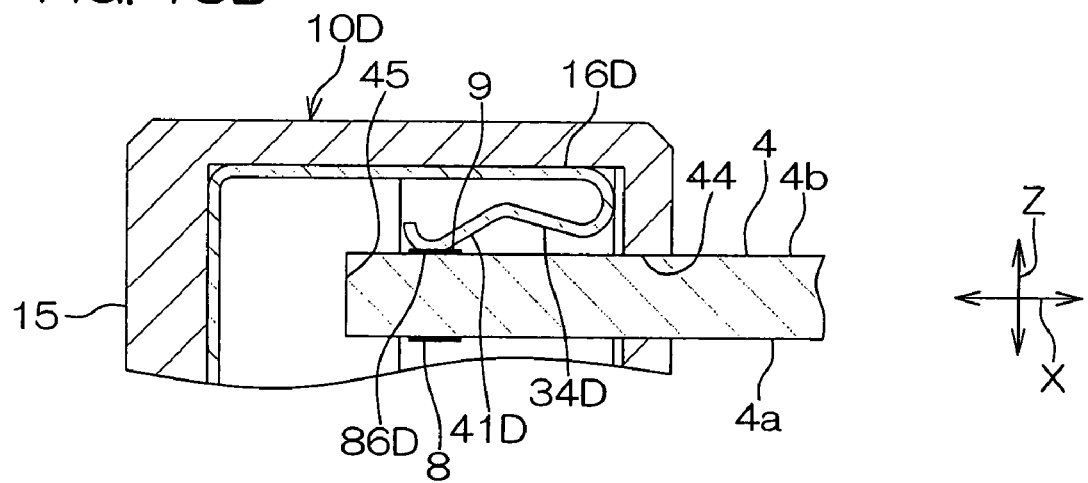

Referring to FIGS. 18A and 18B, the contact 16D and the circuit board 4 are electrically connected in the following fashion. That is, a connector 10D and the circuit board 4 are moved relative to each other in the X-direction from the state that they are opposed to each other in the X-direction. This slides the circuit board 4 into the insertion concave portions 44 of the housing 15 of each connector 10.

The second elastic piece 34D inside the insertion concave portions 44 consequently contacts elastically with the back surface 4b of the circuit board 4. The tip end 41D of the second elastic piece 34D, while being pressed against the conductive pattern 9 on the back surface 4b of the circuit board 4, elastically contacts the conductive pattern 9 in such a manner that the tip end 41D can slide in the X-direction, thereby forming a contact part 86D. This achieves electric connection between the second elastic piece 34D and the circuit board 4.

According to this embodiment, using only one second elastic piece 34D, secures a wider space which only one second elastic piece 34D can occupy. As a result, the second elastic piece 34D can be as large as possible and robust, which increases the strength and hence the durability of the second elastic piece 34D. Further, even when subjected to force in the Y-direction, the second elastic piece 34D can sufficiently receive this force and is prevented from falling.

A plurality of second elastic pieces 34D lined up in the Y-direction may be used to form a contact.

Figure 19:
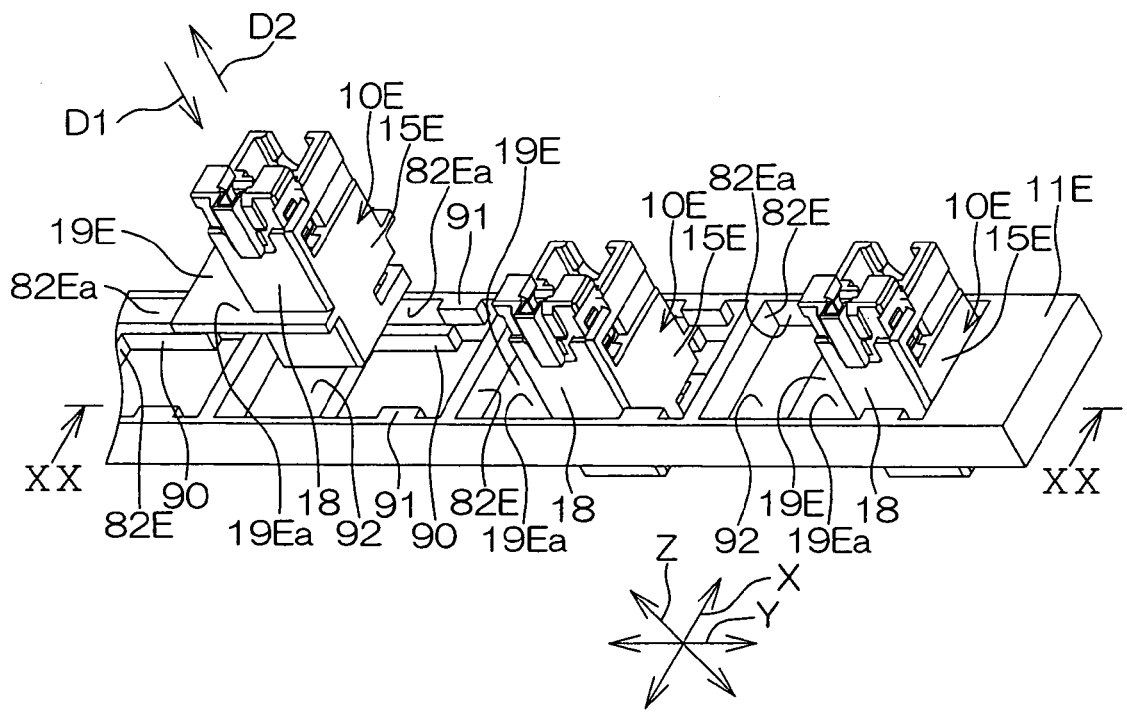
FIG. 19 is a partial exploded perspective view of a main part according to another further embodiment of the present invention.
Figure 20:
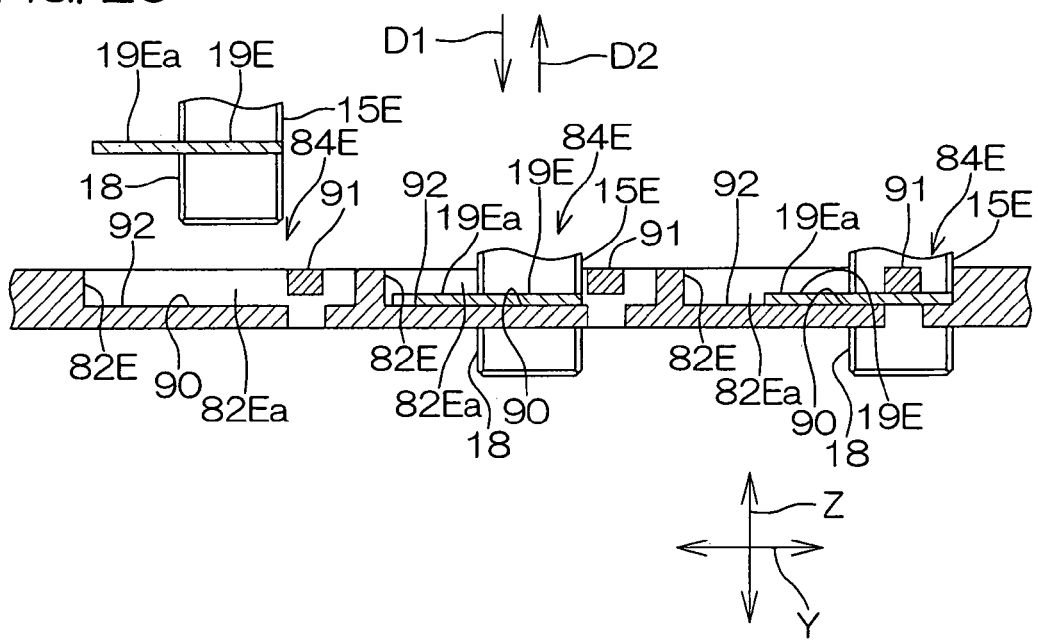
FIG. 20 is a sectional view of the main part taken along the line XX-XX of FIG. 19.

FIG. 19 is a partial exploded perspective view of a main part according to another further embodiment of the present invention. FIG. 20 is a sectional view of the main part taken along the line XX-XX of FIG. 19. As for this embodiment, a difference from the embodiment shown in FIG. 1 through FIG. 13 will be described principally, and the same structures will be merely denoted by the similar reference symbols in the accompanied drawings but will not be described.

Referring to FIG. 19 and FIG. 20, a characteristic of this embodiment lies in that a lock mechanism 84E is provided. The lock mechanism 84E locks a housing 15E of each connector 10E in an corresponding attaching hole 82E when the housing 15E is slid in the Y-direction which is orthogonal to the first direction D1 (the insertion direction into the corresponding attaching hole 82).

More specifically, a flange part 19E of the housing 15E of each connector 10E includes a portion 19Ea which projects from the main body part 18 toward one side of the Y-direction.

A rail parts 90, a pressing pieces 91 and a cover 92 are provided in a peripheral surface 82Ea of each attaching hole 82E. In the peripheral surface 82Ea, the pair of rail parts 90 are provided so that they are opposed to each other in the X-direction, and extend in the Y-direction. These rail parts 90 are for receiving the corresponding flange part 19E, and can slide with respect to the corresponding flange part 19E in the X-direction.

The pressing pieces 91 are for pinching the flange part 19E together with the rail parts 90. One pair of pressing pieces 91, for example, are provided for the pair of rail parts 90 described above, and spaced apart from the corresponding rail parts 90 in the Z-direction. The pair of pressing pieces 91 are disposed near one end of the corresponding peripheral surface 82Ea in the Y-direction. The pair of pressing pieces 91 is formed so that the housing 15E do not contact the pressing pieces 91 during insertion of the housing 15E of the corresponding connector 10E into the attaching hole 82E.

The cover 92, together with the housing 15E of the connector 10E, covers the attaching hole 82E. The cover 92 is disposed near the other end of the corresponding attaching hole 82E in the Y-direction, and formed flush with the pair of rail parts 90. The cover 92 covers a part of the corresponding attaching hole 82E.

Each connector 10E is attached to the corresponding attaching hole 82E in the following fashion. That is, each connector 10E and the corresponding attaching hole 82E of a holder 11E are opposed to each other in the Z-direction, first. (FIG. 19 and FIG. 20 show on the left-hand side the connector 10E in this state.)

Next, each connector 10E is moved in the first direction D1, thereby placing the flange part 19E on the corresponding cover 92 and the pair of rail parts 90 (FIG. 19 and FIG. 20 show in the center the connector 10E in this state.).

Next, each connector 10E is slid toward one side of the Y-direction. This makes the flange part 19E pinched between the pair of rail parts 90 and the pair of pressing pieces 91 and pinched with a predetermined holding force. (FIG. 19 and FIG. 20 show on the right-hand side the connector 10E in this state.) The corresponding cover 92 and the housing 15E thus cover each attaching hole 82E.

As described above, according to this embodiment, through the simple operation of sliding the housing 15E of each connector 10E relative to the holder 11E, each housing 15E and the holder 11E are easily fixed to each other.

Figure 21:
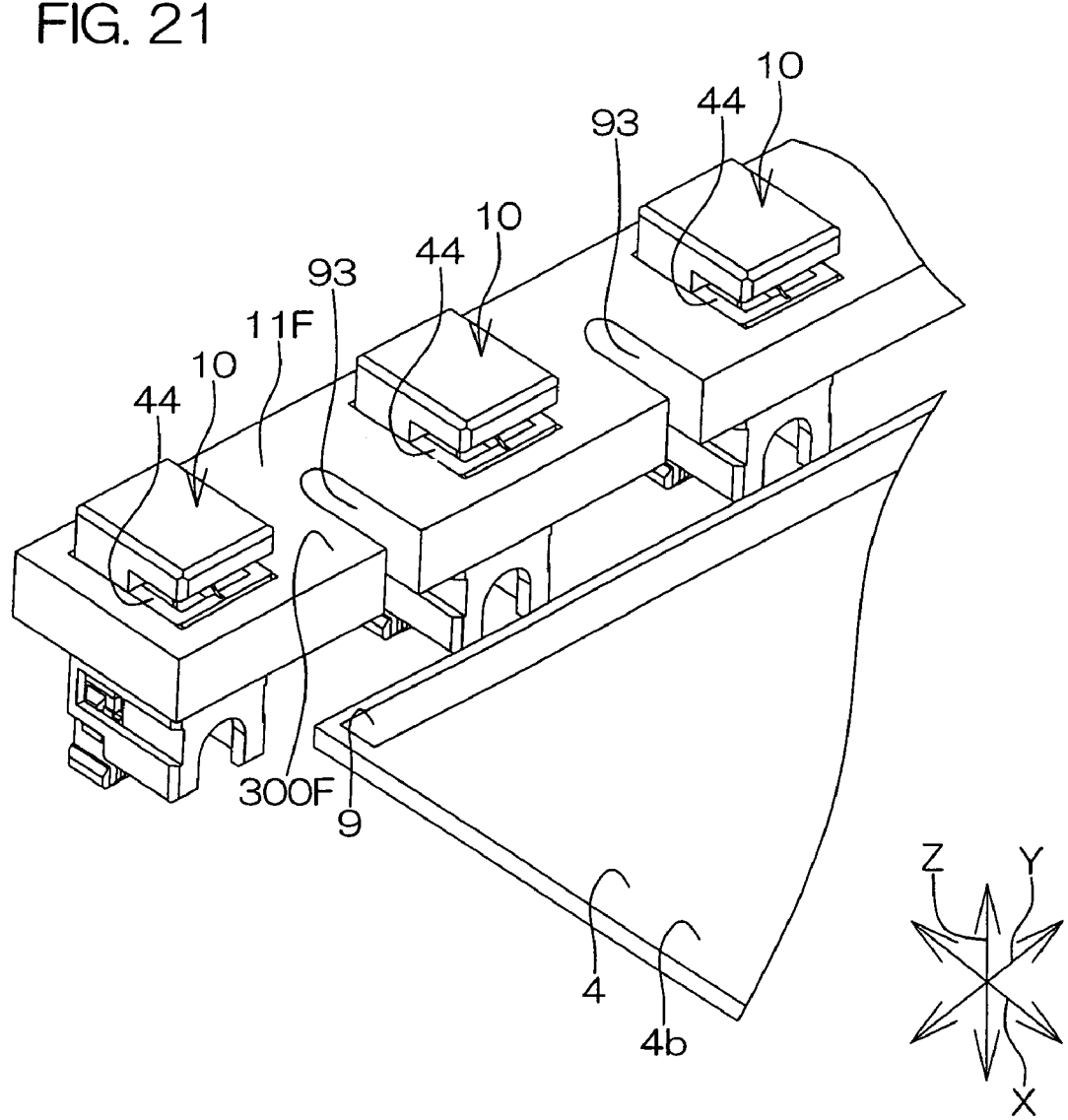
FIG. 21 is a perspective view of a main part according to another further embodiment of the present invention.

FIG. 21 is a perspective view of a main part according to another further embodiment of the present invention. As for this embodiment, a difference from the embodiment shown in FIG. 1 through FIG. 13 will be described principally, and the same structures will be merely denoted by the similar reference symbols in the accompanied drawings but will not be described.

Referring to FIG. 21, a characteristic of this embodiment lies in that one or a plurality of (a plurality of in this embodiment) slits 93 serves as notch are formed in the main body 300 of a holder 11F. The slits 93 are disposed alternately with the connectors 10 in the Y-direction, for example.

Each slit 93 extends along the direction of the thickness of the holder 11F, specifically, the Z-direction, and penetrates the holder 11F. In other words, the slits 93 extend along the direction of the thickness of the circuit board 4 when it is slid and inserted into the insertion concave portions 44.

According to this embodiment, since the bending stiffness of the holder 11F is locally lowered, it is possible to bend the holder 11F so that the holder 11F follows warping (bending) or the like of the circuit board 4. It is possible to ensure that the holder 11F more securely extends along the circuit board 4.

FIG. 22, FIGS. 23A and 23B, and FIGS. 24A and 24B show further another embodiment of the present invention. As for this embodiment, differences from the embodiment shown in FIG. 1 through FIG. 13 will be described principally, and the same structures will be merely denoted by the similar reference symbols in the accompanied drawings but will not be described.

Figure 22:
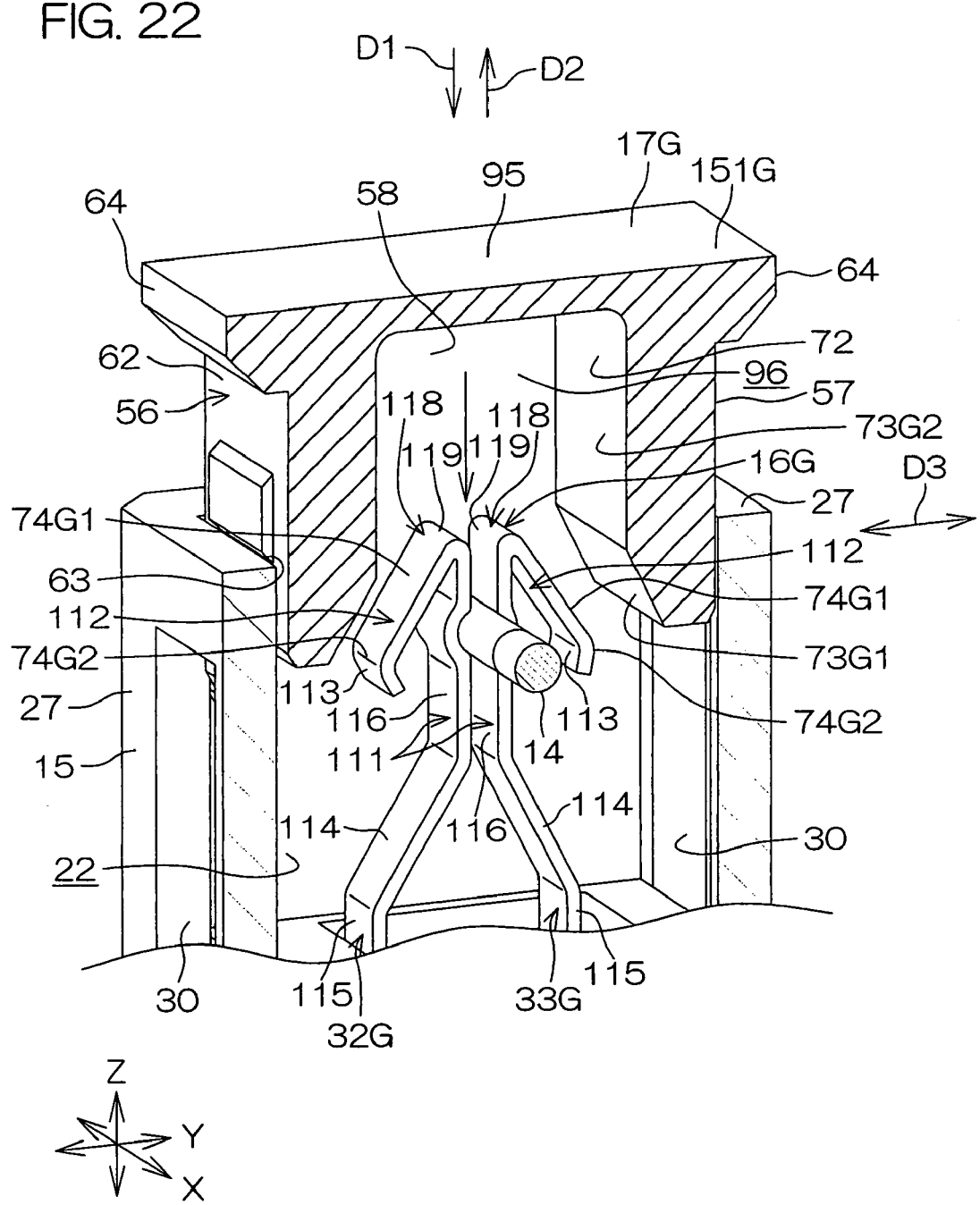
FIG. 22 is a partial exploded perspective view of a main part according to a further another embodiment of the present invention.
Figure 23A:
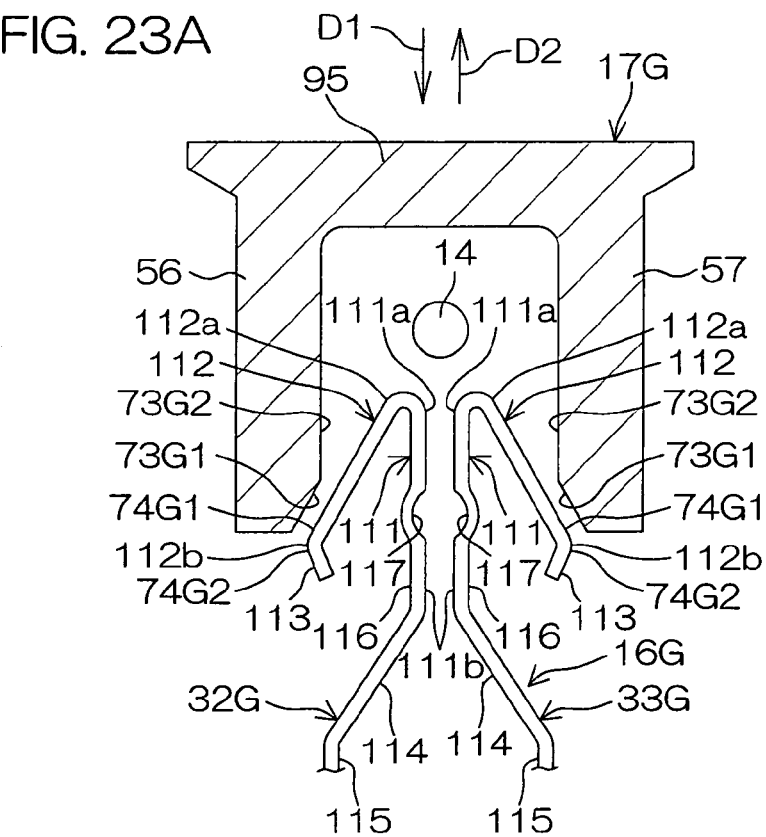

Referring to FIG. 22 and FIG. 23A, main differences of this embodiment from the embodiment shown in FIG. 1 through FIG. 13 are that the contacts 16 are replaced with contacts 16G and the operation member 17 is replaced with an operation member 17G.

The operation member 17G is different from the operation member 17 shown in FIG. 9 in that it includes an opening blocking part 95. The operation member 17G is further different from the operation member 17 shown in FIG. 9 in that it omits the expanding/opening operation parts 59. In addition, the operation member 17G is different from the operation member 17 shown in FIG. 9 in that it includes first pressing parts 73G1 and second pressing parts 73G2. Moreover, the operation member 17G is different from the operation member 17 shown in FIG. 9 in that it omits the protruding part 75.

The opening blocking part 95 connects one ends of the pair of parts 56 and 57 of the operation member 17, so that a space 96 between the pair of parts 56 and 57 is not opened in the second direction D2.

The housing 15 holds the operation member 17G so that the operation member 17G can shift along the first direction D1 or the second direction D2. The operation member 17G shifts between a non-pressing position (See FIGS. 23A and 23B) at which it does not restrict a pair of elastic pieces 32G and 33G but sets the pair of elastic pieces 32G and 33G free, and a final pressing position (FIG. 24B) at which pressing of the pair of elastic pieces 32G and 33G is completed.

Referring to FIG. 22 and FIG. 23A, the contact 16G mentioned above includes the pair of elastic pieces 32G and 33G. Each one on the pair of elastic pieces 32G and 33G includes a first piece 111, a second piece 112, a third piece 113, a fourth piece 114 and a fifth piece 115.

The respective first pieces 111 extend generally linearly along the second direction D2 which is the detaching direction of the outer leads 14. The corresponding inclined fourth piece 114 supports each first piece 111, and the fifth piece 115 extending along the second direction D2 supports each fourth piece 114.

The respective second pieces 112 extend from the corresponding first pieces 111 and are supported in a cantilever fashion by the corresponding first pieces 111. Each third piece 113 extends from the corresponding second piece 112.

The first pieces 111 of the elastic pieces 32G and 33G includes tip end parts 111a and base end parts 111b. The first pieces 111 of the elastic pieces 32G and 33G include linear parts 116 which serve as pinching parts and which extend over a predetermined length along the first direction D1, which is the attaching direction of the outer leads 14, from the tip end parts 111a toward the base end parts 111b.

When the operation member 17G is located at the non-pressing position shown in FIG. 23A and the outer leads 14 are not introduced between the elastic pieces 32G and 33G, the width between the linear part 116 of the elastic piece 32G and that of the elastic piece 33G is slightly narrower than the diameter of the outer leads 14.

This permits the outer leads 14 introduced between the linear parts 116 of the pair of elastic pieces 32G and 33G to smoothly move along the first direction D1 while being subjected to very small frictional resistance.

Figure 23B:
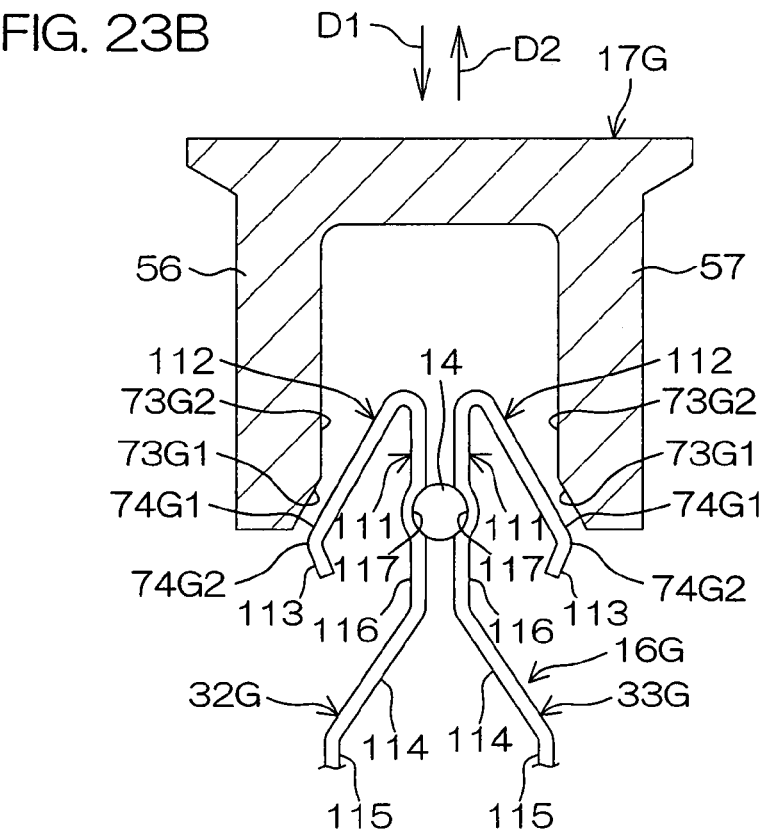

In a midway portion of each linear part 116, in the first direction D1, a contact part 117 which positions and holds the outer leads 14 with respect to the first direction D1 as shown in FIG. 23B and secures electric contact with the thus held outer leads 14 is provided. The contact parts 117 of the linear parts 116 are formed by circular arc surfaces which generally match with parts of the outer peripheral surfaces of the thus held outer leads 14.

Referring to FIG. 22, the second pieces 112 of the elastic pieces 32G and 33G are bent outward to be inclined from the corresponding first pieces 111 via bent parts 118. Portions of the bent parts 118 form guide parts 119 which guide introduction of the outer leads 14 into between the two linear parts 116.

Referring to FIG. 23A, the distance between base end parts 112a of the second pieces 112 of the pair of elastic pieces 32G and 33G is shorter than the distance between tip end parts 112b of the pair of elastic pieces 32G and 33G. At least portions of outer side surfaces of the respective second pieces 112 form first pressed parts 74G1.

The third pieces 113 of the elastic pieces 32G and 33G are bent so as to be inclined oppositely to the corresponding second pieces 112. Apex parts formed between the second pieces 112 and the third pieces 113 of the elastic pieces 32G and 33G form second pressed parts 74G2.

Figure 24A:
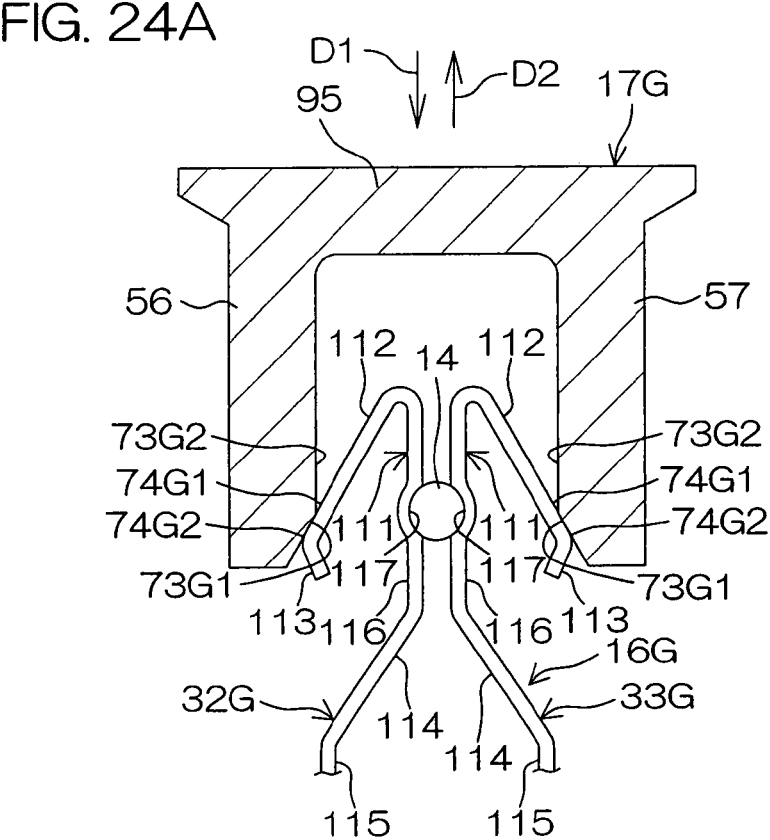

In a condition that the outer leads 14 is pinched and hold between the contact parts 117 of the pair of elastic pieces 32G and 33G as shown in FIG. 23B, the operation member 17G is shifted to the final pressing position which is shown in FIG. 24. During a process in which the operation member 17G is shifted to the final pressing position, first, the inclined first pressed parts 73G1 of the operation member 17G press the first pressed parts 74G1 of the corresponding inclined second pieces 112 as shown in FIG. 24A. This elastically bends and deforms the respective second pieces 112, which increases the pinching force upon the outer leads 14 between the two contact parts 117.

Figure 24B:
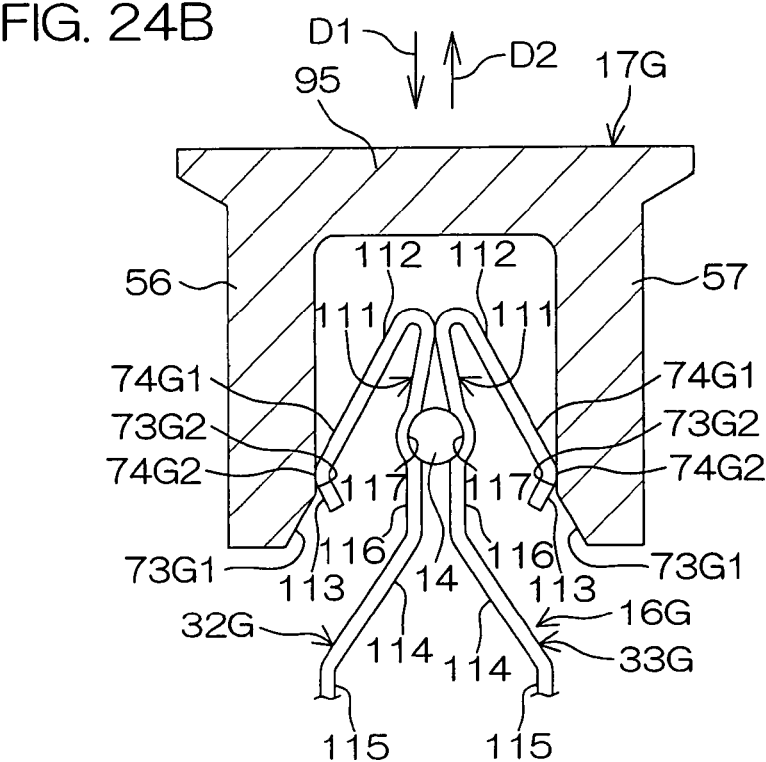
FIG. 24B shows a state where pressing of the pair of elastic pieces are completed.

When the operation member 17G reaches the final pressing position which is shown in FIG. 24B, the second pressed parts 73G2 of the operation member 17G press the corresponding second pressed parts 74G2 of the elastic pieces 32G and 33G. This elastically bends and deforms the respective second pieces 112 by a sufficient bending amount, whereby the pinching force upon the outer leads 14 between the two contact parts 117 is sufficiently enhanced.

Figure 25:
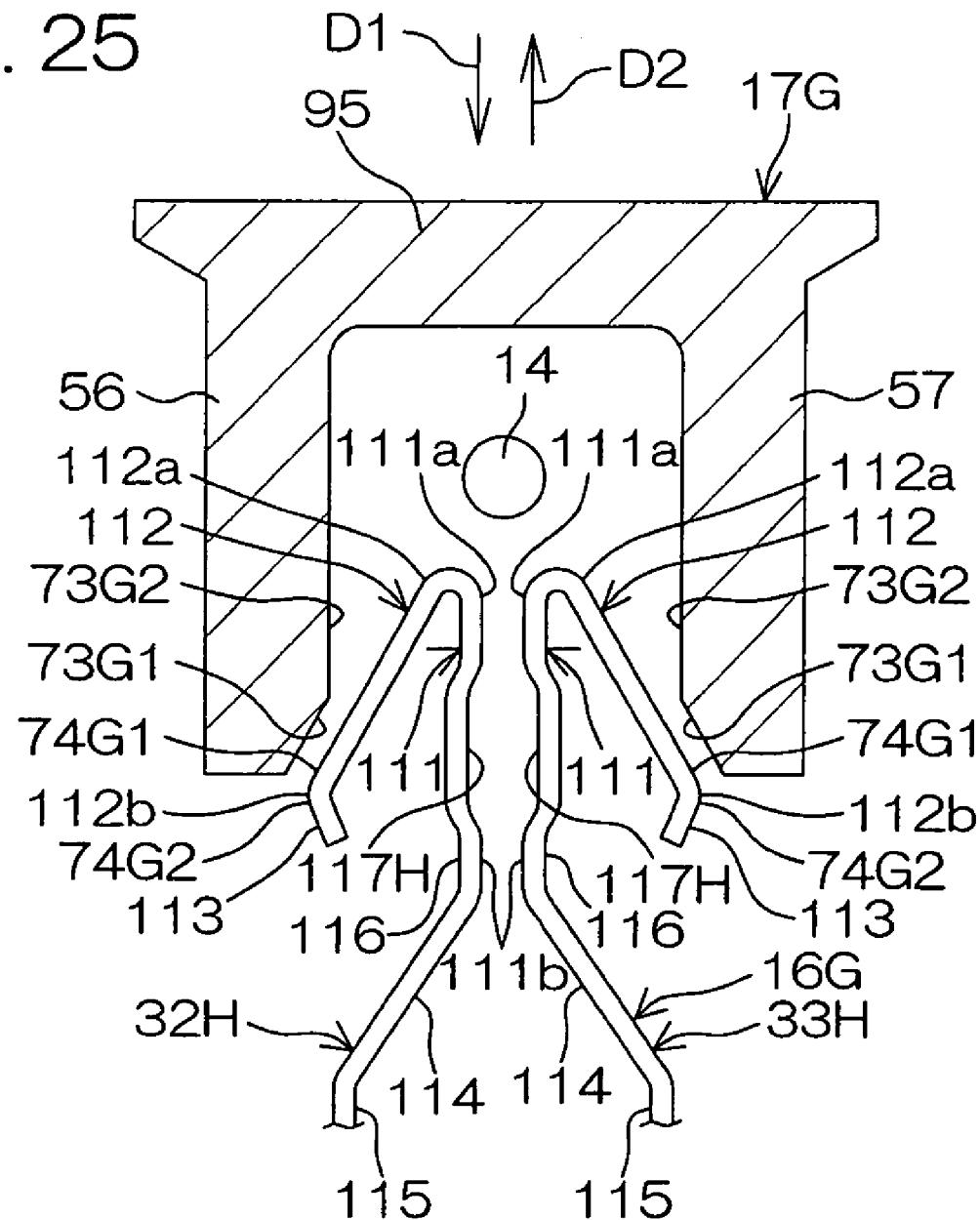
FIG. 25 is a partially sectional view of a main part according to another further embodiment of the present invention.

Alternatively, each contact part 117H may be shaped linear as shown in FIG. 25. In this example, with respect to the first direction D1, the deviation of the outer leads 14 from elastic pieces 32H and 33H is tolerated in a greater range.

Figure 26:
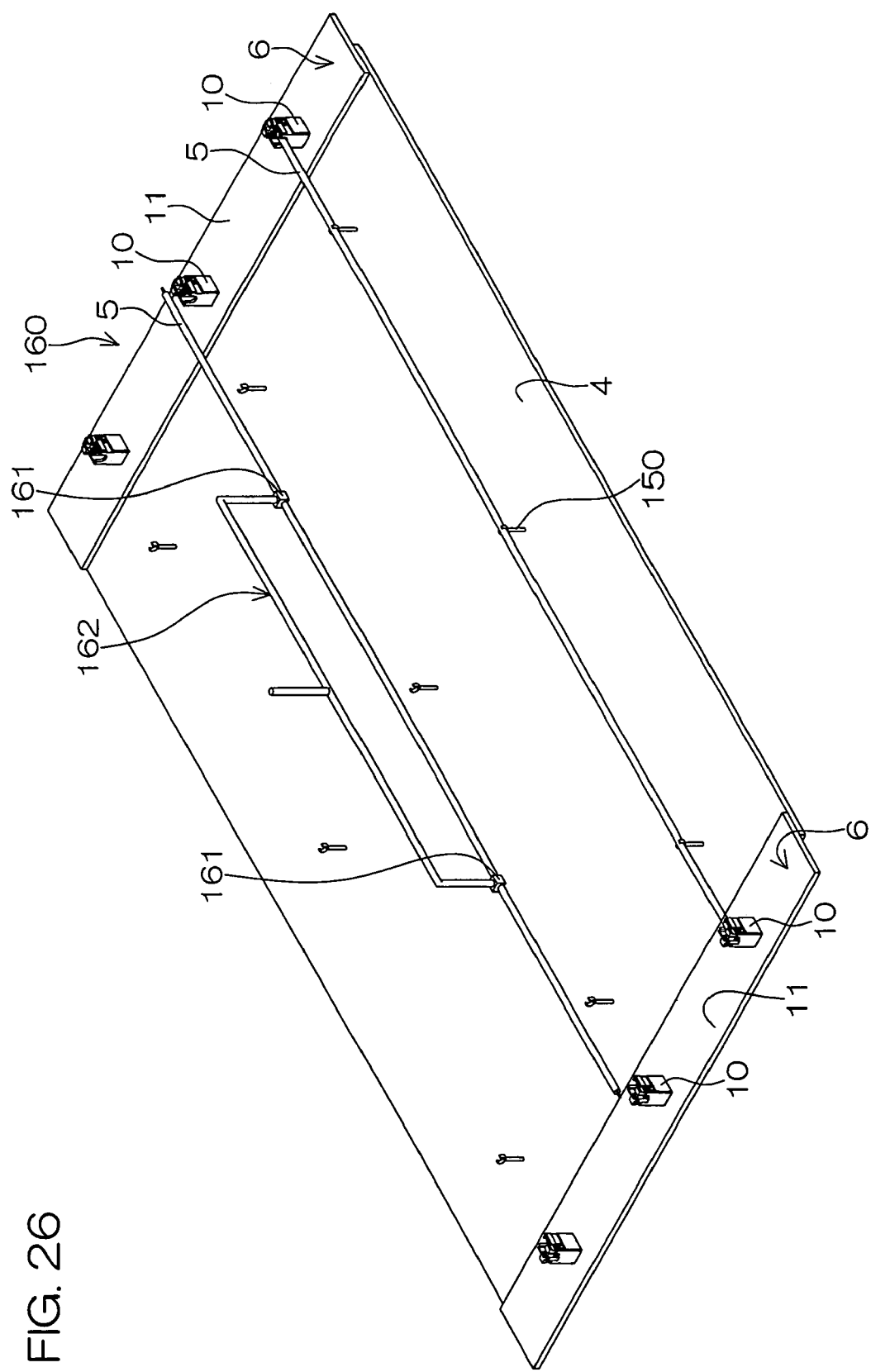
FIG. 26 is a schematic perspective view of a main part for describing mounting of a cold-cathode tube according to another further embodiment of the present invention.

FIG. 26 is a schematic perspective view of a main part for describing mounting of a cold-cathode tube 5 according to another further embodiment of the present invention. As for this embodiment, differences from the Embodiment shown in FIGS. 1 through 13 will be described principally, and similar structures will be merely denoted at similar reference symbols in the corresponding drawings but will not be described.

Referring to FIG. 26, the cold-cathode tubes 5 form a part of a support apparatus 160 which serves as a fluorescent tube connecting structure. The support apparatus 160 includes the circuit board 4, the composite connectors 6, the cold-cathode tubes 5 and support members 150. Although FIG. 26 shows a state that only one cold-cathode tube 5 is connected with the composite connector 6, each cold-cathode tube 5 is connected with each corresponding composite connectors 6 in the support apparatus 160. The holders 11 for the composite connectors 6 may be omitted.

Mounting of the cold-cathode tubes 5 is performed by using a robot 162 which includes a robot hand 161 for example. The step of mounting the cold-cathode tube 5 to the electric connectors 10 is carried out while holding the circuit board 4 horizontal, and includes the insertion preparing step shown in FIG. 27A, the insertion step shown in FIG. 27B and the pinching step shown in FIGS. 27C and 27D.

Figure 27:
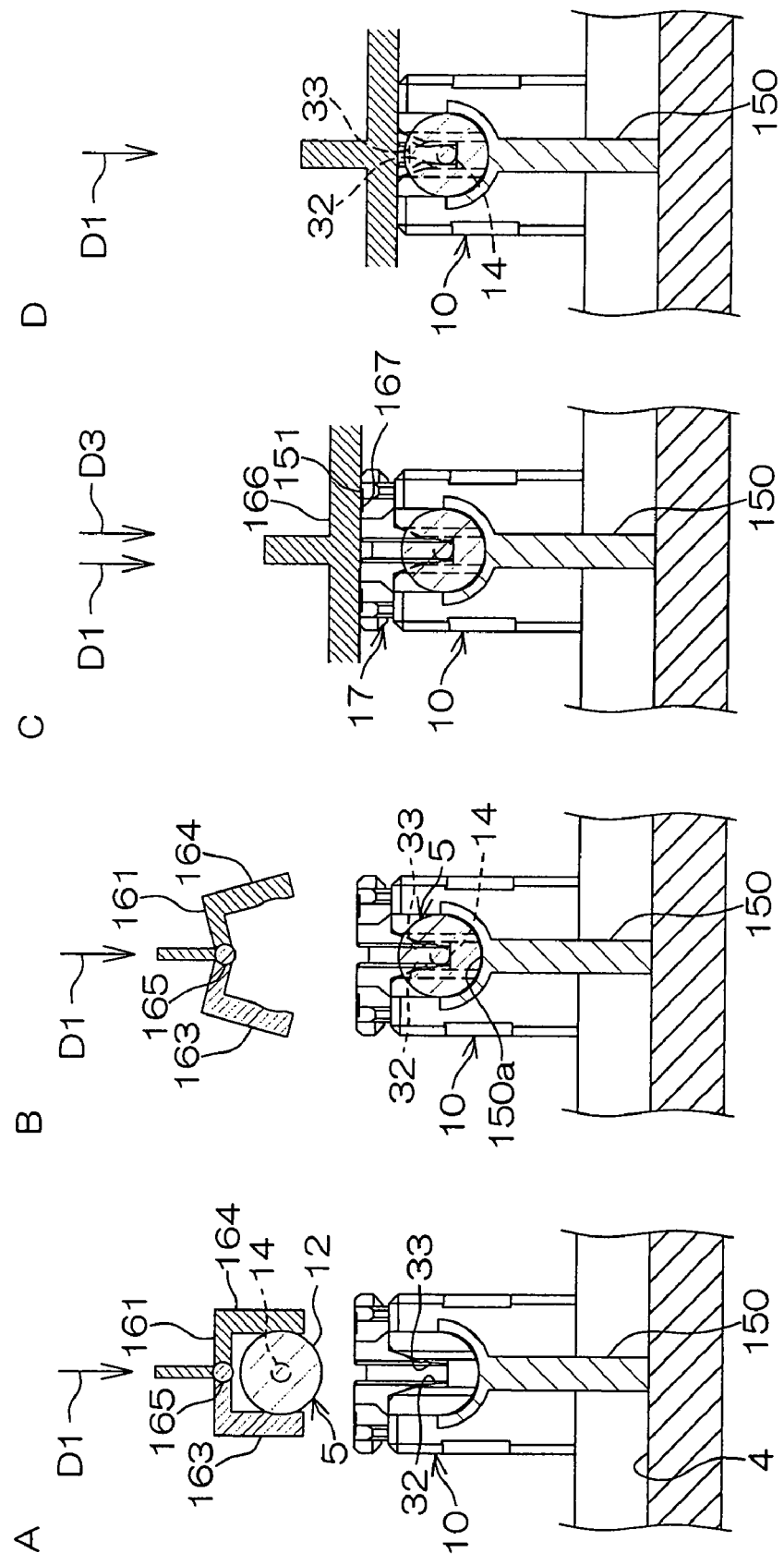
FIG. 27A is a sectional view of a main part which shows an insertion preparing step.
FIG. 27B is a cross sectional view of a main part which shows an insertion step.
FIGS. 27C and 27D are cross sectional views of a main part which show a pinching step.

At the insertion preparing step shown in FIG. 27A, the robot hand 161 holds the main body part 12 of the cold-cathode tube 5. At this time, the outer leads 14 of the cold-cathode tube 5 are located at such positions where they can be inserted between the pair of elastic pieces 32 and 33 of the electric connector 10 along the attaching direction D1. The attaching direction D1 is a vertical direction.

Upon completion of the insertion preparing step, as shown in FIG. 27B, the holding release step is performed. At the holding release step, a pair of holding parts 163 and 164 of the robot hand 161 revolve about a support shaft 165 to open and release the holding of the cold-cathode tube 5.

The cold-cathode tube 5 freely falls along the attaching direction D1 until it is received by a support part 150*a* of the support member 150. The support part 150*a* of the support member 150 positions the cold-cathode tube 5 along the attaching direction D1. As the cold-cathode tube 5 freely falls, the outer leads 14 of the cold-cathode tube 5 are inserted without any insertion force (with zero insertion force) between the pair of elastic pieces 32 and 33 of the electric connector 10 which are opposed to each other.

Referring now to FIG. 27C, a pressing member 166 is prepared. The pressing member 166 is fabricated separately from the robot hand 161 and operates independently of the robot hand 161. A pressing part 167 of the pressing member 166 abuts against a pressed part 151 of the operation member 17. The pressing member 166 is pushed down along a predetermined direction D3 which is parallel to the attaching direction D1 and the pressed part 151 is pushed down along the predetermined direction D3 so that the operation member 17 is changed to the expansion releasing position which is shown in FIG. 27D from the expanding/opening position which is shown in FIG. 27C. As the operation member 17 is operated, the outer leads 14 are elastically and firmly held between the pair of elastic pieces 32 and 33.

According to this embodiment, it is possible to insert the outer leads 14 of the cold-cathode tube 5 between the pair of elastic pieces 32 and 33 without any insertion force, and therefore, prevent rubbing of the outer leads 14 against the elastic pieces 32 and 33 during insertion. Further, at an easy step of pressing the operation member 17, it is possible to electrically connect the outer leads 14 with the pair of elastic pieces 32 and 33.

Figure 28:
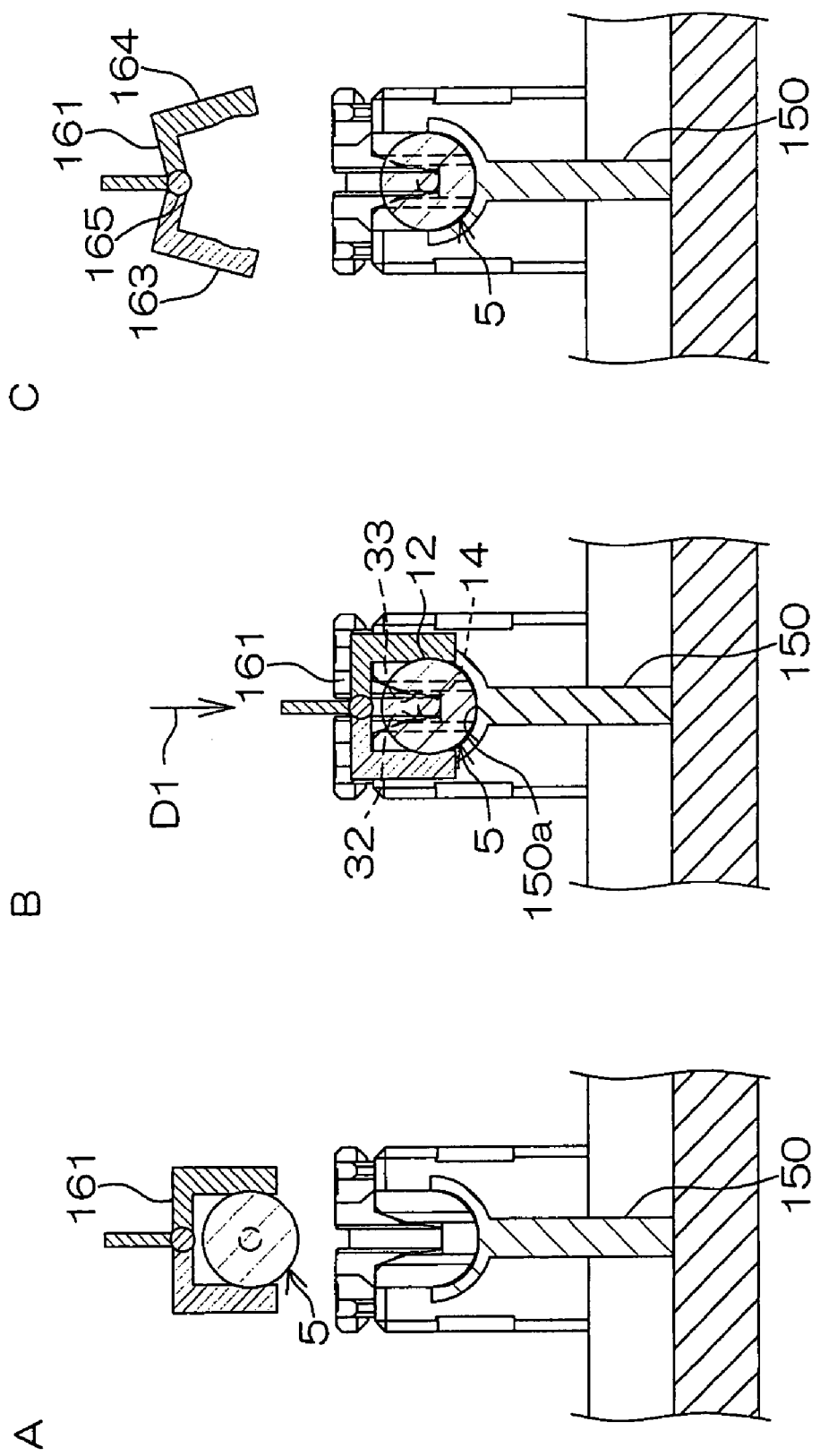
FIG. 28A is a sectional view of a main part which shows the insertion preparing step according to another further embodiment of the present invention.
FIG. 28B is a sectional view of a main part which shows the insertion step.
FIG. 28C is a sectional view of a main part which shows a holding release step.

The step of mounting the cold-cathode tubes 5 shown in FIGS. 27A through 27D may be replaced with a step of mounting the cold-cathode tubes 5 shown in FIGS. 28A through 28C. A difference from the step of mounting the cold-cathode tubes 5 shown in FIGS. 27A through 27D will now be mainly described.

At the insertion preparing step shown in FIG. 28A, a similar operation to that at the insertion preparing step shown in FIG. 27A is performed.

Upon completion of the insertion preparing step, an insertion step shown in FIG. 28B is performed. More specifically, the robot hand 161 and the cold-cathode tube 5 held by the robot hand 161 move along the attaching direction D1. The robot hand 161 and the cold-cathode tube 5 move along the attaching direction D1 until the main body part 12 of the cold-cathode tube 5 is received by the support part 150*a* of the support member 150 and accordingly positioned along the attaching direction D1. The outer leads 14 of the cold-cathode tube 5 held by the robot hand 161 are inserted between the pair of elastic pieces 32 and 33 without any insertion force.

After this insertion step, as shown in FIG. 28C, the pair of holding parts 163 and 164 of the robot hand 161 revolve about the support shaft 165 to open and the holding release step of releasing the holding of the cold-cathode tube 5 is carried out. The holding release step is followed by a similar pinching step which is shown in FIGS. 27C and 27D.

In this instance, the robot hand 161 can guide the cold-cathode tube 5 to the support part 150*a* without fail.

The step of mounting the cold-cathode tube 5 shown in FIGS. 28A through 28C may be replaced with a step of mounting the cold-cathode tubes 5 shown in FIGS. 29A through 29E. A difference from the step of mounting the cold-cathode tubes 5 shown in FIGS. 28A through 28C will now be mainly described.

Figure 29:
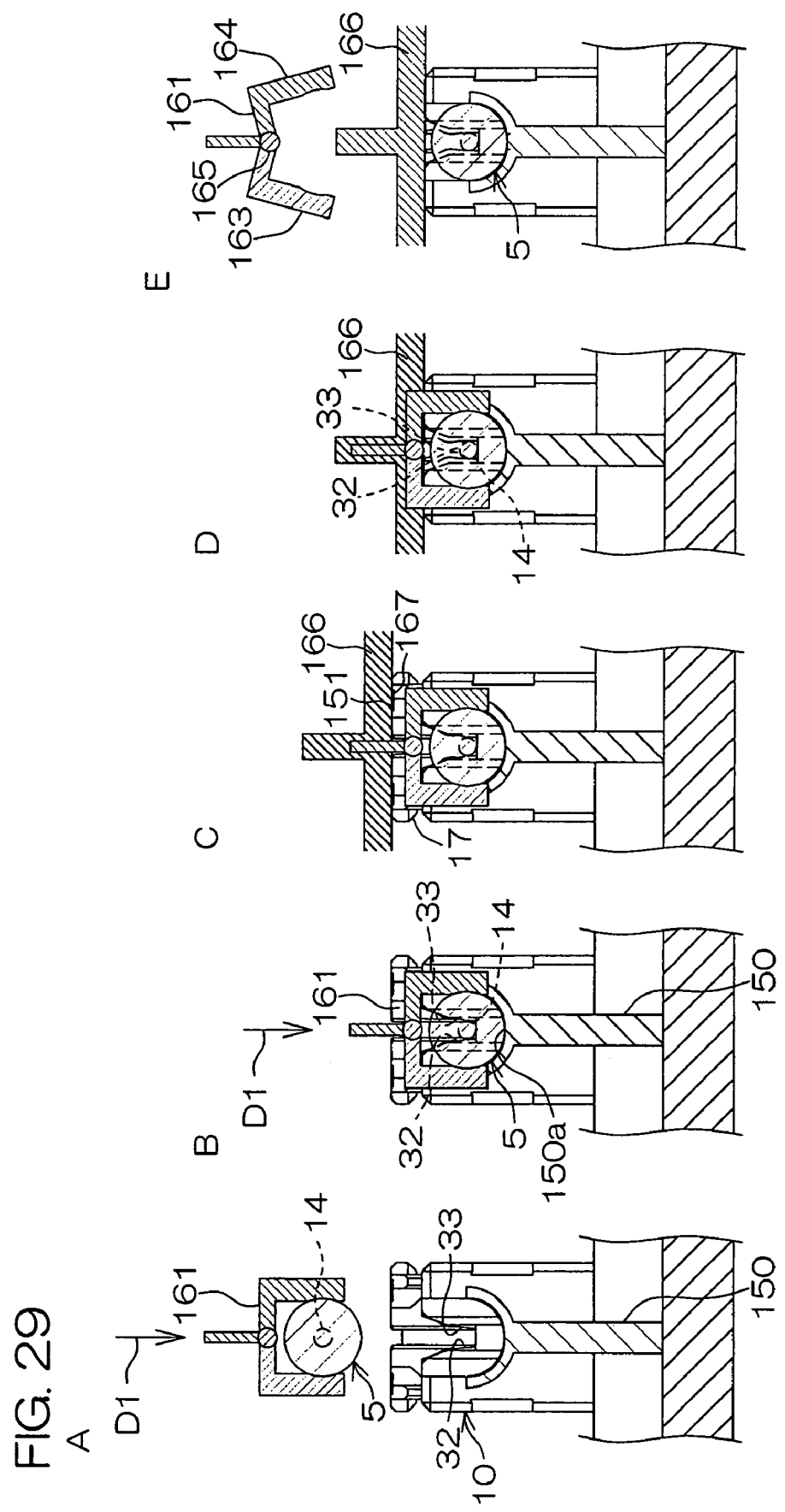
FIG. 29A is a sectional view of a main part which shows the insertion preparing step according to another further embodiment of the present invention.
FIG. 29B is a cross sectional view of a main part which shows the insertion step.
FIGS. 29C and 29D are sectional views of a main part which show the pinching step.
FIG. 29E is a sectional view of a main part which shows the holding release step.

At the insertion preparing step shown in FIG. 29A, a similar operation to that at the insertion preparing step shown in FIG. 28A is performed. At the insertion step shown in FIG. 29B, a similar operation to that at the insertion step shown in FIG. 28B is performed.

After this insertion step, as shown in FIG. 29C, as the pressing part 167 of the pressing member 166 presses the pressed part 151 of the operation member 17, the operation member 17 is moved from the expanding/opening position which is shown in FIG. 29C to the expansion releasing position which is shown in FIG. 29D. The pinching step which the pair of elastic pieces 32 and 33 elastically pinches the outer leads 14 is performed. After the pinching step, as shown in FIG. 29E, the pair of holding parts 163 and 164 of the robot hand 161 revolve about the support shaft 165 to open and the holding release step of releasing the holding of the cold-cathode tube 5 is carried out.

In this example, it is possible to hold the cold-cathode tube 5 with the robot hand 161 until the pair of elastic pieces 32 and 33 pinch the outer leads 14, therefore, more securely prevent deviation of the cold-cathode tube 5 from the electric connector 10.

Figure 30:
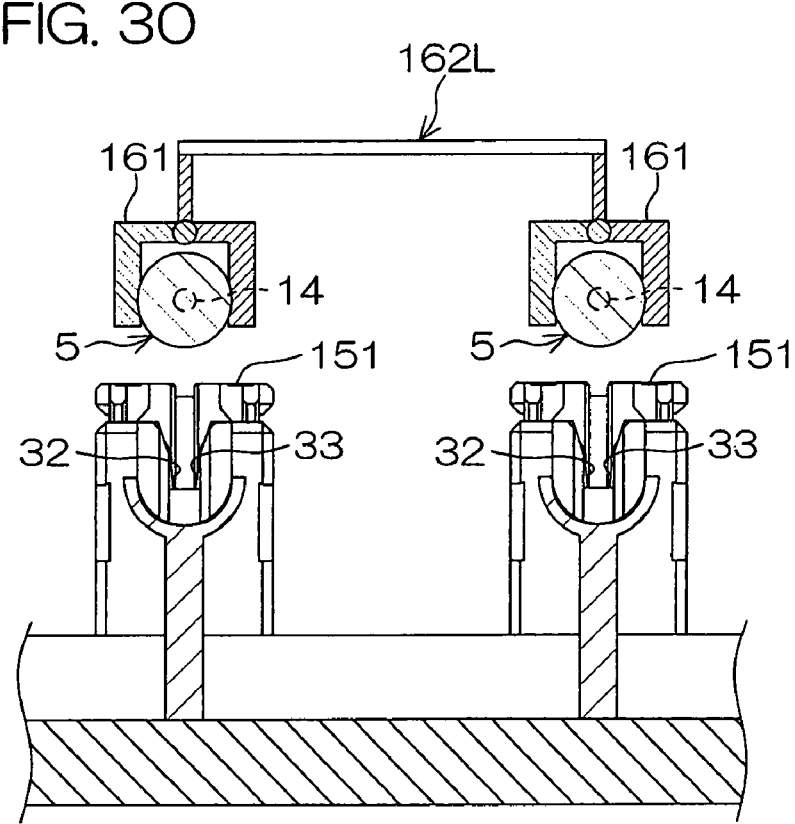
FIG. 30 is a sectional view of a main part according to another further embodiment of the present invention.

The robot hand 161 may be replaced with a human hand, or alternatively, with a robot 162L which is shown in FIG. 30. The robot 162L includes a plurality of robot hands 161 and 161. This makes it possible at the insertion preparing step to position the plurality of outer leads 14 of the cold-cathode tube 5 at such positions where they can be inserted between the pair of elastic pieces 32 and 33 without any insertion force at a time. Further, at the insertion step, the outer leads 14 of the plurality of cold-cathode tubes 5 are inserted between the plurality of pairs of elastic pieces 32 and 33 at a time. In addition, at the holding release step, the holding of the plurality of cold-cathode tubes 5 with the robot hands 161 is released at a time.

Figure 31:
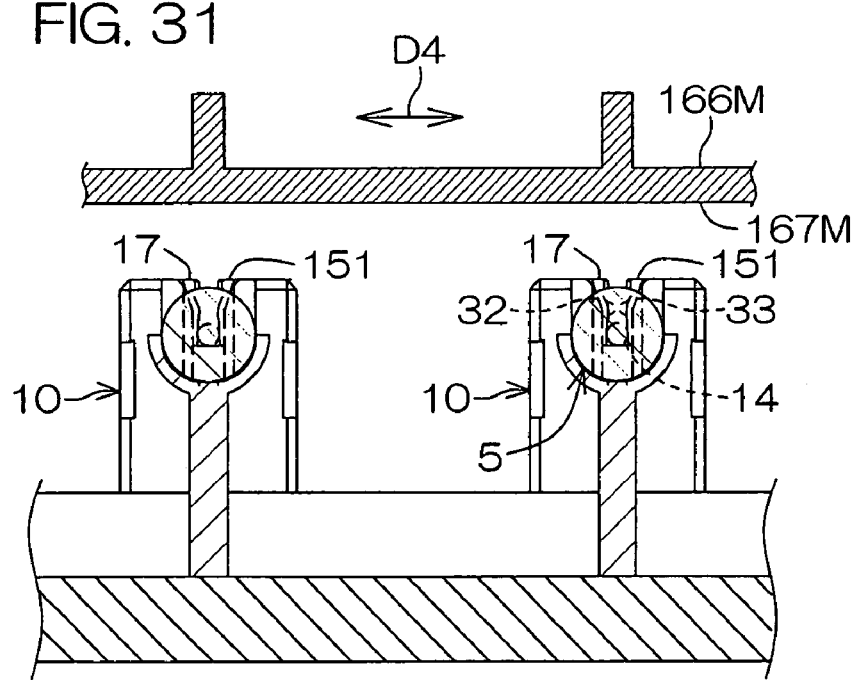
FIG. 31 is a sectional view of a main part according to another further embodiment of the present invention.

Instead of the pressing member 166, the pressed part 151 may be pressed by a human hand, or alternatively, a pressing member 166M shown in FIG. 31 may be used. A pressing part 167M of the pressing member 166M extends along an aligning direction D4 of the plurality of electric connectors 10, and is capable of pressing the pressed parts 151 of the operation members 17 of the plurality of electric connectors 10 at a time. At the pinching step, the plurality of pairs of elastic pieces 32 and 33 respectively pinch the outer leads 14 of the corresponding cold-cathode tubes 5 at a time.

Figure 32:
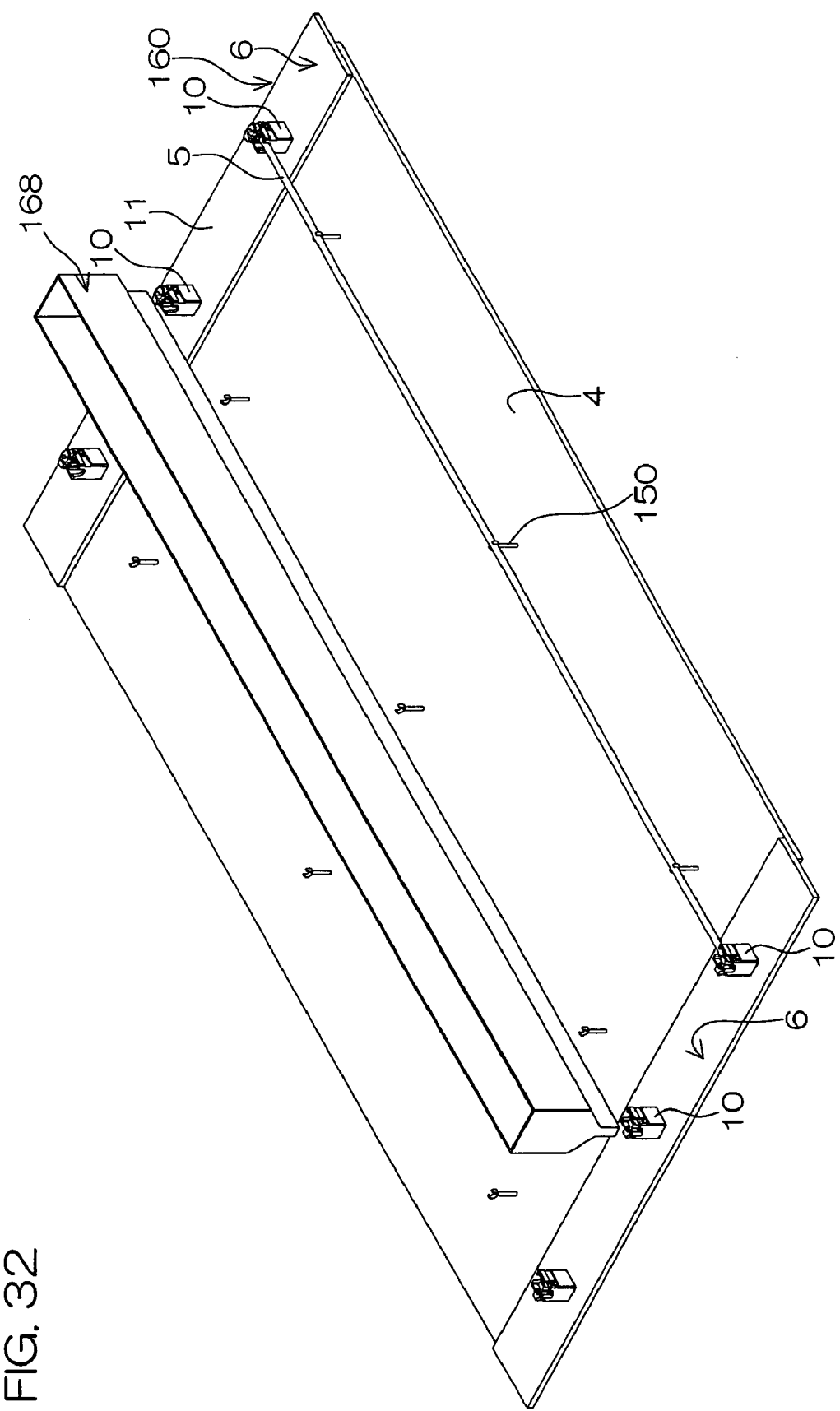
FIG. 32 is a schematic perspective view of a main part for describing mounting of a cold-cathode tube according to another further embodiment of the present invention.

The cold-cathode tube 5 may be mounted by using a jig 168 which is shown in FIG. 32. The jig 168 has a box-like shape that its length along the longitudinal direction of the cold-cathode tube 5 is slightly (e.g., by about 0.1 mm) longer than the total length of the cold-cathode tube 5.

Figure 33:
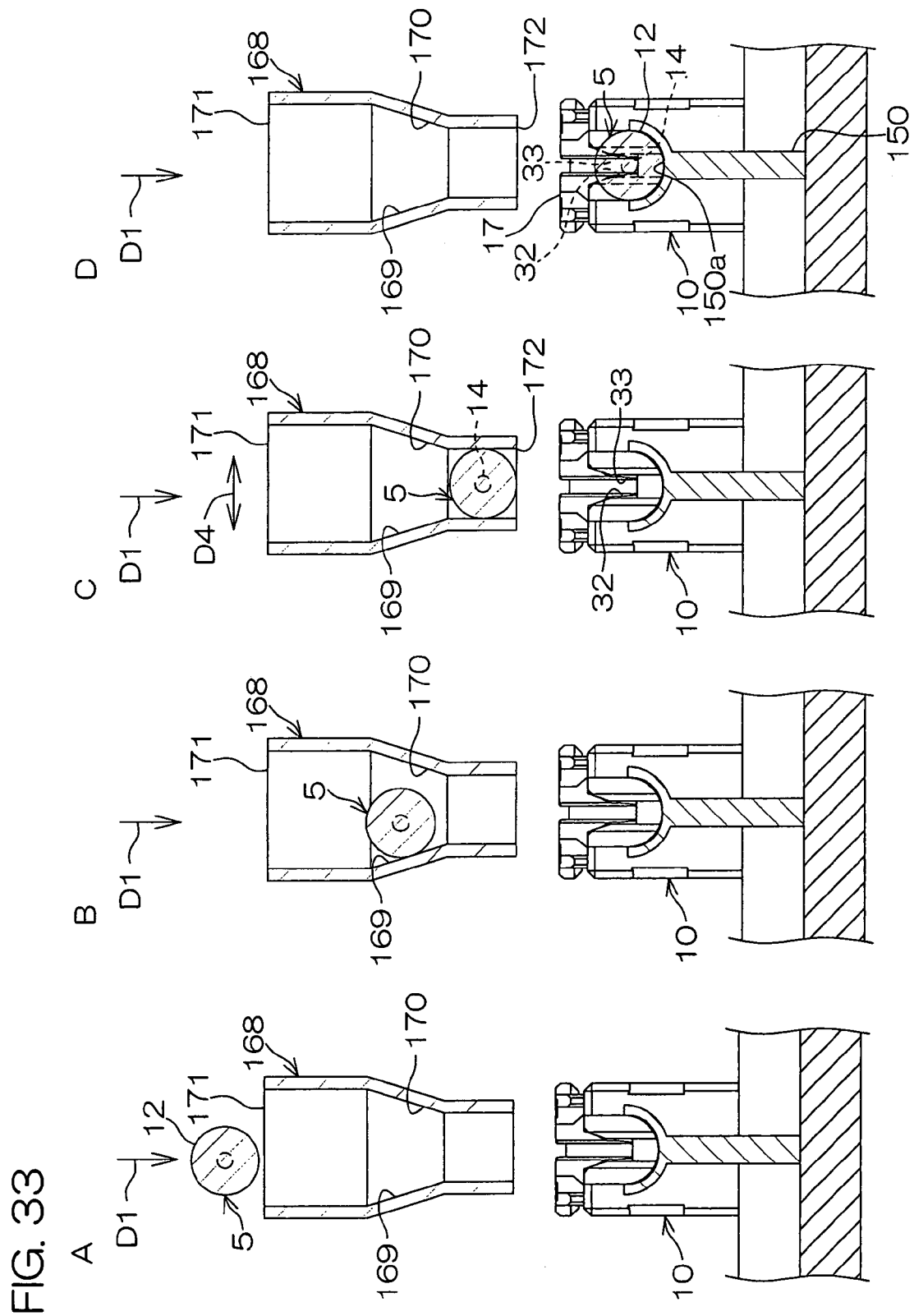
FIGS. 33A, 33B and 33C are sectional views of a main part which show the insertion preparing step.
FIG. 33D is a sectional view of a main part which shows the insertion step.

As shown in FIG. 33A, the jig 168 includes a pair of inclined guide surfaces 169 and 170. The pair of inclined guide surfaces 169 and 170 come progressively closer to each other along the attaching direction D1, and the distance between them on the downstream side along the attaching direction D1 is set to a slightly (e.g. by about 0.1 mm) wider than the outer diameter of the main body part 12 of the cold-cathode tube 5.

As shown in FIG. 33A, the cold-cathode tube 5 is located above the jig 168, and as it freely falls, it enters inside the jig 168 through an insertion inlet 171 of the jig 168. As shown in FIG. 33B, the cold-cathode tube 5 entering inside the jig 168 abuts against at least one of the pair of inclined guide surfaces 169 and 170. The cold-cathode tube 5 which passed through the pair of inclined guide surfaces 169 and 170 is positioned along the aligning direction D4 of the electric connectors 10 as shown in FIG. 33C. This guides the outer leads 14 of the freely falling cold-cathode tube 5 to such positions at which the outer leads can be inserted between the pair of elastic pieces 32 and 33 of the electric connectors 10 along the attaching direction D1.

The cold-cathode tube 5 exits the jig 168 at an outlet 172 of the jig 168 and further falls freely, and as shown in FIG. 33D, the support part 150a of the support member 150 receives the main body part 12. Thus, as the cold-cathode tube 5 freely falls, the outer leads 14 of the cold-cathode tube 5 are inserted without any insertion force between the pair of elastic pieces 32 and 33 of the electric connector 10 which are opposed to each other. Following this, the operation member 17 of the electric connector 10 is moved to the expansion releasing position in a similar manner to that shown in FIGS. 27C and 27D.

The jig 168 is formed separately from the pressing member 166 and operates independently of the pressing member 166.

According to this embodiment, it is possible to align the positions of the cold-cathode tubes 5 while the cold-cathode tubes 5 are freely falling.

Figure 34:
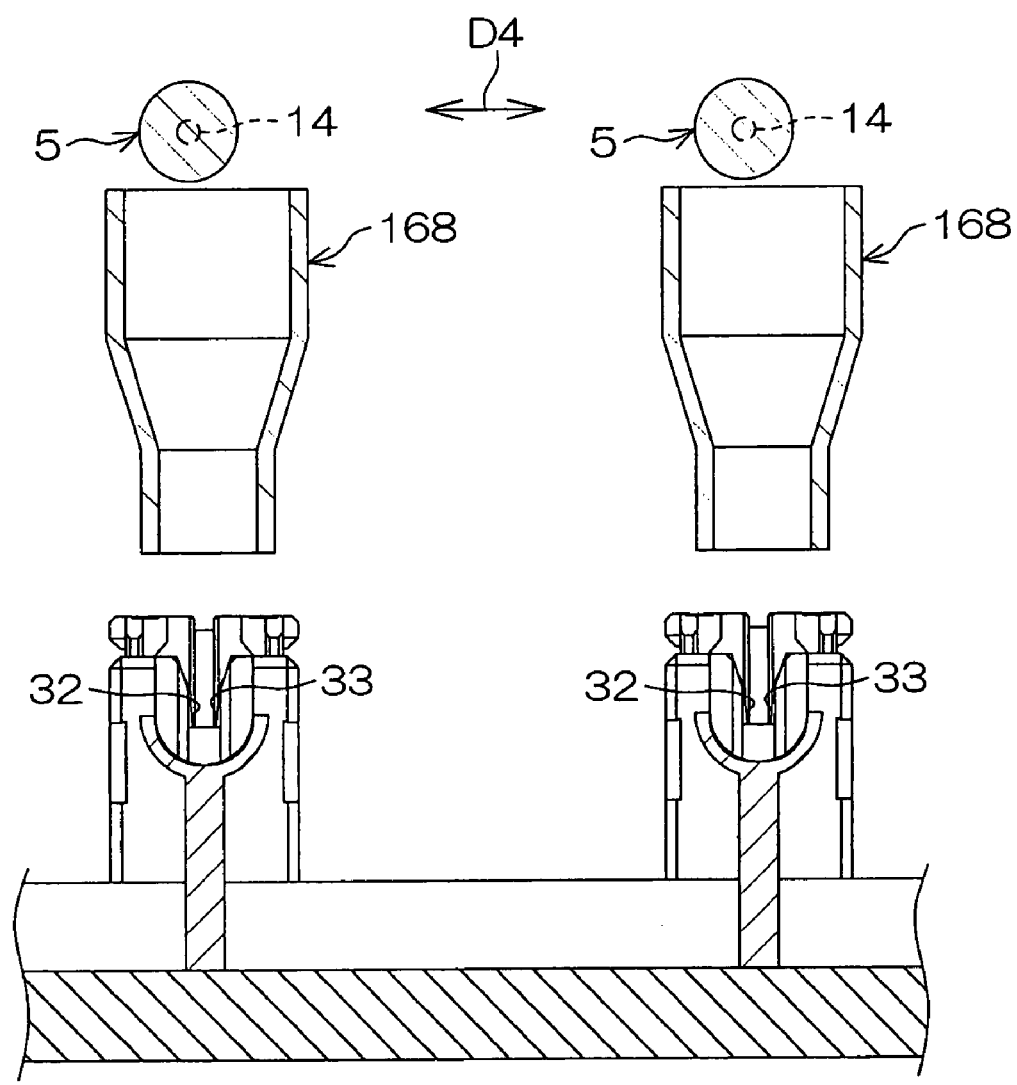
FIG. 34 is a sectional view of a main part according to another further embodiment of the present invention.

In this embodiment, a plurality of jigs 168 lined up along the aligning direction D4 may be used as shown in FIG. 34. In this example, at the insertion preparing step, the outer leads 14 of the plurality of cold-cathode tubes 5 can be positioned at a time at such positions where they can be inserted between the pair of elastic pieces 32 and 33. Further, at the insertion step, the outer leads 14 of the plurality of cold-cathode tubes 5 can be inserted between the pair of the elastic pieces 32 and 33 at one time.

Figure 35A:
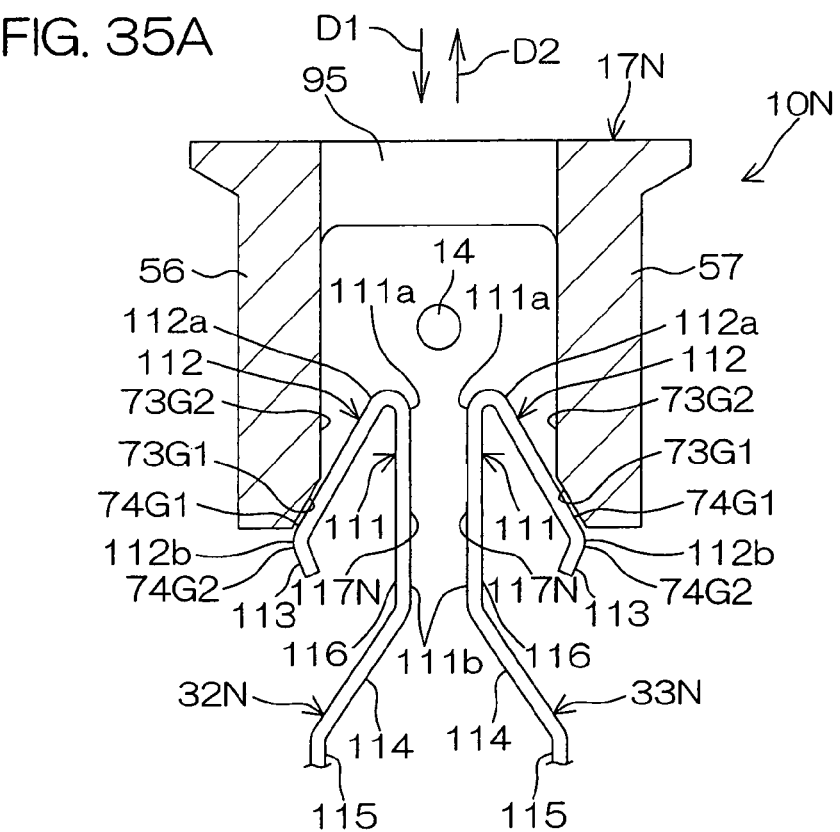

The electric connectors 10 of the support apparatus 160 may be replaced with electric connectors 10N shown in FIG. 35A. The electric connector 10N has an approximately similar structure to that of the electric connector shown in FIG. 23A.

Figure 35B:
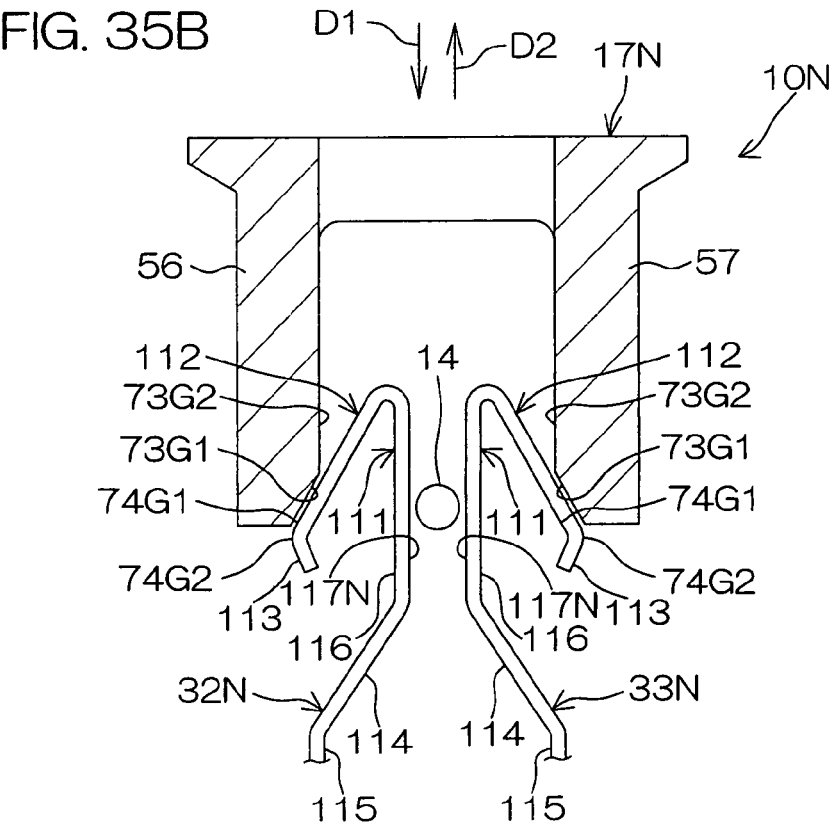

The electric connector 10N is different from the electric connector shown in FIG. 23A mainly in that it does not have the opening blocking part 95, that the distance between pair of elastic pieces 32N and 33N in a free state is larger than the outer diameter of the outer leads 14 of the cold-cathode tube 5 and that the contact parts 117 have linear shape. An operation member 17N of the electric connector 10N can be moved between a non-pressing position serving as a first position (refer to FIGS. 35A and 35B) and a final pressing position serving as a second position (refer to FIG. 36B).

When the operation member 17N is at the non-pressing position which is shown in FIG. 35A and the outer leads 14 have not been inserted between the elastic pieces 32N and 33N, the distance between the linear part 116 of the elastic piece 32N and the linear part 116 of the elastic piece 33N is larger than the outer diameter of the outer leads 14.

As a result, the outer leads 14 introduced between the linear parts 116 of the pair of elastic pieces 32N and 33N can smoothly move without any insertion force along the attaching direction D1.

When the operation member 17N is located at the non-pressing position, a first pressing part 73G1 and a second pressing part 73G2 of the operation member 17N do not press the pair of elastic pieces 32N and 33N: the pair of elastic pieces 32N and 33N are free from pressing. It is therefore only the elasticity of the pair of elastic pieces 32N and 33N that expands the distance between the pair of elastic pieces 32N and 33N.

Figure 36A:
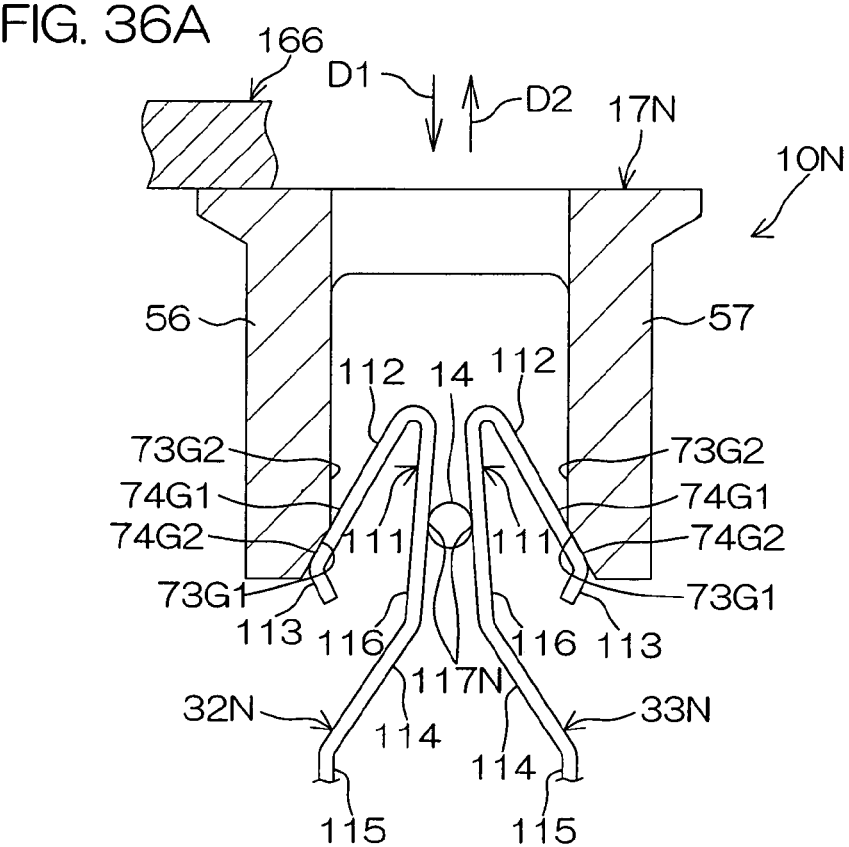
FIG. 36A shows a state as it is during pressing of the pair of elastic pieces after a state shows in FIG. 35B.

On the contrary, as shown in FIG. 36A, at the pinching step of shifting the operation member 17N from the non-pressing position to the final pressing position by using the pressing member 166 and the like, first, the inclined first pressing parts 73G1 of the operation member 17N presses the first pressed part 74G1 of the corresponding second piece 112 which is inclined. Therefore, each second piece 112 elastically deforms, thereby increasing the pinching force (pressing force) upon the outer leads 14 between the two contact parts 117.

Figure 36B:
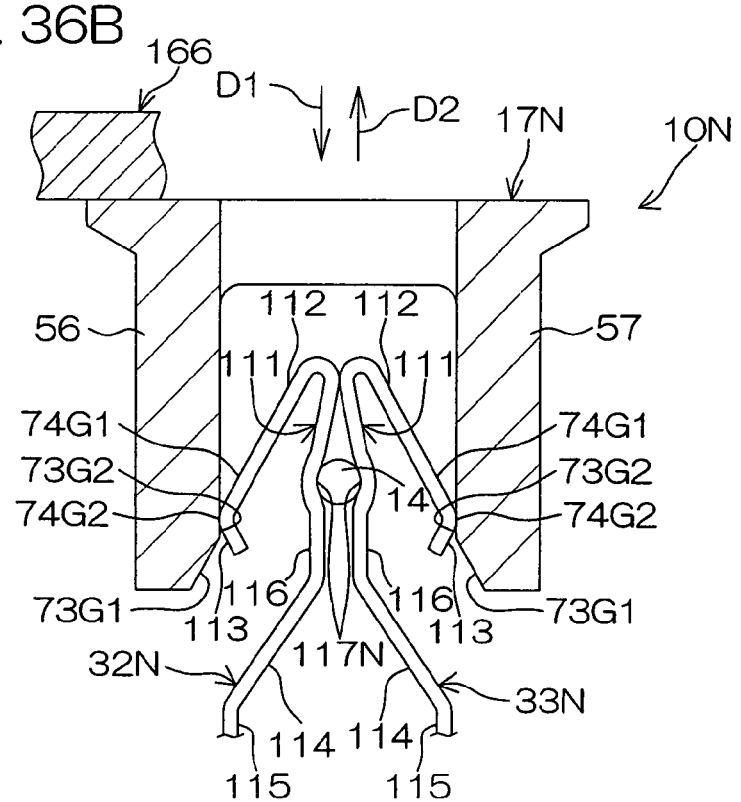
FIG. 36B shows a state as it is at the completion of the pressing of the pair of elastic pieces.

As the operation member 17N reaches the final pressing position which is shown in FIG. 36B, the second pressing parts 73G2 of the operation member 17N presses the second pressed part 74G2 of the corresponding elastic pieces 32N and 33N. This elastically deforms each second piece 112 in a sufficient deformation amount, which adequately enhances the pinching force upon the outer leads 14 between the two contact parts 117.

The present invention is not limited to the embodiments described above but may be modified within the scope described in the claims.

For example, the contact 16 according to the embodiment shown in FIG. 9 may be replaced with a contact 16J which is shown in FIG. 37. A pair of elastic pieces 32J and 33J of the contact 16J include second pieces 48J which extend along the second direction D2 and first pieces 47J which are bent from the tip ends of the second pieces 48J in the second direction D2 and extend along the first direction D1, the pair of second pieces 48J are located relatively close to each other, the pair of first pieces 47J are located relatively far from each other, and the pair of linear parts 52 are disposed on the respective second pieces 48J.

Figure 38A:
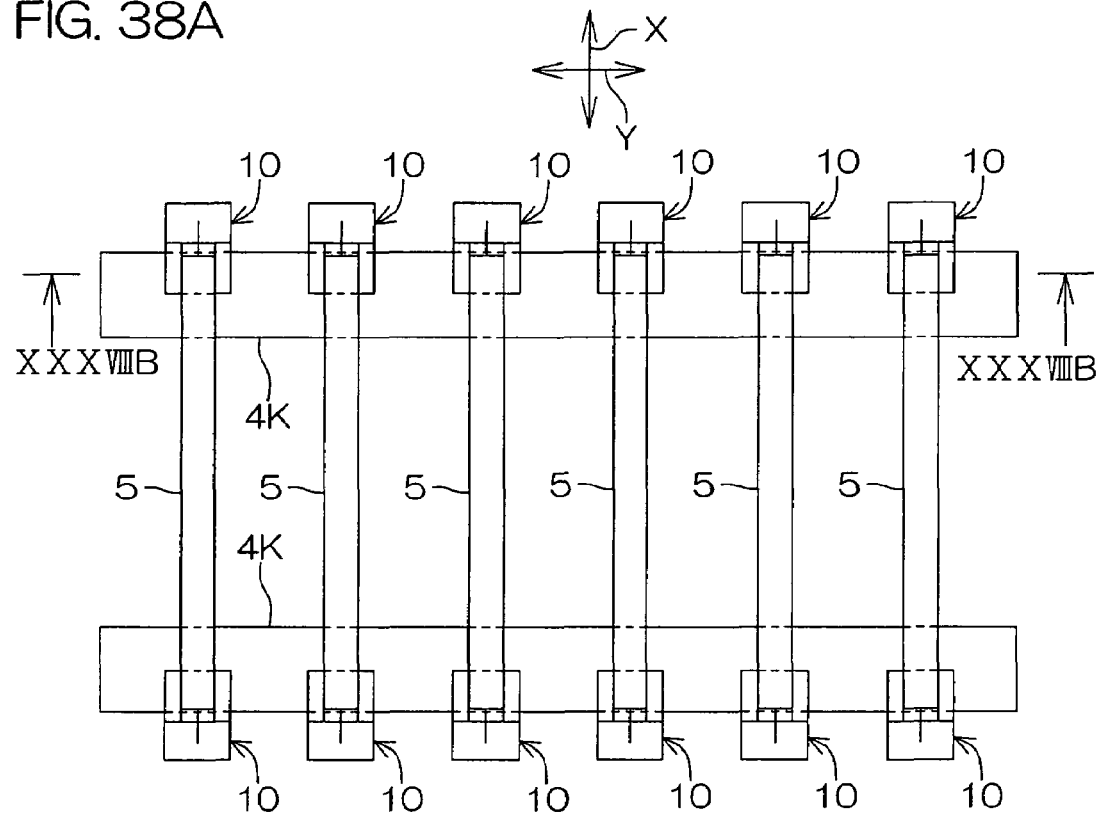
Figure 38B:
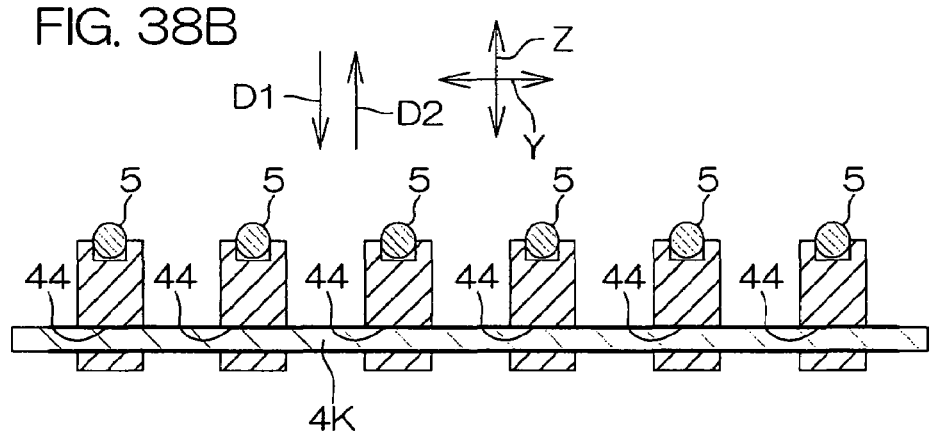
FIG. 38B is a sectional view taken along the line XXXVIIIB-XXXVIIIB of FIG. 38A.

Further, in the embodiments described above, as shown in FIGS. 38A and 38B, a circuit board 4K which is in a rectangular shape and long in the Y-direction (aligning direction) may be used as a holder which holds the plurality of connectors 10 all together.

Further, the directions of the front surface 4a and the back surface 4b of the circuit board 4 may be reversed. Further, on only one of the front surface 4a and the back surface 4b of the circuit board 4 may be formed with the conductive patterns. In this example, the second elastic pieces corresponding to the conductive patterns elastically contact.

Further, any two or more of embodiments described above may be combined to implement the present invention.

Further, the present invention is applicable to connection with other fluorescent tubes such as an external electrode fluorescent tube. Further, the present invention is applicable to a liquid crystal display device of the edge light type.

While the foregoing has described the present invention in detail in relation to specific modes, those skilled in the art comprehend the disclosure above will be able to easily conceive modifications, changes and equivalents of the same. The present invention should therefore be defined by the scope of claim and the scope of equivalents.

The present application corresponds to Japanese Patent Application No. 2006-77297 filed at the Japanese Patent Office on Mar. 20, 2006, the entire disclosure of which is hereby incorporated by reference.

What is claimed is:

1. A composite contact, comprising:
a contact composite body fabricated from a flat, electrically-conductive panel member extending along and about an X-axis, a Y-axis and a Z-axis perpendicularly intersecting one another to form a Cartesian coordinate system, the X-axis and the Y-axis defining an XY plane, the Y-axis and Z-axis defining a YZ plane and the X-axis and the Z-axis defining an XZ plane, the contact composite body including:
a main body part extending in the YZ plane;
first elastic pieces which extend upwardly from the main body part and elastically contacts with a terminal disposed at an end part of a fluorescent tube, the first elastic pieces extending parallel to the XZ plane; and
second elastic pieces which extend transversely and perpendicularly from the main body part and elastically contacts with a conductive pattern which is formed on at least one of a front surface and a back surface of a circuit board, the second elastic pieces extending parallel to the XZ plane,
wherein the main body part, the first elastic pieces and the second elastic pieces are formed as one integrated part by a single member,
the second elastic pieces are one or more pairs of second elastic pieces, and
one pair of second elastic pieces are capable of pinching the front surface and the back surface of the circuit board.

2. A composite contact according to claim 1, wherein
the first elastic pieces are a pair of the first elastic pieces, and
the pair of first elastic pieces include, at mutually opposed positions, contact parts which are capable of pinching the terminal disposed at the end part of the fluorescent tube in a radial direction.

3. A composite contact according to claim 1, wherein
the pair of second elastic pieces include contact parts which contact the corresponding front surface and back surface of the circuit board,
an insertion space, which is for sliding and inserting the circuit board along a predetermined insertion direction, is defined between the pair of second elastic pieces, and
the contact parts of the pair of second elastic pieces are located at different positions from each other with respect to the predetermined insertion direction.

4. A composite contact according to claim 1, wherein
the corresponding second elastic piece can contact the conductive pattern which is formed on at least one of the front surface and the back surface of the circuit board.

5. A composite contact according to claim 1, wherein
the only one second elastic piece is provided, and
the only one second elastic piece can contact the corresponding conductive pattern which is formed on at least one of the front surface and the back surface of the circuit board.

6. A composite contact, comprising:
a contact body fabricated from a flat, electrically-conductive panel member extending along and about an X-axis, a Y-axis and a Z-axis perpendicularly intersecting one another to form a Cartesian coordinate system, the X-axis and the Y-axis defining an XY plane, the Y-axis and Z-axis defining a YZ plane and the X-axis and the Z-axis defining an XZ plane, the contact composite body including a main body part, a pair of hook-shaped elastic pieces with a two-prong, fork-shaped piece which extend transversely and perpendicularly from the main body for pinching a front surface and a back surface of the circuit board,
the main body part including an upper U-shaped portion, a lower portion extending in the YZ plane and a middle portion disposed between the upper U-shaped portion and the lower portion and extending in the YZ plane, the upper U-shaped portion having an upper portion core part and an opposing pair of upper portion arm parts, the upper portion core part integrally connected to the middle portion and extending in the YZ plane, the pair of upper portion arm parts integrally connected to the upper portion core part and extending perpendicularly therefrom and parallel to the XZ plane, the lower portion integrally connected to the middle portion.
each one of the pair of hook-shaped elastic pieces having a straight portion and a flexing free end portion integrally connected to the straight portion and bent relative to the straight portion to form a hook-shaped configuration, the straight portion extending parallel to the XZ plane and integrally connected to a respective one of the pair of upper portion arms, respective ones of the flexing free end portions disposed in a spaced apart manner between respective ones of the straight portions and facially opposing one another, each one of the flexing free end portions movable between a flexed state and a relaxed state, the flexing free end portions being resiliently biased to the relaxed state, the pair of hook-shaped elastic pieces being capable of pinching a terminal disposed at an end part of a fluorescent tube,
the two-prong, forked shaped piece integrally connected to the lower portion and extending therefrom parallel to the XZ plane, the two-prong, forked-shaped piece having a pair of facially opposing prongs movable between a relaxed condition and a flexed condition, the pair of facially opposing prongs being resiliently biased to the relaxed condition.

* * * * *

UNITED STATES PATENT AND TRADEMARK OFFICE
CERTIFICATE OF CORRECTION

PATENT NO. : 7,549,880 B2  Page 1 of 1
APPLICATION NO. : 11/723240
DATED : June 23, 2009
INVENTOR(S) : Katsunori Miyazono et al.

It is certified that error appears in the above-identified patent and that said Letters Patent is hereby corrected as shown below:

Column 27, Line 31:
"pair of the first elastic pieces" should read -- pair of first elastic pieces --.

Column 28, Line 6:
"contact body" should read -- contact composite body --.

Column 28, Line 29:
"portion." should read -- portion, --.

Signed and Sealed this

First Day of September, 2009

David J. Kappos
*Director of the United States Patent and Trademark Office*